US011989328B2

(12) United States Patent
Schroeder et al.

(10) Patent No.: US 11,989,328 B2
(45) Date of Patent: *May 21, 2024

(54) EMBEDDED DEVICE FOR CONTROL OF DATA EXPOSURE

(71) Applicant: Grey Market Labs, PBC, Arlington, VA (US)

(72) Inventors: Kristopher P. Schroeder, Falls Church, VA (US); Timothy R. Underwood, Mineral, VA (US)

(73) Assignee: Grey Market Labs, PBC, Falls Church, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/334,624

(22) Filed: May 28, 2021

(65) Prior Publication Data

US 2021/0286899 A1 Sep. 16, 2021

Related U.S. Application Data

(63) Continuation-in-part of application No. 16/733,729, filed on Jan. 3, 2020, now Pat. No. 11,487,903, which is a continuation of application No. 16/273,877, filed on Feb. 12, 2019, now Pat. No. 10,558,823, which is
(Continued)

(51) Int. Cl.
 *G06F 21/62* (2013.01)
 *G06N 20/20* (2019.01)

(52) U.S. Cl.
 CPC ......... *G06F 21/6263* (2013.01); *G06N 20/20* (2019.01)

(58) Field of Classification Search
 None
 See application file for complete search history.

(56) References Cited

U.S. PATENT DOCUMENTS 8,522,052 B1 * 8/2013 Lesea ..................... H04L 9/003
 726/36
8,739,281 B2 5/2014 Wang et al.
(Continued)

FOREIGN PATENT DOCUMENTS

WO 2016149237 A1 9/2016

OTHER PUBLICATIONS

Office Action dated Jan. 25, 2022 in U.S. Appl. No. 16/733,729.
(Continued)

*Primary Examiner* — Trang T Doan
(74) *Attorney, Agent, or Firm* — Polsinelli LLP

(57) ABSTRACT

Systems and methods for managing data exposure are provided and include a data protection device embedded or otherwise coupled to a computing device. The data protection device receives communications from the computing device and intended for a network resource over a secured connection between the data protection device and the computing device (e.g., a communications interface of the computing device). The data protection device identifies data privacy elements associated with the communication and generates corresponding modified data privacy elements. The data protection device establishes access to the network resource using the modified data privacy elements, thereby causing network hosts attempting to detect the data privacy elements to detect the modified data privacy elements instead.

24 Claims, 24 Drawing Sheets

Related U.S. Application Data a continuation-in-part of application No. 16/005,268, filed on Jun. 11, 2018, now Pat. No. 10,282,553.

(56) References Cited

U.S. PATENT DOCUMENTS

| | | | |
|---|---|---|---|
| 8,761,403 B2* | 6/2014 | Su | G06F 11/1456 380/263 |
| 8,893,285 B2* | 11/2014 | Zucker | H04L 63/0428 713/193 |
| 9,786,281 B1 | 10/2017 | Adams et al. | |
| 9,846,716 B1 | 12/2017 | Scott et al. | |
| 10,178,067 B1 | 1/2019 | Kumar et al. | |
| 10,296,548 B2 | 5/2019 | Hemmaplardh et al. | |
| 10,356,050 B1 | 7/2019 | Kumar et al. | |
| 10,803,197 B1* | 10/2020 | Liao | G06F 21/604 |
| 10,936,744 B1* | 3/2021 | Trepetin | H04L 63/0421 |
| 2008/0034223 A1* | 2/2008 | Funahashi | G06F 21/6218 713/193 |
| 2009/0254994 A1 | 10/2009 | Waterson | |
| 2012/0124372 A1* | 5/2012 | Dilley | H04L 67/564 713/162 |
| 2012/0166582 A1* | 6/2012 | Binder | G06F 21/602 709/217 |
| 2015/0326608 A1 | 11/2015 | Shabtai et al. | |
| 2016/0092699 A1 | 3/2016 | Riva et al. | |
| 2016/0098360 A1* | 4/2016 | Gillespie | G06F 21/79 711/104 |
| 2016/0170778 A1 | 6/2016 | Kalyanpur | |
| 2017/0206365 A1 | 7/2017 | Garcia et al. | |
| 2017/0243028 A1 | 8/2017 | LaFever et al. | |
| 2018/0121552 A1* | 5/2018 | Bostick | G06F 21/6254 |
| 2018/0176192 A1* | 6/2018 | Davis | H04L 63/166 |
| 2018/0225230 A1* | 8/2018 | Litichever | G06F 21/82 |
| 2018/0300504 A1 | 10/2018 | Hailpern et al. | |
| 2019/0332814 A1 | 10/2019 | Bos et al. | |
| 2021/0084057 A1 | 3/2021 | Chhabra | |

OTHER PUBLICATIONS

First Action Interview Pilot Program Pre-Interview Communication dated Sep. 4, 2018 in U.S. Appl. No. 16/005,268.

Notice of Allowance dated Dec. 26, 2018 in U.S. Appl. No. 16/005,268.

Laperdrix, Pierre et al., "Mitigating Browser Fingerprinting Tracking: Multi-level Reconfiguration and Diversification;" Proceedings of the IEEE/ACM 10th International Symposium on Software Engineering for Adaptive and Self-Managing Systems (SEAMS); May 2015; Firenze, Italy; pp. 98-108; hal-01121108.

International Search Report and Written Opinion dated Mar. 25, 2019 in International Application PCT/US2019/014143.

Office Action dated Dec. 19, 2019 in U.S. Appl. No. 16/280,755.

Notice of Allowance dated Feb. 28, 2020 in U.S. Appl. No. 16/280,755.

First Action Interview Pilot Program Pre-Interview Communication dated May 31, 2019 in U.S. Appl. No. 16/273,877.

Notice of Allowance dated Oct. 4, 2019 in U.S. Appl. No. 16/273,877.

Office Action dated Nov. 1, 2021 in U.S. Appl. No. 16/273,877.

Office Action dated Nov. 7, 2022 in U.S. Appl. No. 17/349,791.

Notice of Allowance dated Jun. 2, 2022 in U.S. Appl. No. 16/876,421.

Notice of Allowance dated Jun. 27, 2022 in U.S. Appl. No. 16/733,729.

Office Action dated Dec. 27, 2021 in U.S. Appl. No. 16/876,421.

Office Action dated Jan. 10, 2022 in U.S. Appl. No. 16/733,729.

Office Action dated May 4, 2023 in U.S. Appl. No. 17/822,479.

Notice of Allowance dated Mar. 7, 2023 in U.S. Appl. No. 17/349,791.

Office Action dated Oct. 4, 2023 in Australian Application 2019287571.

Office Action dated Dec. 1, 2023 in U.S. Appl. No. 17/931,563.

Notice of Allowance dated Aug. 21, 2023 in U.S. Appl. No. 17/822,479.

Office Action dated May 30, 2023 in Israeli Application 278307.

* cited by examiner

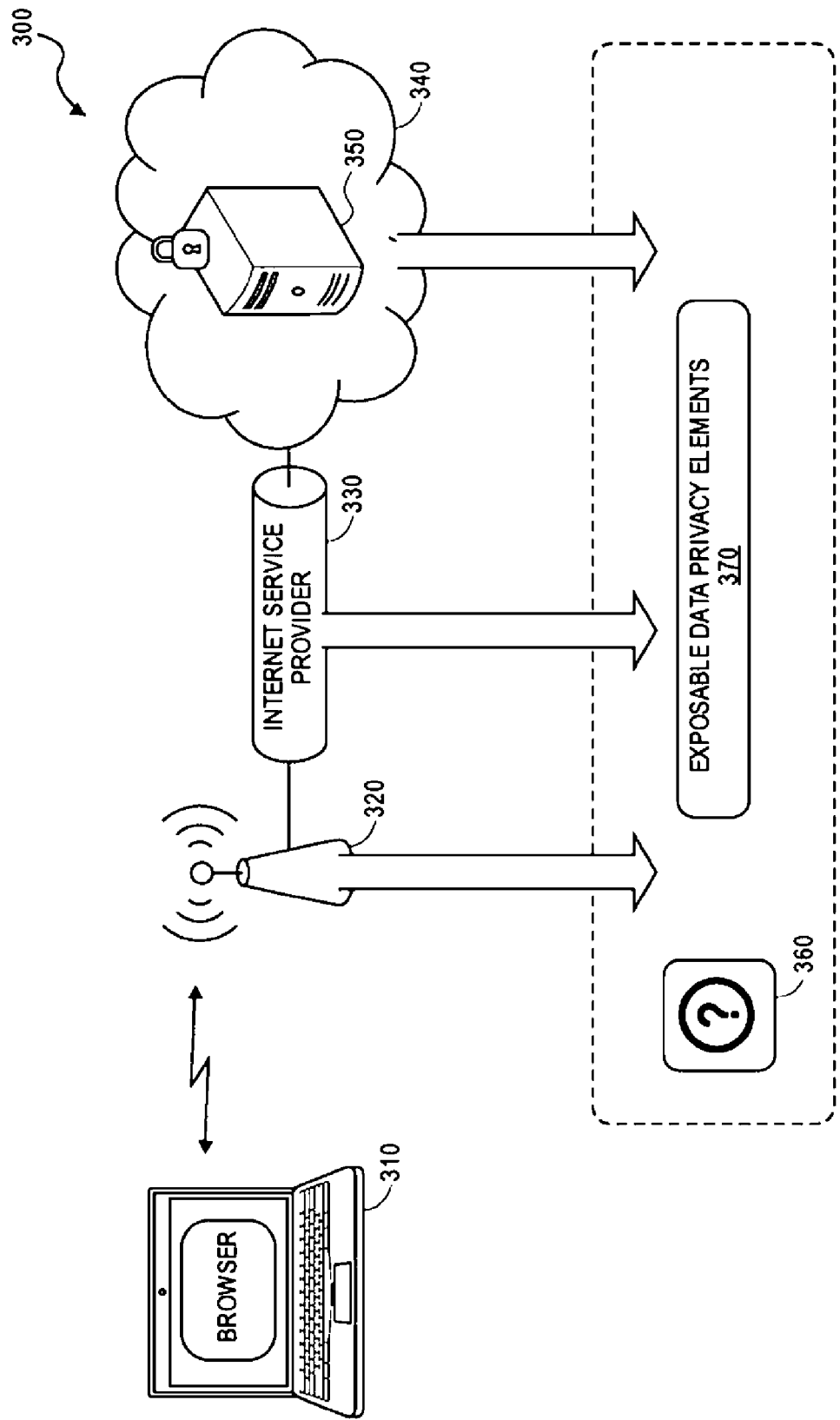

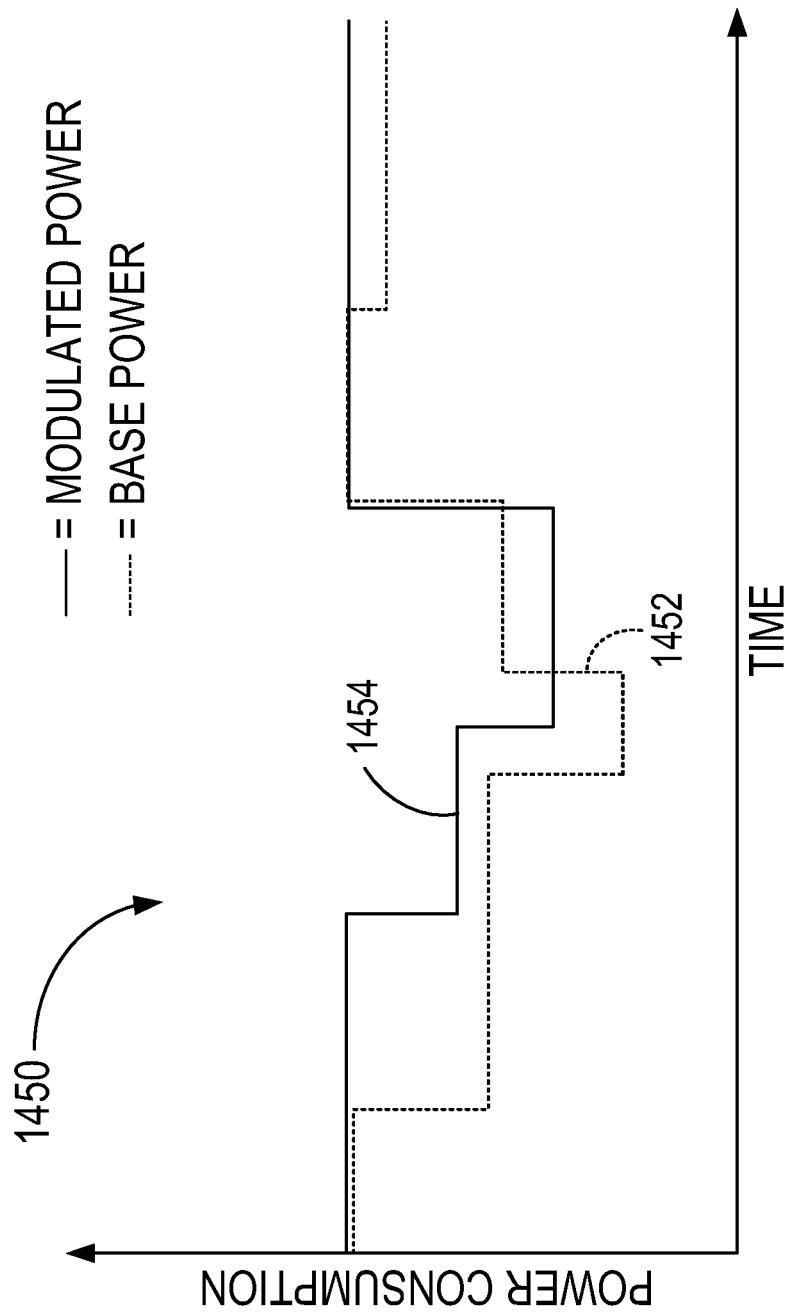

1700

```
RECEIVE POWER AT DATA PROTECTION DEVICE FROM PRIMARY
COMPUTING DEVICE
1702
```

```
RECEIVE REQUEST TO ACCESS NETWORK LOCATION FROM
COMPUTING DEVICE OVER SECURE CONNECTION
1704
```

```
RECEIVE DATA ASSOCIATED WITH REQUEST FROM COMPUTING
DEVICE OVER SECURE CONNECTION
1706
```

```
IDENTIFY PRIVACY ELEMENT DETECTABLE BY NETWORK HOST
1708
```

```
GENERATE MODIFIED PRIVACY ELEMENT
1710
```

```
ESTABLISH ACCESS TO NETWORK LOCATION WITH MODIFIED
PRIVACY ELEMENT
1712
```

FIG. 17

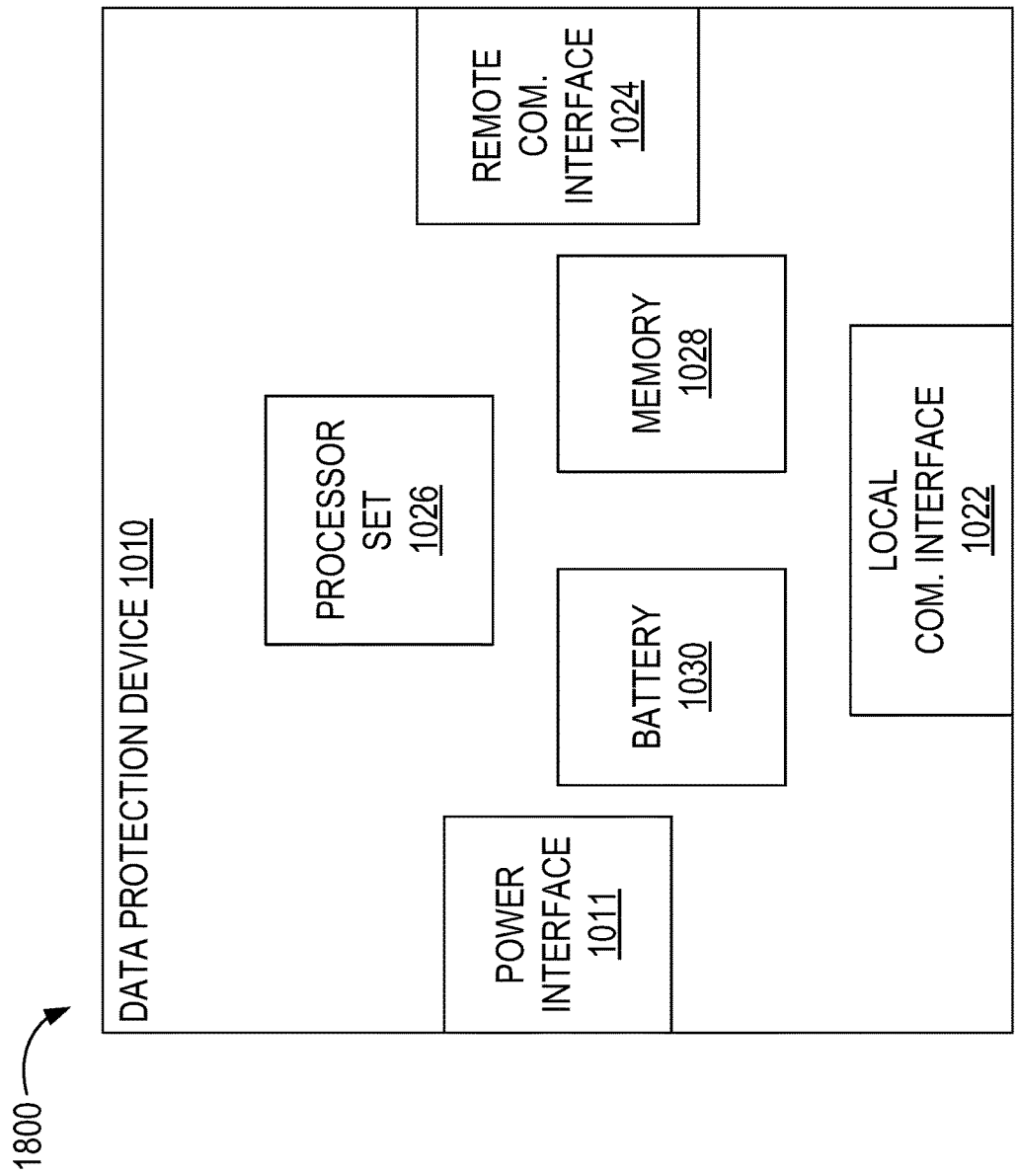

EMBEDDED DEVICE FOR CONTROL OF DATA EXPOSURE

CROSS-REFERENCE TO RELATED APPLICATIONS

This application is a continuation-in-part of U.S. patent application Ser. No. 16/733,729, filed on Jan. 3, 2020, and titled "Systems and Methods for Controlling Data Exposure Using Artificial-Intelligence-Based Modeling", which is a continuation of U.S. patent application Ser. No. 16/273,877, filed on Feb. 12, 2019, now U.S. Pat. No. 10,558,823, which is a continuation-in-part and claims the priority benefit of U.S. application Ser. No. 16/005,268, filed Jun. 11, 2018, the disclosure of which is incorporated herein by reference.

FIELD

The present disclosure relates to systems and methods for controlling data exposed to external networks using artificial-intelligence-based modeling. More particularly, the present disclosure relates to an embedded device and related methods for implementing artificial profiles to control data exposure.

BACKGROUND

Every computing device connected to the Internet produces exposable data. The exposable data may be accessed by authorized network hosts (e.g., web servers providing access to a webpage) or unauthorized network hosts (e.g., hackers) through a network. In some scenarios, the exposed data can be used to reveal sensitive information relating to devices or the users operating the devices. For instance, when a laptop connects to a web server to gain access to a webpage, the web server can query the browser for certain information. However, an unauthorized network host could exploit a vulnerability in a network using that information. For example, the unauthorized network host can execute a data breach of a network using the obtained information. The near-constant usage of computing devices and the Internet increases the complexity of and privacy risks associated with exposable data.

SUMMARY

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Certain aspects of the present disclosure are directed to data protection devices that may be embedded within a computing device or coupled to a computing device as a peripheral device and associated techniques for managing data exposure. The data protection device generally receives power from the computing device and receives requests and data intended for a network resource over a secure connection, which may be with the computing device or another computing device using the data protection device, e.g., as a data protection "hotspot". In certain embodiments, the data protection device may identify data privacy elements associated with the communication and generate corresponding modified data privacy elements. The data protection device may then access the network resource using the modified data privacy elements such that a network host attempting to detect the data privacy elements detects the modified data privacy elements instead. In other embodiments, the data protection device may be in communication with a data protection platform and transmit the request and data to the data protection platform. The data protection platform may then perform the steps of identifying data privacy elements and generating modified data privacy elements before accessing the network resource using the modified data privacy elements. Again, attempts by a network host to detect the data privacy elements result in the network host detecting the modified data privacy elements. Regardless of the specific embodiment, data protection devices according to the present disclosure facilitate improve data security and protection through obfuscation or masking of data privacy elements that may otherwise expose vulnerabilities of the computing device communicating with the network host through the data protection device.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

FIG. 3A is a schematic diagram illustrating a network environment in which exposable data can be accessed by authorized or unauthorized network hosts at various stages of an interaction session, according to certain aspects of the present disclosure.

FIG. 14B is a graph illustrating a base power consumption and a modified power consumption, the modified power consumption achieved using the power modulator of FIG. 14A;

FIG. 17 is an illustrative example of a process for managing data exposure during access of network resources in accordance with at least one embodiment;

FIG. 18 is a diagram illustrating example components of a data protection device in accordance with at least one embodiment.

Figure 1:
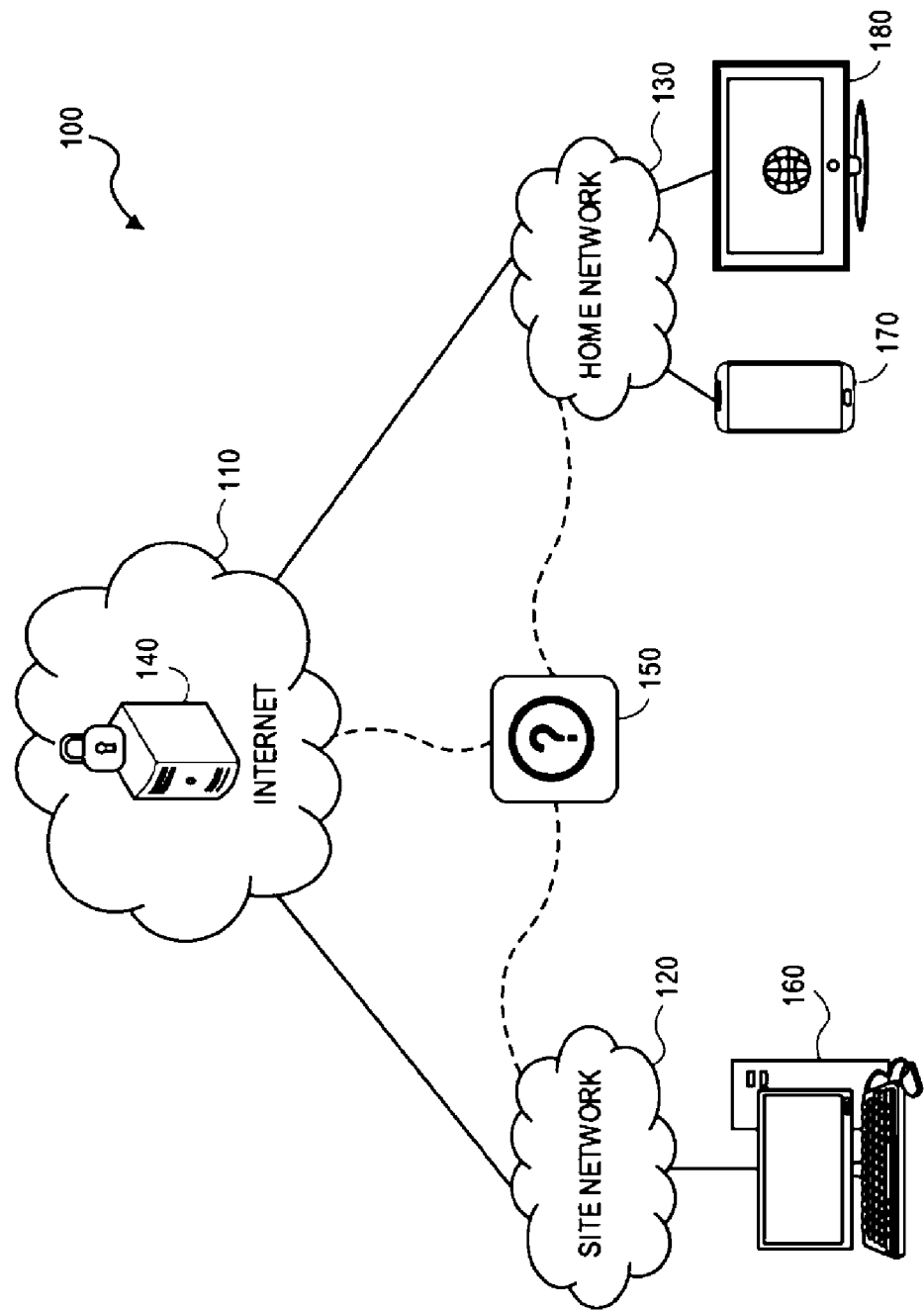
FIG. 1 is a schematic diagram illustrating a network environment in which exposable data can be accessed by authorized or unauthorized network hosts, according to certain aspects of the present disclosure.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments.

However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Certain aspects and features of the present disclosure relate to systems and methods for controlling data exposure using artificial-intelligence-based (hereinafter referred to as "AI-based") profile models. Specifically, certain aspects and features of the present disclosure relate to systems and methods for providing a data protection platform that is configured to automatically manage the exposure of data privacy elements. For example, a data privacy element may be any item of data that can be exposed (e.g., accessible) to a third-party, such as a hacker. Data privacy elements can be evaluated (e.g., alone or in combination with other data, such as social media profiles) to expose information about users and/or or network systems (e.g., organizations). Non-limiting examples of data privacy elements include activity data (e.g., web browsing history), network data (e.g., network topology), application data (e.g., applications downloaded on the computing device), operating system data (e.g., the operating system (OS) and the corresponding version of the OS running on the computing device), hardware data (e.g., the specific hardware components that comprise the computing device), human and machine interactions (e.g. biometrics, haptics), and other suitable data that exposes information about a user and/or a network.

When a computing device accesses the Internet, various data privacy elements may be exposed as the computing device navigates across web servers. For example, when the computing device accesses an Internet Service Provider (ISP), certain data privacy elements may be stored at the ISP's servers as the ISP facilitates an Internet connection. However, the data privacy elements that are stored at the ISP's servers may be accessible to other network hosts, such as authorized users (e.g., network security engineers) or unauthorized users (e.g., hackers). The accessibility of the stored data privacy elements by other users exposes the data privacy elements. This data exposure creates a security risk because the data privacy elements can be used by unauthorized users, for example, to identify vulnerabilities of the computing device or of the network systems to which the computing device is connected. Identifying vulnerabilities leaves the computing device or the network to which the computing device is connected open to data breaches or other nefarious conduct.

According to certain embodiments, the data protection platform can enhance data protection by controlling and/or managing the exposure of the data privacy elements. In some implementations, the data protection platform (described in greater detail at FIG. 5) may include an application that is deployed in a cloud network environment. For example, the data protection platform may include an application server on which an application is stored, which, when executed, performs various operations defined by the data protection platform. The data protection platform may also include one or more database servers on which the storage functionalities associated with the application can be performed in the cloud network environment. In some implementations, the computing device (e.g., operating by a user) can connect to the data protection platform using a platform-secured browser. For example, the platform-secured browser can be hosted by the data protection platform to avoid the Internet activity performed on the computing device being stored locally at the computing device. According to certain embodiments, while the computing device navigates the Internet using the platform-secured browser, the data protection platform can automatically, dynamically, in real-time, and/or intelligently control the exposure of data privacy elements associated with the computing device or the network to which the computing device is connected. Non-limiting examples of controlling the exposure of data privacy elements can include blocking data privacy elements from being accessible by web servers or application servers, blocking data privacy elements from being stored at web servers or application servers, modifying one or more data privacy elements according to an artificial profile model, providing the data privacy elements to web servers or applications servers, detecting which data privacy elements are exposed, determining which data privacy elements are required to enable Internet activity (e.g., certain websites do not function if cookies are disabled), determining which data privacy elements are not required to enable Internet activity, modifying a feature (e.g., a time signature of keystrokes, taps, or mouse clicks) of input received from the computing device, or other suitable techniques for controlling exposure of data privacy elements. In some implementations, artificial profiles can be specific to certain organizations, industries, subject matter, or user-defined applications. For example, the artificial profiles specific to an organization would include data privacy elements that are relevant or consistent with data privacy elements that would be expected for the organization.

Advantageously, the data protection platform can control the exposure of data privacy elements to protect the privacy of the user, computing device, and/or network systems (e.g., operated by organizations, companies, governments, or other suitable entities) as the computing device navigates the Internet. For instance, if a network host can collect data privacy elements of users, computing devices, and/or networks (e.g., such that the collection is authorized or unauthorized), the collected data can expose information (e.g., potentially private or sensitive information) about the organization to which the users, computing devices, and/or networks belong. Thus, by using embodiments described herein for managing or controlling the exposure of data privacy elements for users, computing devices, and/or network systems of an organization, the data protection platform thereby manages or controls the exposure of potentially sensitive information about the organization itself. Managing or controlling the exposure of data privacy elements can prevent data breaches of the users, computing devices, and/or network systems because network hosts, such as hackers, can be prevented from collecting certain data privacy elements, or can at least be prevented from collecting accurate data privacy elements, which obfuscate or mask identifiers or attributes of the users, computing devices, and/or network systems.

Further, the data protection platform can control the exposure of data privacy elements using artificial profiles, which are generated using an artificial profile model, to obfuscate the user and/or network in a realistic manner. In some implementations, the artificial profile model (described in greater detail with respect to FIG. 7) can include a model that is generated using machine-learning techniques and/or AI techniques. For example, the artificial profile model may include data representing a relationship between two or more data privacy elements. The relationship between the two or more data privacy elements can be automatically learned using machine-learning techniques, for example, or can be user defined based one or more user-defined rules. In some implementations, when the data protection platform modifies a data privacy element to obfuscate a computing device, the modification of the data privacy element can be performed within the constraints of the relationship learned or defined by the artificial profile model.

As a non-limiting example, a specific application may be downloaded on a computing device. Downloading the specific application on the computing device may also cause a specific set of fonts to be installed on the computing device. When the computing device accesses a website, the web server that provides access to the website may execute a tracking asset (e.g., a cookie) that is stored in the computing device's browser. The tracking asset can request certain data privacy elements from the computing device. For example, the tracking asset may request (from the computing device's browser) data privacy elements identifying which fonts are installed on the computing device. From the perspective of the network host (e.g., the web server providing access to the website), if the data privacy elements collected from the computing device indicate that a font is installed on the computing device, or the lack of a font installed on the computing device, that indication may be evaluated to determine (with some likelihood) whether or not an application has been downloaded onto the computing device. Again, from the perspective of the network host, if the exposure of data privacy elements from the computing device indicate with a certain likelihood that an application has been downloaded on the computing device, this information introduces an attack vector (e.g., known or unknown vulnerabilities or exploits associated with that application), exposes user information (e.g., the application is specific to an industry, which exposes the industry associated with the organization), or may not provide any information at all.

According to certain embodiments, the data protection platform can obfuscate the identifiable attributes of the computing device by modifying the data privacy elements (i.e., the identity of the fonts that are installed on the computing device) so that the web server collects inaccurate data about the computing device when the computing device accesses the website. However, the modification of the data privacy elements would not appear to be realistic (e.g., to a hacker) if the identity of the fonts were modified to include a font that was inconsistent with the specific set of fonts associated with the specific application. Accordingly, in order to control the data privacy elements of the computing device in a realistic manner, the artificial profile model can include data representing the relationship between the specific application and the set of specific fonts. Thus, generating an artificial profile for the computing device may involve changing the specific application to a new application, which is exposed to the website, and to also modify the set of specific fonts to a set of new fonts associated with the new application. In this non-limiting example, the modified data privacy elements collected by the website (i.e., the identity of the new application and the set of new fonts) will seem realistic to a hacker because both data privacy elements (e.g., the application and the associated set of fonts) are consistent with each other. As an advantage of the disclosed embodiments, generating artificial profiles to be consistent with dependencies defined in the artificial profile model increases the realistic nature of the modified artificial profiles so as to enhance the data protection of computing devices and/or networks.

These non-limiting and illustrative examples are given to introduce the reader to the general subject matter discussed here and are not intended to limit the scope of the disclosed concepts. For example, it will be appreciated that data privacy elements other than fonts can be collected, including, but not limited to, which plugins are installed in the browser of the computing device, or any other information collectable from a browser, computing device, or Operating System running on the computing device. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a schematic diagram illustrating network environment 100, in which exposable data can be accessed by authorized or unauthorized network hosts, according to certain aspects of the present disclosure. Network environment 100 can include Internet 110, site network 120 and home network 130. Each of Internet 110, site network 120, and home network 130 can include any open network, such as the Internet, personal area network, local area network (LAN), campus area network (CAN), metropolitan area network (MAN), wide area network (WAN), wireless local area network (WLAN); and/or a private network, such as an intranet, extranet, or other backbone. In some instances, Internet 110, site network 120, and/or home network 130 can include a short-range communication channel, such as Bluetooth or Bluetooth Low Energy channel. Communicating using a short-range communication such as BLE channel can provide advantages such as consuming less power, being able to communicate across moderate distances, being able to detect levels of proximity, achieving high-level security based on encryption and short ranges, and not requiring pairing for inter-device communications.

In some implementations, communications between two or more systems and/or devices can be achieved by a secure communications protocol, such as secure sockets layer (SSL), transport layer security (TLS). In addition, data and/or transactional details may be encrypted based on any convenient, known, or to be developed manner, such as, but not limited to, DES, Triple DES, RSA, Blowfish, Advanced Encryption Standard (AES), CAST-128, CAST-256, Decorrelated Fast Cipher (DFC), Tiny Encryption Algorithm (TEA), eXtended TEA (XTEA), Corrected Block TEA (XX-TEA), and/or RC5, etc.

As illustrated in the example of FIG. 1, site network 120 may be connected to computer 160, home network 130 may be connected to mobile device 170 (e.g., a smartphone) and smart TV 180 (e.g., a television with Internet capabilities), and Internet 110 may be connected to secure server 140. Site network 120 may be a network that is operated by or for an organization, such as a business. Computer 160 may connect to secure server 140 using site network 120. Home network 130 may be a network that is operated by or for a residential area, such as a single family dwelling or an apartment complex. Mobile device 170 and smart TV 180 may connect to secure server 140 using home network 130. Secure server 140 may be any server connected to the Internet or a cloud network environment. For example, secure server 140 may be a web server that is hosting a website. It will be appreciated that, while network environment 100 shows a single site network and a single home network, any number of network in any configuration can be included in network environment 100.

In some implementations, network host 150 may be a computing device (e.g., a computer) connected to a computer network, such as any of Internet 110, site network 120, and/or home network 130. In some implementations, network host 150 may be any network entity, such as a user, a device, a component of a device, or any other suitable network device. In some instances, network host 150 may be an authorized device, such as a web server that allows users to access a website, an application server that allows users to access an application, a network security engineer, or other suitable authorized devices. In some instances, network host 150 may be an unauthorized network host, such as a hacker, a computer virus, or other malicious code. For example, network host 150 may be able to access secure server 140, site network 120, and/or home network 130 to collect exposable data privacy elements that expose information about secure server 140, site network 120, computer 160, home network 130, mobile device 170, and/or smart TV 180. As computer 160, mobile device 170, and/or smart TV 180 communicate over Internet 110, for example, with secure server 140, various exposable data privacy elements can be collected and stored at servers or databases of any of site network 120, home network 130, or Internet 110. Either substantially in real-time (with Internet activity of computer 160, mobile device 170, or smart TV 180) or non-real-time, network host 150 can access the data privacy elements that may be stored at secure server 140, site network 120, and/or home network 130. Network host 150 can access the stored data privacy elements in an authorized manner (e.g., a website that allowed access after a cookie has been installed in a browser) or an unauthorized manner (e.g., secure server 140 may be hacked by network host 150). Either way, network host 150 can evaluate the collected data privacy elements to determine whether there are any vulnerabilities in any aspects of secure server 140, site network 120, and/or home network 130. Network host 150 can then use the vulnerabilities to execute a data breach. The ability of network host 150 to collect exposable data privacy elements is described in greater detail with respect to FIG. 2. Further, according to certain embodiments described herein, the data protection platform can be used to prevent network host 150 from accessing or collecting the data privacy elements or to obfuscate the real data privacy elements so as to provide inaccurate or useless information to network host 150.

Figure 2:
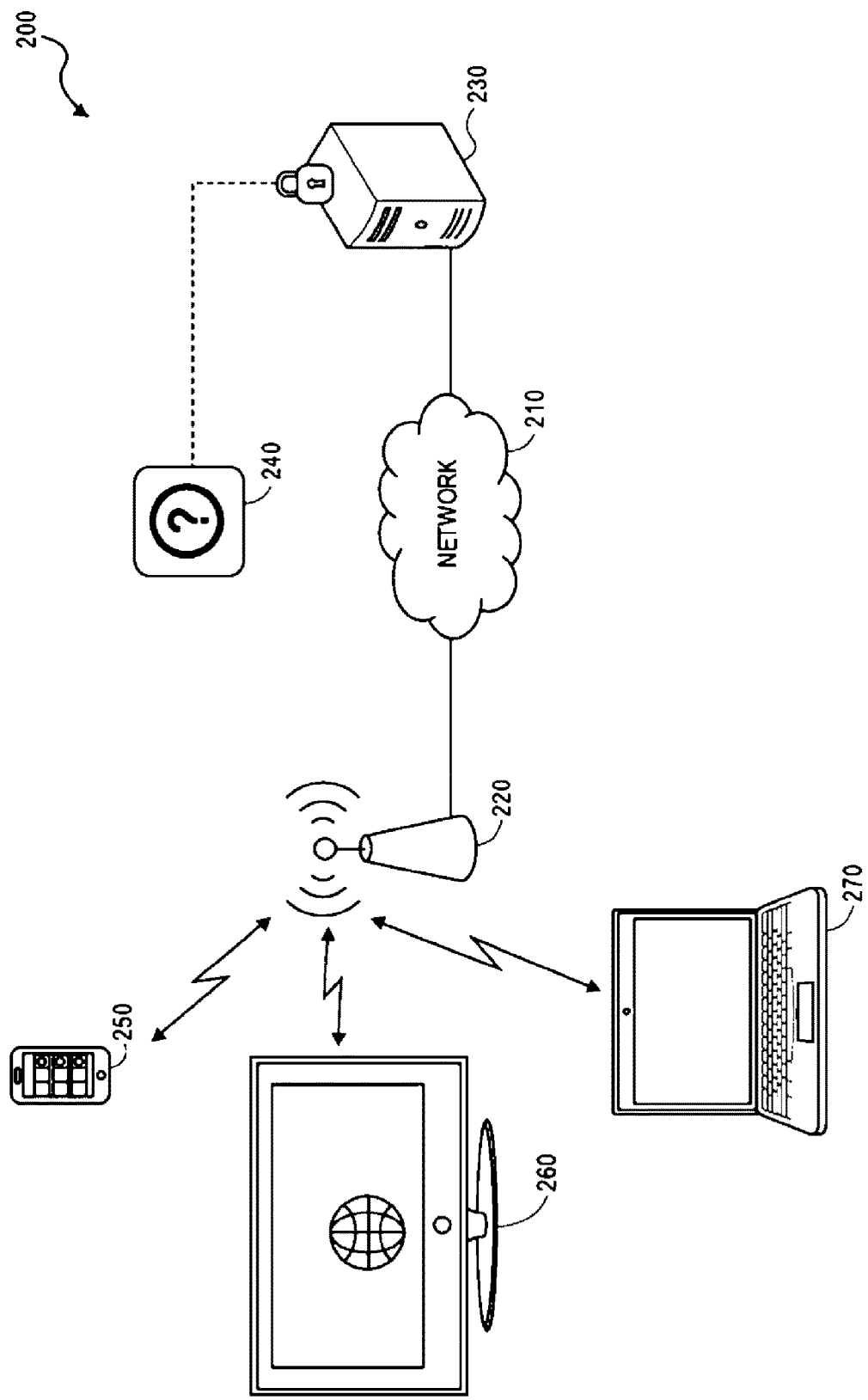
FIG. 2 is a schematic diagram illustrating a network environment in which exposable data associated with computing devices can be accessed by authorized or unauthorized network hosts, according to certain aspects of the present disclosure.

FIG. 2 is a schematic diagram illustrating network environment 200, in which exposable data associated with computing devices can be accessed by authorized or unauthorized network hosts, according to certain aspects of the present disclosure. In some implementations, network environment 200 can include secure server 230, network 210, gateway 220, mobile device 250, smart TV 260, and laptop 270. For example, network environment 200 may be similar to or a more detailed example of home network 130 of FIG. 1. Mobile device 250, smart TV 260, and laptop 270 may be located within a defined proximity, such as within a home or residence. Secure server 230 may be the same as or similar to secure server 140, and thus, further description is omitted here for the sake of brevity. Network 210 may be the same as site network 120 or home network 130 of FIG. 1, and thus, further description is omitted here for the sake of brevity. Network host 240 may be the same or similar to network host 150, and thus, further description is omitted here for the sake of brevity. Gateway 220 may be an access point (e.g., a router) that enables devices, such as mobile device 250, smart TV 260, and laptop 270 to connect to the Internet. FIG. 2 is provided to illustrate how network host 240 can collect exposable data privacy elements from secure server 230 based on routine and seemingly innocuous data communications between devices.

As a non-limiting example, smart TV 260 may be configured to automatically and periodically transmit a signal to secure server 230. The signal may correspond to a request for updates to the software stored on smart TV 260. In this non-limiting example, secure server 230 may be a server that stores software updates or that controls the distribution of software updates to smart TVs like smart TV 260. However, the signal transmitted from smart TV 260 may include data privacy elements that expose information about smart TV 260, gateway 220, and/or network 210. For example, the signal may include a variety of data privacy elements, including, but not limited to, the version of the software currently stored on smart TV 260, the viewing data collected by smart TV 260 (if authorized by the user), the service set identifier (SSID) of gateway 220, a password to connect to gateway 220, login credentials associated with a user profile recently logged into on smart TV 260, information about the hardware or firmware installed in smart TV 260, information about the hardware, firmware, or software recognized to be installed at gateway 220, the physical location of smart TV 260 (e.g., determined using an Internet Protocol (IP) address), applications downloaded by a user on smart TV 260, and/or application usage data. The data privacy elements included in the signal may be stored at secure server 230.

In some cases, if relatively sensitive information is included in the signal, such as viewing data (e.g., accessed video content) recently collected by smart TV 260, secure server 230 may store that sensitive information securely behind protection mechanisms, such as firewalls. However, secure server 230 may be hacked by network host 240. In this scenario, the sensitive information (i.e., the data privacy elements included in the signal and subsequently stored at secure server 230) may be exposed to network host 240.

In some cases, if relatively innocuous information is included in the signal, such as the version of software stored on smart TV 260 or the SSID of gateway 220, the information may be stored at secure server 230 without many protection mechanisms, such as firewalls. For instance, secure server 230 may not need to securely store the version of the software currently stored on smart TV 260 because this information may be relatively innocuous. However, network host 240 can access secure server 230, either in an authorized or unauthorized manner, to obtain the exposed data privacy element of the software version. The software version can nonetheless be used maliciously by bad actors because the software version can be exploited to identify vulnerabilities in the software. The identified vulnerabilities can be used to execute a data breach or hacking of smart TV 260, which places at risk the privacy information associated with a user of smart TV 260.

FIG. 2 illustrates the problem of data privacy elements being exposable to other hosts, such as servers, hackers, websites, or authorized users, during an interaction between devices, such as smart TV 260 and secure server 230. Exposable data privacy elements can be exploited by unauthorized hosts, such as hackers, to determine vulnerabilities that can be exploited to attack a network or an individual device. Further, exposable data privacy elements can also be exploited by authorized hosts, such as a website, to profile users based on online activity; however, this profiling can create risks of private information being exposed.

Figure 3B:
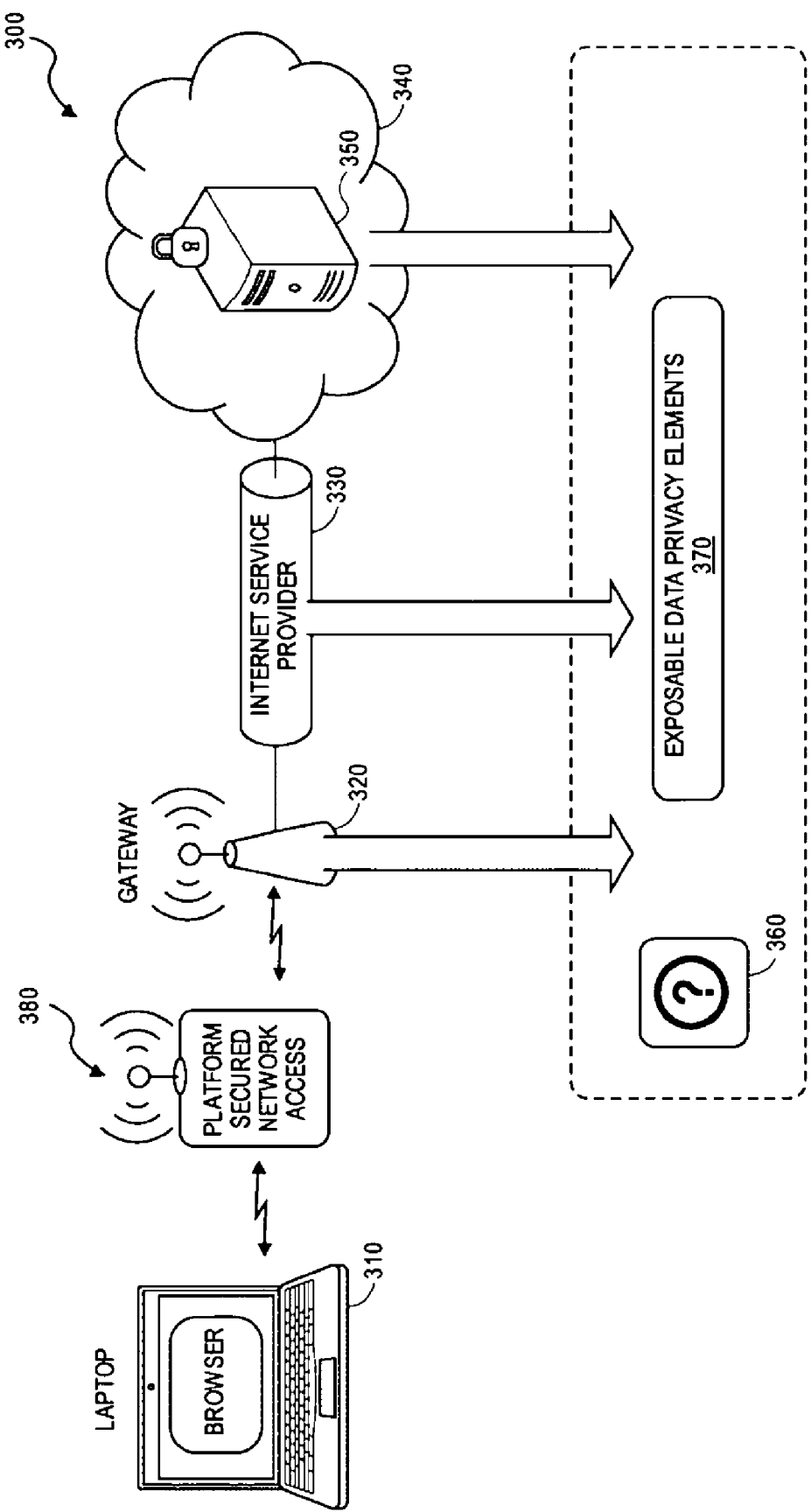
FIG. 3B is a schematic diagram illustrating the network environment of FIG. 3A with the addition of platform-secured network access that isolates the communication, according to certain aspects of the present disclosure.
Figure 4A:
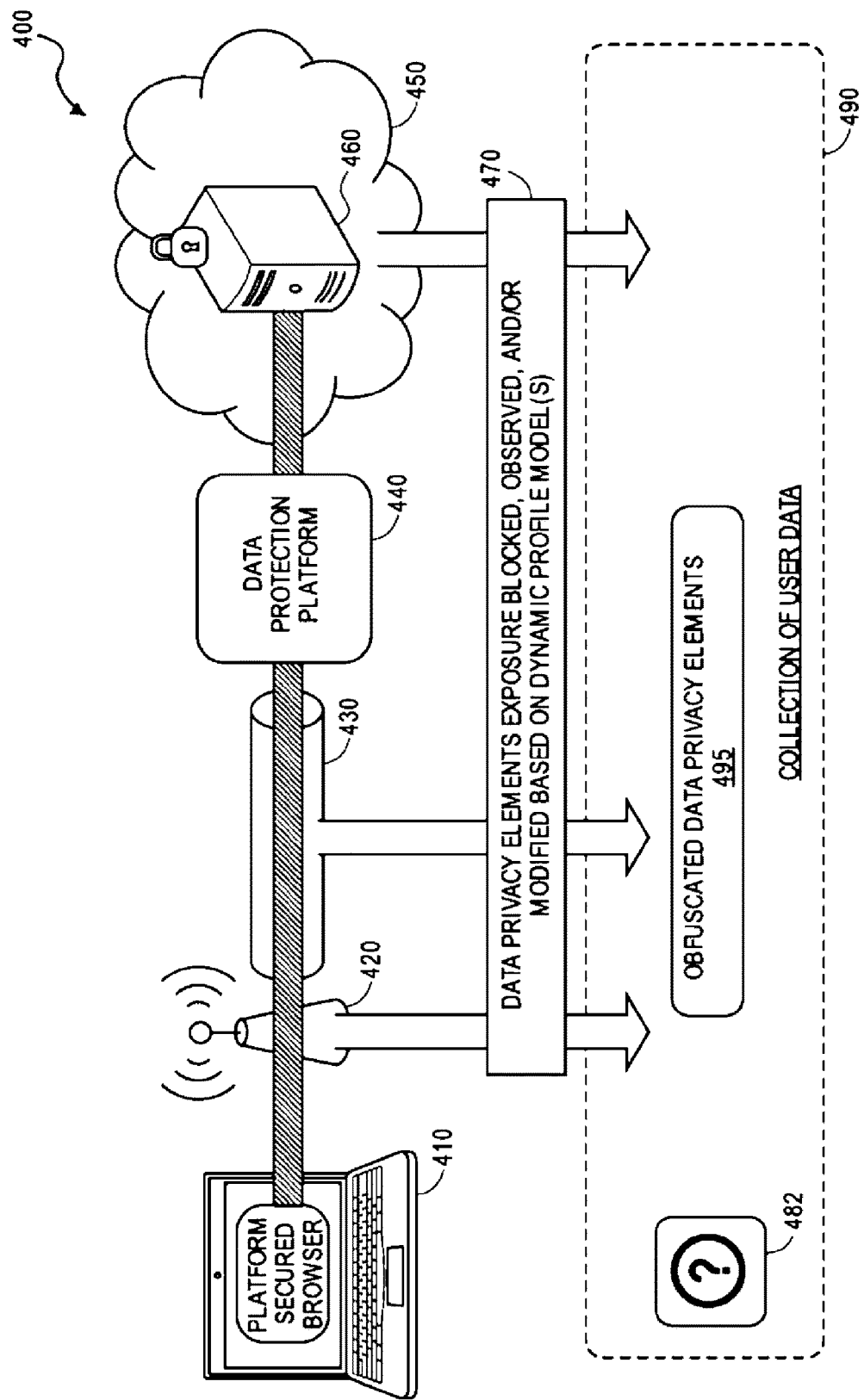
FIG. 4A is a schematic diagram illustrating the network environment of FIG. 3A with the addition of a data protection platform that blocks, modifies, or observes exposable data, according to certain aspects of the present disclosure.
Figure 4B:
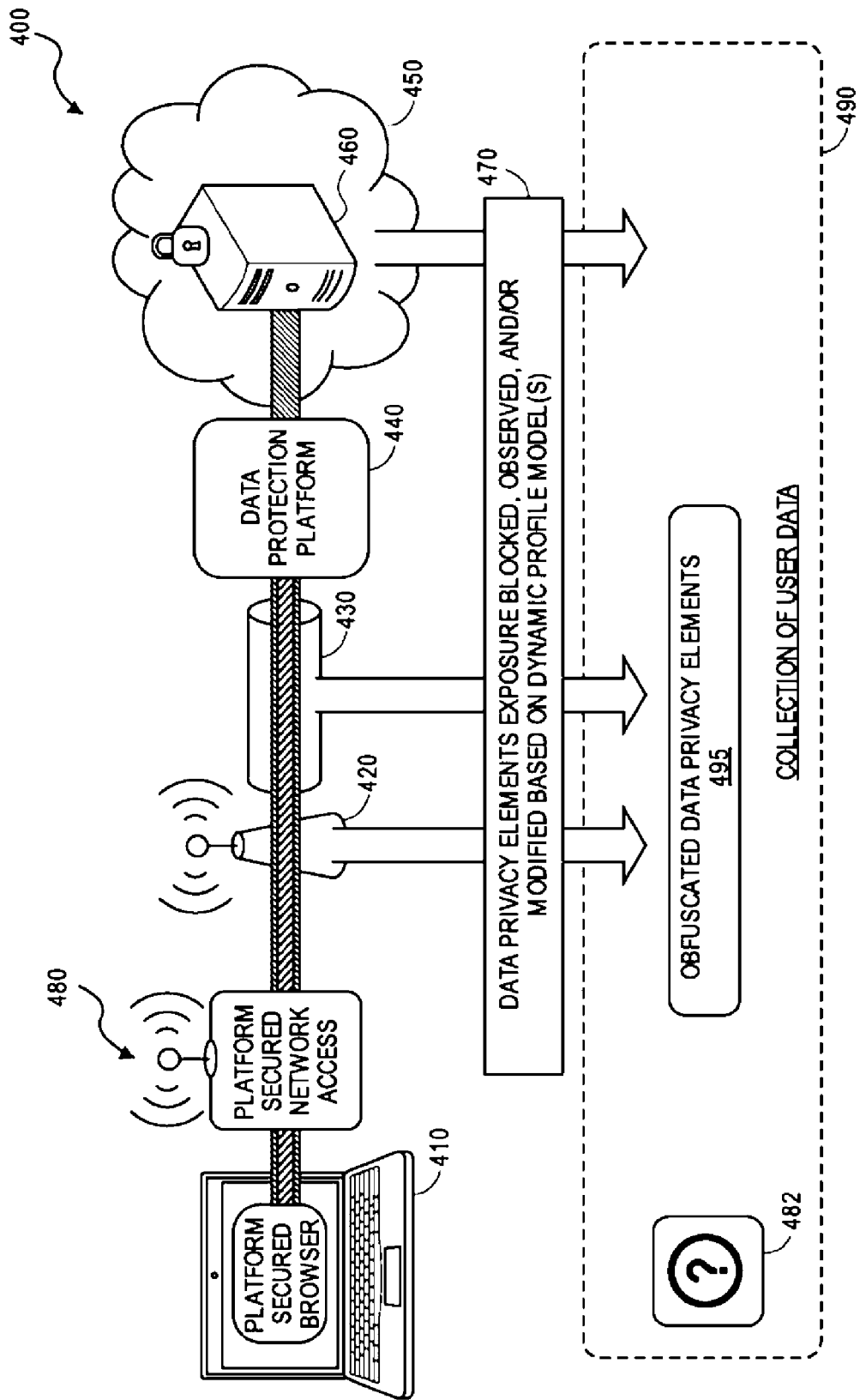
FIG. 4B is a schematic diagram illustrating the network environment of FIG. 3A with the addition of a data protection platform that blocks, modifies, or observes exposable data, and platform-secured network access that isolates the communication, according to certain aspects of the present disclosure.

FIG. 3A is a schematic diagram illustrating network environment 300, in which exposable data can be accessed by authorized network hosts (e.g., a web server hosting a webpage, an application server hosting an application, and so on) or unauthorized network hosts (e.g., a hacker) at various stages of a browsing session. FIG. 3B is a schematic diagram illustrating the network environment of FIG. 3A with the addition of platform-secured network access 380 that isolates the communication, according to certain aspects of the present disclosure. Further, FIGS. 4A and 4B are schematic diagrams illustrating network environment 400, which is similar to network environment 300, but with the addition of an exemplary data protection platform 440 that controls the exposure of data privacy elements to block or obfuscate private information from being exposed, according to certain embodiments. Additionally, FIG. 4D is a diagram illustrating example components of a device capable of implementing platform-secured network access for isolating a communication.

Referring again to FIG. 3A, network environment 300 can include laptop 310, gateway 320, ISP 330, network 340, and secure server 350. A browser can be running on laptop 310. The browser can enable a user operating laptop 310 to communicate with secure server 350 through network 340. However, as the browser running on laptop 310 interacts with secure server 350, exposable data privacy elements 370 can be collected at various devices connected to the Internet. For example, gateway 320, ISP 330 can store one or more data privacy elements that can expose information about laptop 310 because laptop 310 communicates with gateway 320 and ISP 330 to connect with secure server 350. While the exposable data privacy elements 370 can be collected at gateway 320, ISP 330, or secure server 350 (e.g., by network host 360), gateway 320, ISP 330, and secure server 350 may or may not be the source of the exposable data privacy elements. For example, the browser running on laptop 310 can expose certain information about the Operating System (OS) installed on laptop 310, but that OS information may be collected by a web server when the web server queries the browser, or when network host 360 accesses the OS information in an unauthorized manner (e.g., by hacking the web server to gain access to the stored OS information).

Referring again to FIG. 3B, in some implementations, network environment 300 can also include a platform-secured network element 380. The platform-secured network element 380 can be a device or a software method that can isolate information (e.g., negotiation information) and protect a resulting communication flow from exploitation or discovery. The systems and methods described herein can be used to isolate and protect a communication flow incorporating known communication methods or protocols (e.g., Wi-Fi, cellular, Bluetooth, Ethernet, etc.), as well as any future protocols performing a same or similar function.

In some implementations, platform-secured network element 380 can isolate or abstract a connection negotiation from an end user's device (e.g. laptop 310), and ensure that a tunnel is established before allowing communications over a communication path. For example, when a captive portal is passed directly to a user's laptop (e.g., laptop 310), the user would be asked to agree to terms of service before network connectivity was enabled. This action can expose a user's laptop to potential exploit by a malicious network operator or malicious code on a captive portal. The captive portal, for example, can generally have direct access to laptop 310 via the laptop's browser, native network management interface, etc. and access point 320 can have direct access to the end user's networking stack.

Figure 4C:
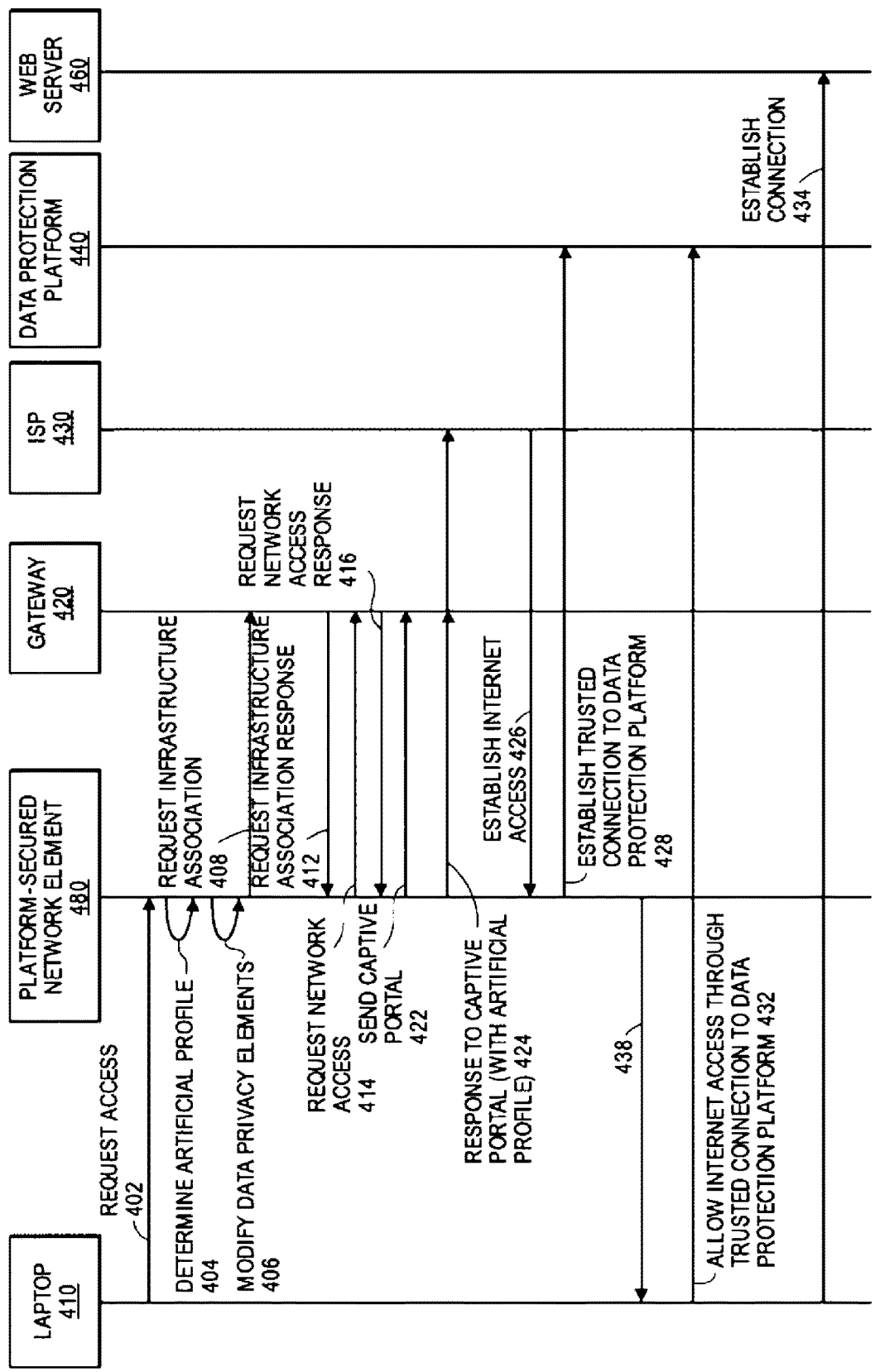
FIG. 4C is a sequence diagram illustrating an example process for enabling a captive portal while protecting data privacy elements, according to certain aspects of the disclosure.
Figure 4D:
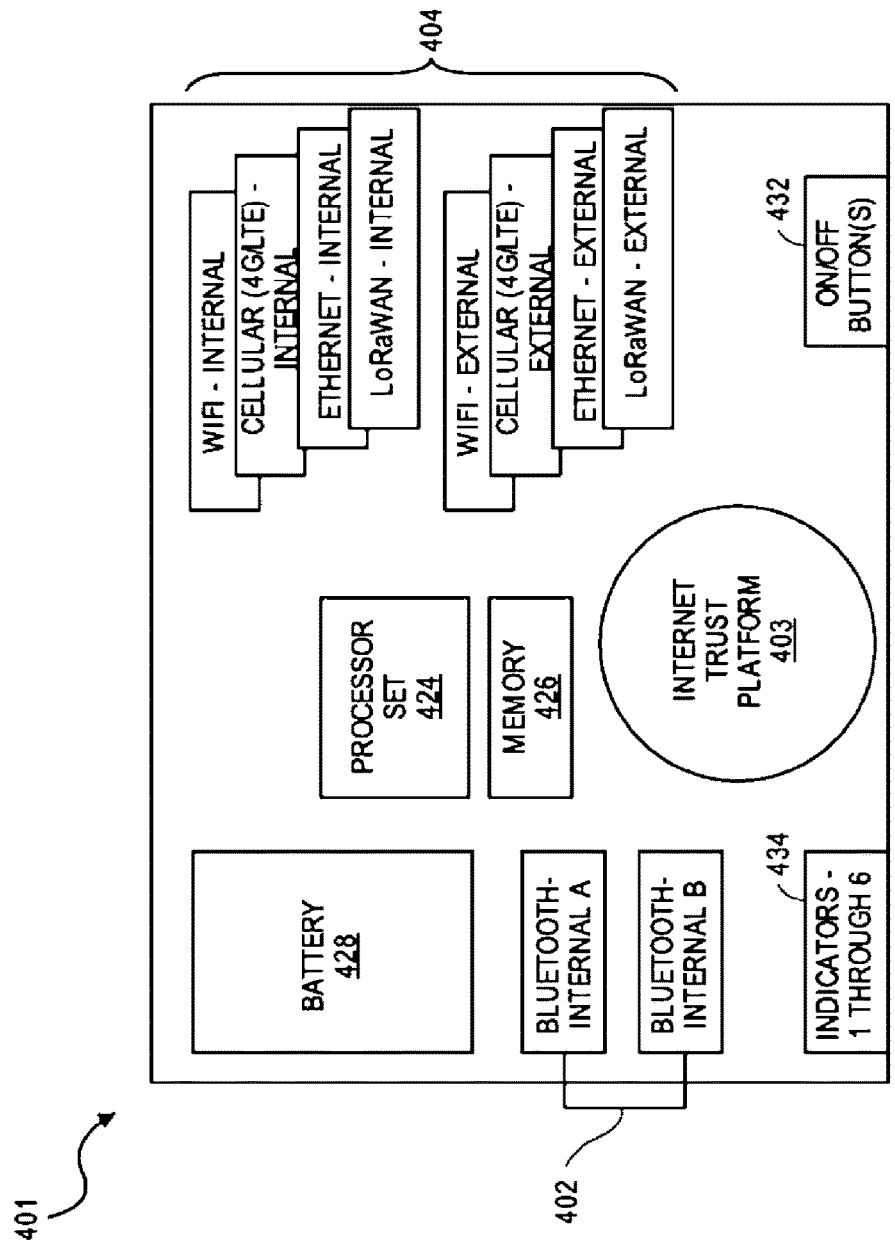
FIG. 4D is a diagram illustrating example components of a device capable of implementing platform-secured network access for isolating a communication.

The platform-secured network element 380 can enable a captive portal without exposing a user's computing device (e.g. laptop) or other information about the user's computing environment (discussed in more detail in FIG. 4C). The captive portal can be rendered on the platform-secured network element 380 and delivered to the laptop 310, which can prevent the captive portal (or other related hardware) from discovering actual user privacy information from laptop 310. In some embodiments, once the captive portal is successfully navigated, a tunnel can be established and then data can be allowed to flow through the platform-secured network element 380 to a remote connection, with the tunnel protecting the activity and privacy information of a user using laptop 310.

Referring again to FIG. 4A, in some implementations, the addition of data protection platform 440 into network environment 300 (as represented by network environment 400), can control the exposure of data privacy elements as laptop 410 navigates the Internet. In FIG. 4A, gateway 420 may be the same as or similar to gateway 320, ISP 430 may be the same as or similar to ISP 330, network 450 may be the same as or similar to network 340, and secure server 460 may be the same as or similar to secure server 350, and thus, a description of these devices is omitted for the sake of brevity. In some implementations, data protection platform 440 can provide a platform-secured browser for laptop 410. As the user navigates the Internet using the platform-secured browser, data protection platform 440 can block, modify, and/or observe the data privacy elements (e.g., at block 470) that are exposed to devices across the Internet.

Continuing with the example described in FIG. 4A, when a web server queries the platform-secured browser, the data protection platform 440 can block the OS information from being provided to the web server. As another example, the data protection platform 440 can modify the OS information (e.g., using an artificial dynamic model profile), and provide the modified OS information to the web server. According to certain embodiments, network host 482 may collect artificial exposable data privacy elements 495 at block 490, however, the collected data privacy elements obfuscate the actual information about the user operating system, the platform-secured browser, or laptop 410 itself. Advantageously, the collected exposable data privacy elements 495 would not expose any real vulnerabilities of laptop 410.

As noted above in FIG. 4A, the browser running on laptop 410 can interact with secure server 460, and exposable data privacy elements 470 can be collected at various devices connected to the Internet. As noted above, gateway 420 and ISP 430 can store one or more data privacy elements that can expose information about laptop 410 because laptop 410 communicates with gateway 420 and ISP 430 to connect with secure server 460. FIG. 4B illustrates the addition of a platform-secured network element 480 that in some implementations, can protect a communication flow from exploitation or discovery (as noted above). For example, as shown in FIG. 4B, platform-secured network element 480 can be added into network environment 400 at a point between laptop 410 and gateway 420. The location of the platform-secured network element 480 between laptop 410 and gateway 420, being at the initial point of network connection to Wi-Fi/Ethernet/etc., enables the platform-secured network element 480 to identify data privacy elements 470, determine an artificial profile associated with one or more dependencies, and then modify data privacy elements 470 in accordance with the artificial profile before traffic from laptop 410 leaves its local network.

It will be appreciated that platform-secured network element 480 can be added or inserted at other points within network environment 400, as long as the platform-secured network element 480 is added or inserted within network environment 400 such that it protects a communication flow from exploitation or discovery (e.g., protects laptop 410 and exposable data privacy elements 470 from exposure).

FIG. 4C is a diagram illustrating an example process for enabling a captive portal while protecting data privacy elements, according to certain aspects of the disclosure, and can include elements similar to the network environments included in FIGS. 3B, 4A, and 4B. For example, when connecting to the Wi-Fi within a location (e.g., such as a coffee shop or other public space), there is often a requirement to accept the Terms of Service associated with the public space, such as through a captive portal. To prevent the exposure of data privacy elements, the platform-secured network element 480 can respond to the captive portal using an artificial profile.

For example, in some embodiments, laptop 410 can send a request 402 to access a web page. In response, the platform-secured network element 480 can determine an artificial profile (404) and then can modify data privacy elements (e.g., in accordance with the artificial profile (406)). In these embodiments, the platform-secured network element 480 can then request infrastructure association (408) from gateway 420. After the platform-secured network element 480 receives a response (412) to the infrastructure association request from gateway 420, the platform-secured network element 480 can then request (414) network access from gateway 420. The platform-secured network element 480 can, for example, receive the response (416) from gateway 420, as well as the associated captive portal (422).

For security reasons, the captive portal can be problematic. For example, in some embodiments the captive portal can be delivered from infrastructure out of the user's control. In these embodiments, the platform-secured network element 480 can intermediate the captive portal by intercepting and preventing privacy information exchange between gateway 420 and laptop 410. It can do so by, for example, responding to the captive portal with the modified information based on the artificial profiles generated by the artificial profile models. The response can be sent to gateway 420 and/or ISP 430, ensuring that privacy information associated with laptop 410 never reaches gateway 420 and/or ISP 430 without being modified in accordance with the generated artificial profile(s).

Once gateway 420 and/or ISP 430 receives the response to the captive portal from the platform-secured network element 480, in these embodiments internet access can be established (426) between ISP 430 and the platform-secured network element 480. In response, this can establish (428 and 438) a trusted connection to the data protection platform 440 and to laptop 410. Internet access (432) can then be allowed through the trusted connection from laptop 410 to the data protection platform 440, and a connection (434) can be established between laptop 410 and web server 460.

FIG. 4D is a diagram illustrating example components of a device 401 capable of implementing platform-secured network access for isolating a communication. The device 401 can be a standalone device, embedded within a device in laptop 410's network (e.g., any device between laptop 410 and gateway 420), or an application deployed and/or stored within a cloud network environment. This allows device 401 to be portable and flexible across many different locations and to be scalable to any type of network (e.g., from personal networks to enterprise networks, etc.). For example, the device 401 can be used to provide a "secured" connection point (e.g., Wi-Fi hotspot, Ethernet) in one or more locations for travel (e.g., any place in the world), scaled for a single location (e.g., home or office), or used as an enterprise solution for network isolation or signature management. In some implementations, the device 401 can include multiple components such as, multiple hardware communication components (e.g., Bluetooth connections 402), a network negotiation isolation platform (e.g., Internet Trust Platform ("ITP") 403), a communication isolation platform, and a communication interface moving target defense platform (e.g., Wi-Fi, Cellular, Ethernet, LoRaWAN network 404). These communication components may advantageously convert between or among communication protocols to affect the signature of the communications (e.g., Wi-Fi monitoring/eavesdropping would have reduced visibility to connections through an access point as the platform may multiplex connections to a hotspot over a single connection such as acting as a bridge/router/hotspot itself), to move traffic from a congested protocol (e.g., conference center with too many 802.11b/g/n wireless connections present resulting in signal congestion and reduced performance or increased latency) to a less congested protocol (e.g., Ethernet, LoRaWAN).

In some implementations, device 401 can be embedded within laptop 410, where multiple hardware communication components can physically separate laptop 410's communications from other functions of the laptop 410, thereby shielding laptop 410 from being exposed or tampered with. According to some embodiments, the multiple hardware communication components can be used to internally isolate the device. Specifically, the multiple hardware communication components can be used to physically separate the communication of the device from other functionalities of the device. This separation can prevent compromise of the communication stream and also enable one-way or software-controlled data diode. In these implementations, a Bluetooth protocol, or any other protocol can be used.

To prevent an attack from happening, an ITP on device 401 can isolate the acceptance of the terms of service process (or any content delivered through the captive portal-like mechanism) away from the user computing device. For example, in some implementations, a network negotiation isolation platform can enable the negotiation and data input to establish external network connections while isolating the user computing device from dirty, unsafe, or unknown network threats (e.g., FIG. 4C). In these implementations, the negotiation and isolation can be enabled by device 401 using a same or similar ITP that protects Data Privacy Elements. For example, when connecting to the Wi-Fi within a public space (e.g., a coffee shop), there is often a requirement to accept the Terms of Service associated with the public space, through a captive portal. Even accessing the page to accept these terms of service can expose data privacy elements and facilitate an attack on a user computing device—regardless of whether the terms were accepted or not. To prevent an attack from happening, an ITP on device 401 can isolate the acceptance of the terms of service process (or any content delivered through the captive portal-like mechanism) away from the user computing device.

In some implementations, a communication isolation platform can utilize one or more transmitters (e.g., in a dual transmitter scenario, one transmitter could be used for negotiating with external, unknown, unsafe, or "dirty" network access, and one transmitter could be used to provide an internal, protected, known, or "clean" network connection), across one or more different physical communication interfaces (e.g., Wi-Fi, Ethernet, cellular). In these implementations, the communication isolation platform can facilitate physical isolation or protection of the user computing device from dirty or unknown network threats. In some implementations, a communication interface moving target defense platform can be used to apply cross-interface routing of communications traffic. In these implementations, the cross-interface routing of communication traffic can alter or defeat a potential compromise of device 401. Moreover, in these implementations, the cross-interface routing of communication traffic can track one or more data privacy elements associated with one or more communication interfaces. The one or more tracked data privacy elements can be stored and/or analyzed for future analysis or decision making, such as analyzed for system performance and to support audit and compliance reporting for compliance with customer industry regulations. The device 401 can further include, but is not limited to, other hardware elements, such as a processor set 424, memory 426, and battery 428, as well as on/off buttons 432 and indicators 434.

Figure 5:
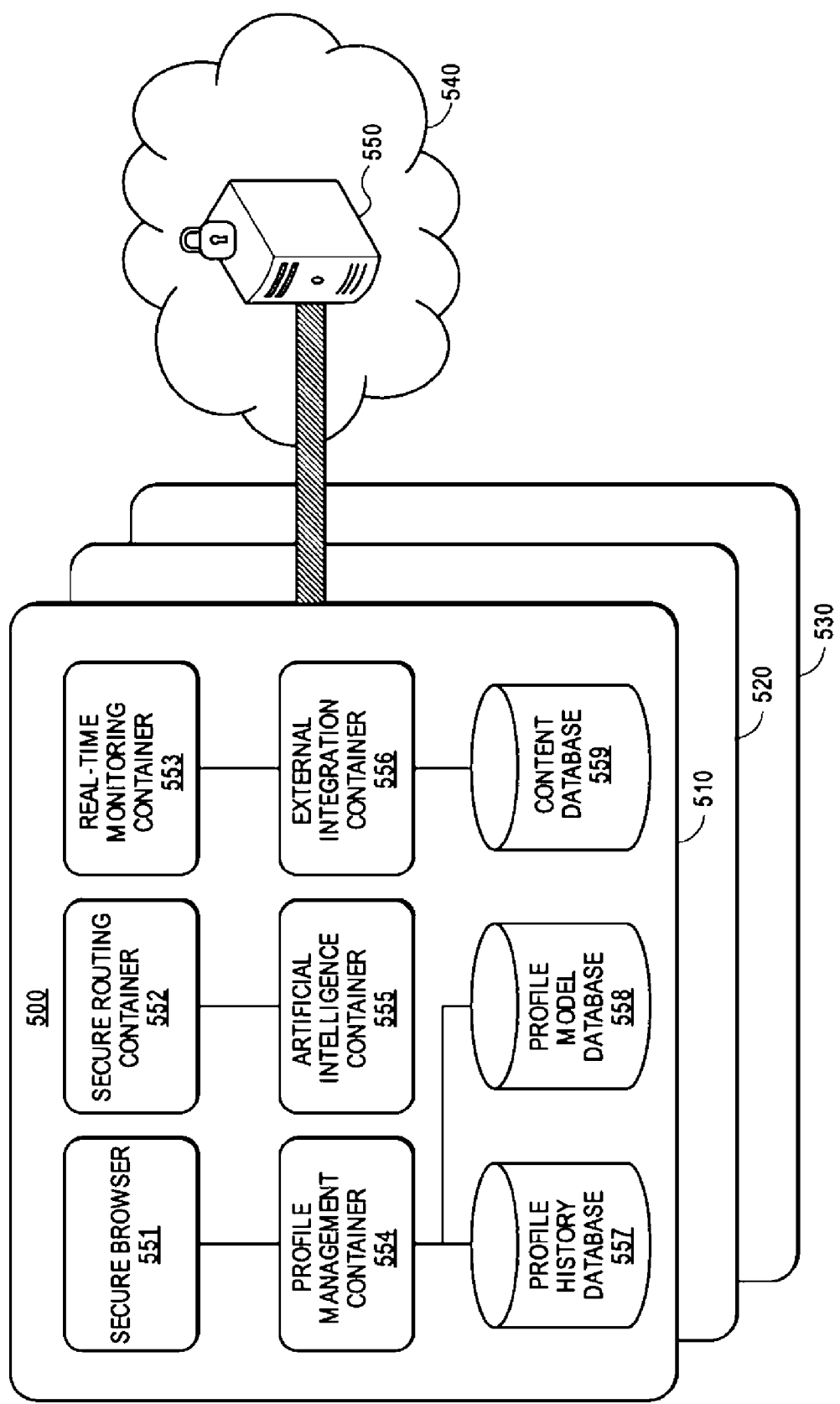
FIG. 5 is a schematic diagram illustrating a data protection platform, according to certain aspects of the present disclosure.

FIG. 5 is a schematic diagram illustrating data protection platform 500, according to certain aspects of the present disclosure. In some implementations, data protection platform 500 may be implemented using cloud-based network 510. For example, data protection platform 500 may be an application that is deployed in cloud-based network 510. Data protection platform 500 in cloud-based network 510 may include an application server (not shown) that is constructed using virtual CPUs that are assigned to or reserved for use by data protection platform 500. Further, data protection platform 500 may be implemented using one or more containers. Each container can control the exposure of data privacy elements. A container may include stand-alone, executable code that can be executed at runtime with all necessary components, such as binary code, system tools, libraries, settings, and so on. However, because containers are a package with all necessary components to run the executable code, the container can be executed in any network environment in a way that is isolated from its environment. It will be appreciated that any number of cloud-based networks can be used to implement data protection platform 500. For example, assuming data protection platform 500 is implemented using a set of containers, a subset of the set of containers can be deployed on cloud-based network 510, another subset of the set of containers can be deployed on cloud-based network 520, another subset of the set of containers can be deployed on cloud-based network 530, and so on. It will also be appreciated that data protection platform 500 may or may not be implemented using a cloud-based network.

Referring to the non-limiting example illustration of FIG. 5, data protection platform 500 can include a number of containers that are deployed using cloud-based network 510. For instance, data protection platform 500 can include secure browser 551, secure routing container 552, real-time monitoring container 553, profile management container 554, AI container 555, external integration container 556, profile history database 557, profile model database 558, and content database 559. Further, data protection platform 500 may control the exposure of data privacy elements that are exposable during a browsing session between a computing device (e.g., laptop 410 of FIG. 4A) and secure server 550 on network 540.

In some implementations, secure browser 551 may be a container that includes executable code that, when executed, provides a virtual, cloud-based browser to the computer device. For example, the platform-secured browser running on laptop 410 shown in FIG. 4A may be provided by the data protection platform 500 using secure browser 551. In some implementations, secure routing container 552 may be a container that includes executable code that, when executed, provides the computing device with a virtual private network (VPN) to exchange communications between the computing device and the data protection platform 500. Secure routing container 552 can also facilitate the routing of communications from the computing device or from any container within data protection platform 500 to other devices or containers internal or external to data protection platform 500. For example, if data protection platform 500 is implemented across several cloud-based networks, then secure routing container 552 can securely route communications between containers across the several cloud-based networks. Real-time monitoring container 553 can be a container including executable code that, when executed, monitors the exposable data privacy elements associated with a browsing session in real-time. For example, if a computing device connects with a web server to access a search engine website, real-time monitoring container 553 can monitor the user input received at the search engine website as the user types in the input. In some implementations, real-time monitoring container 553 can control the exposure of behavioral/real-time attribution vectors (e.g., attribution vectors 730, which are described in greater detail with respect to FIG. 7). For example, real-time monitoring container 553 may modify the input dynamics of keystroke events, as described in greater detail with respect to FIG. 9.

Profile management container 554 can include executable code that, when executed, controls or manages the artificial profiles that have been created and stored. For example, profile management container 554 can use artificial intelligence (e.g., Type II Limited Memory) provided by AI container 555 to generate a new artificial profile based on the artificial profile model (e.g., artificial profile model 700 described in greater detail with respect to FIG. 7) and/or administrator entered constraints (e.g., region, demographic, protection level requirements) to ensure that newly created or modified artificial profiles are compliant with previously generated profiles stored in the profile history database 557. AI container 555 can include executable code that, when executed, performs the one or more machine-learning algorithms on a data set of all available data privacy elements to generate the artificial profile model. The generated artificial profile model can be stored at profile model database 558. Further, external integration container 556 can include executable code that, when executed, enables third-party systems to integrate into data protection platform 500. For example, if an organization seeks to use data protection platform 500 to control the exposure of data privacy elements for all employees of the organization, external integration container 556 can facilitate the integration of the third-party systems operated by the organizations. Content database 559 may store content data associated with browsing sessions in a content file system. For example, if during a browsing session between a computing device and a web server, the user operating the browser determines that content data should be stored from the web server, that content data can be stored in content database 559 and the content file system can be updated.

It will be appreciated that data protection platform 500 may include any number of containers to control the exposure of data privacy elements during webpage or application navigation. It will also be appreciated that data protection platform 500 is not limited to the use of containers to implement controlling data privacy elements. Any other system or engine may be used in data protection platform 500 to implement controlling data privacy elements, in addition to or in lieu of the use of containers.

Figure 6:
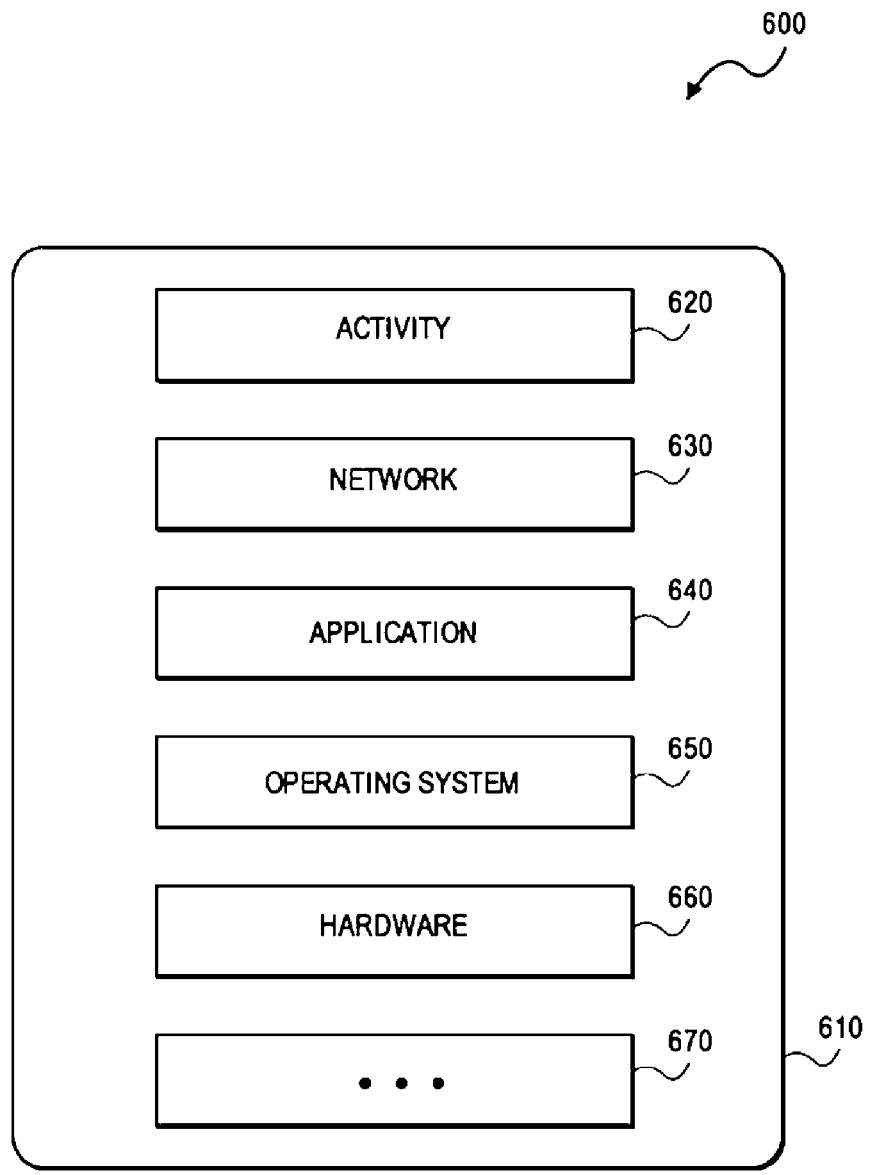
FIG. 6 is a block diagram illustrating a non-exhaustive set of data privacy elements that can be exposed to network hosts.

FIG. 6 is a block diagram illustrating non-limiting example 600, which includes a non-exhaustive set 610 of data privacy elements that can be exposed to network hosts or any other device within a network. FIG. 6 is provided to describe in greater detail the various data privacy elements associated with a particular browser, computing device, or network. For example, non-exhaustive set 610 includes the various data privacy elements that can be exposed to network hosts during online activity performed by a computing device, such as computing device 310 of FIG. 3A. Further, the data privacy elements included in non-exhaustive set 610 may also be collected while the computing device is not browsing the Internet or interacting with an application. For example, even though the computing device may not currently be accessing the Internet, one or more data privacy elements may nonetheless be stored at a gateway, an ISP server, or a secure server on the Internet. The stored one or more data privacy elements may have been collected during a previous interaction with the computing device. In this example, the stored one or more data privacy elements are still exposed because a network host can access the stored one or more data privacy elements even while the computing device is not currently accessing the Internet.

In some implementations, non-exhaustive set 610 may include data privacy elements 620, which are related to the online activity of a user. Non-limiting examples of the activity of a user may include any interaction between user input devices and a browser (e.g., the user entering text into a website using a keyboard), the browser and a web server (e.g., the browser requesting access to a webpage by transmitting the request to a web server, the search history of a browser, the browsing history of a browser), the browser and an application server (e.g., the browser requesting access to an application by transmitting the request to the application server), the browser and a database server (e.g., the browser requesting access to one or more files stored at a remote database), the browser and the computing device on which the browser is running (e.g., the browser storing data from a cookie on the hard drive of the computing device), the computing device and any device on a network (e.g., the computing device automatically pinging a server to request a software update), and any other suitable data representing an activity or interaction. In some implementations, data privacy elements 620 may also include a detection of no activity or no interactions during a time period, for example, a period of time of no user interaction or user activity.

In some implementations, data privacy elements 620 may include information about input received at a browser, but that was not ultimately transmitted to the web server due to subsequent activity by the user. For example, if a user types in certain text into an input field displayed on a webpage, but then deletes that text without pressing any buttons (e.g., a "send" button), that entered text may nonetheless be an exposable data privacy element that can reveal information about the user, even though that entered text was never transmitted to a web server. It will be appreciated that the present disclosure is not limited to the examples of data privacy elements 620 described herein. Other data privacy elements related to a user's activity or non-activity that are not mentioned here, may still be within the scope of the present disclosure.

In some implementations, non-exhaustive set 610 may include data privacy elements 630, which are related to information about networks and/or network configurations. Non-limiting examples of information about a network may include a network topology (e.g., how many web servers, application servers, or database servers are included in the network, and how are they connected); network security information (e.g., which Certificate Authorities (CAs) are trusted, which security protocols are used for communicating between devices, the existence of any detected honeypots in the network, and so on); the versions of security software used in the network; the physical locations of any computing devices, servers, or databases; the number of devices connected to a network; the identify of other networks connected to a network; the IP addresses of devices within the network; particular device identifiers of devices, such as a media access control (MAC) address; the SSID of any gateways or access points; the number of gateways or access points; and any other suitable data privacy element related to network information. Network hosts can evaluate data privacy elements 630 to identify and exploit vulnerabilities in the network. It will be appreciated that the present disclosure is not limited to the examples of data privacy elements 630 described herein. Other data privacy elements related to a network that are not mentioned here, may still be within the scope of the present disclosure.

In some implementations, non-exhaustive set 610 may include data privacy elements 640, which are related to information about applications stored on the computing device or accessed by the computing device. Non-limiting examples of application information may include an identity of one or more applications installed on the computing device; an identify of one or more applications accessed by the computing device (e.g., which web applications were accessed by the computing device); a software version of one or more applications installed on the computing device; an identity of one or more applications that were recently or not recently uninstalled from the computing device; the usage of one or more applications installed on the computing device (e.g., how many times did the user click or tap on the execution file of the application); whether an application is a native application stored on a mobile device or a web application stored on a web server or application server; an identity of one or more applications that are active in the background (e.g., applications that are open and running on the computing device, but that the user is not currently using); an identify of one or more applications that are currently experiencing user interaction; the history of software updates of an application; and any other suitable data privacy element relating to applications. It will be appreciated that the present disclosure is not limited to the examples of data privacy elements 640 described herein. Other data privacy elements related to an application that are not mentioned here, may still be within the scope of the present disclosure.

In some implementations, non-exhaustive set 610 may include data privacy elements 650, which expose information about the OS installed on the computing device. Non-limiting examples of OS information may include an identity of the OS installed on the computing device; a version of the OS installed on the computing device; a history of the updates of the OS; an identity of a destination server with which the computing device communicated during any of the updates; an identification of patches that were downloaded; an identification of patches that were not downloaded; and identification of updates that were downloaded, but not properly installed; system configurations of the OS; the settings or the hardware-software arrangement; system setting files; activity logged by the OS; an identity of another OS installed on the computing device, if more than one; and any other suitable data privacy element relating to the OS currently installed or previously installed on the computing device. It will be appreciated that the present disclosure is not limited to the examples of data privacy elements 650 described herein. Other data privacy elements related to the OS that are not mentioned here, may still be within the scope of the present disclosure.

In some implementations, non-exhaustive set 610 may include data privacy elements 660, which expose information about the hardware components of the computing device. Non-limiting examples of hardware information may include an identity of the various hardware components installed on the computing device; an identify of any firmware installed on the computing device; an identity of any drivers downloaded on the computing device to operate a hardware component; configuration settings of any hardware component, firmware, or driver installed on the computing device; a log of which external hardware devices have been connected to the computing device and which ports were used (e.g., Universal Serial Bus (USB) port); the usage of a hardware component (e.g., the CPU usage at a given time); an identify of any hardware components that are paired with the computing device over a short-range communication channel, such as Bluetooth (e.g., has the computing device connected to a smart watch, a virtual-reality headset, a Bluetooth headset, and so on); and any other data privacy elements that relate to hardware information. It will be appreciated that the present disclosure is not limited to the examples of data privacy elements 660 described herein. Other data privacy elements related to the hardware components of the computing device or other associated devices (e.g., a virtual-reality headset) that are not mentioned here, may still be within the scope of the present disclosure.

It will also be appreciated that non-exhaustive set 610 may also include data privacy elements 670 that are not described above, but that are within the scope of the present disclosure. For example, data privacy elements 670 may further include information related to communications activity, such as communications transmitted to or received at a computing device. For example, and without limitation, messages, packets, or other data sent over a network may include data privacy elements related to the source of the data, the destination of the data, routing information for the data, checksums (or other error detection feature), length information, options, flags, and various other pieces of information, which may be included in a header or similar structured supplemental data. Communication-related data privacy elements may also include timing information related to the communication. For example, a communication may include an absolute or relative timestamp indicating when the communication was sent by a corresponding computing device. As another example, timing information may be related to a response time. For example, timing information may include a delay between when a communication is received at a computing device and a corresponding response by the computing device.

Communication-related data privacy elements may also be outside of a communication protocol or the data exchanged between a computing component and a network host. For example, particular browsers generate DNS queries to detect Internet accessibility. An outside observer (e.g., a network host) may therefore determine that a specific browser is in use on a network based on DNS traffic. Stated differently, a data privacy element may be an out-of-band (e.g., outside of communication between a computing device and a particular network host) or otherwise unrelated communication that nevertheless conveys privacy information.

As yet another example, data privacy elements may also include connection-related activity or lack thereof. For example, repeated opening and closing of connections associated with an IP address may indicate or otherwise cause an observer to conclude that the IP address corresponds to a network address translation (NAT), proxy, or other element that multiplexes or shares traffic from multiple users, significantly devaluing the IP address for identifying a particular user/computing device. In contrast, a lack of such connection activity may indicate that the IP address is instead associated with a single user/computing device. Accordingly, in certain embodiments, artificial profiles intended to obfuscate or mask a computing device and its activity may specify connection-related behavior, such as periodically connecting/disconnecting from certain network resources or devices.

Embodiments of the present disclosure may or may not include overlap between data privacy elements 620, 630, 640, 650, 660, and 670 and may or may not include data privacy elements instead of or in addition to those listed above. Rather, the foregoing data privacy elements 620, 630, 640, 650, 660, and 670 are provided merely as non-limiting examples of data privacy elements. More generally, data privacy elements according to the present disclosure include any data elements that may reveal information (e.g., identity information, configuration information, activity information, etc.) of a computing component.

While FIG. 6 illustrates a non-exhaustive set of data privacy elements that may be exposed by the user, the browser running on the computing device, the computing device itself, or any device that the computing device interacted with, certain embodiments of the present disclosure include generating a model for creating artificial profiles based on the non-exhaustive set 610 of data privacy elements. The model may be generated using one or more machine-learning techniques and/or one or more AI techniques, as described in further detail with respect to FIG. 7.

Figure 7:
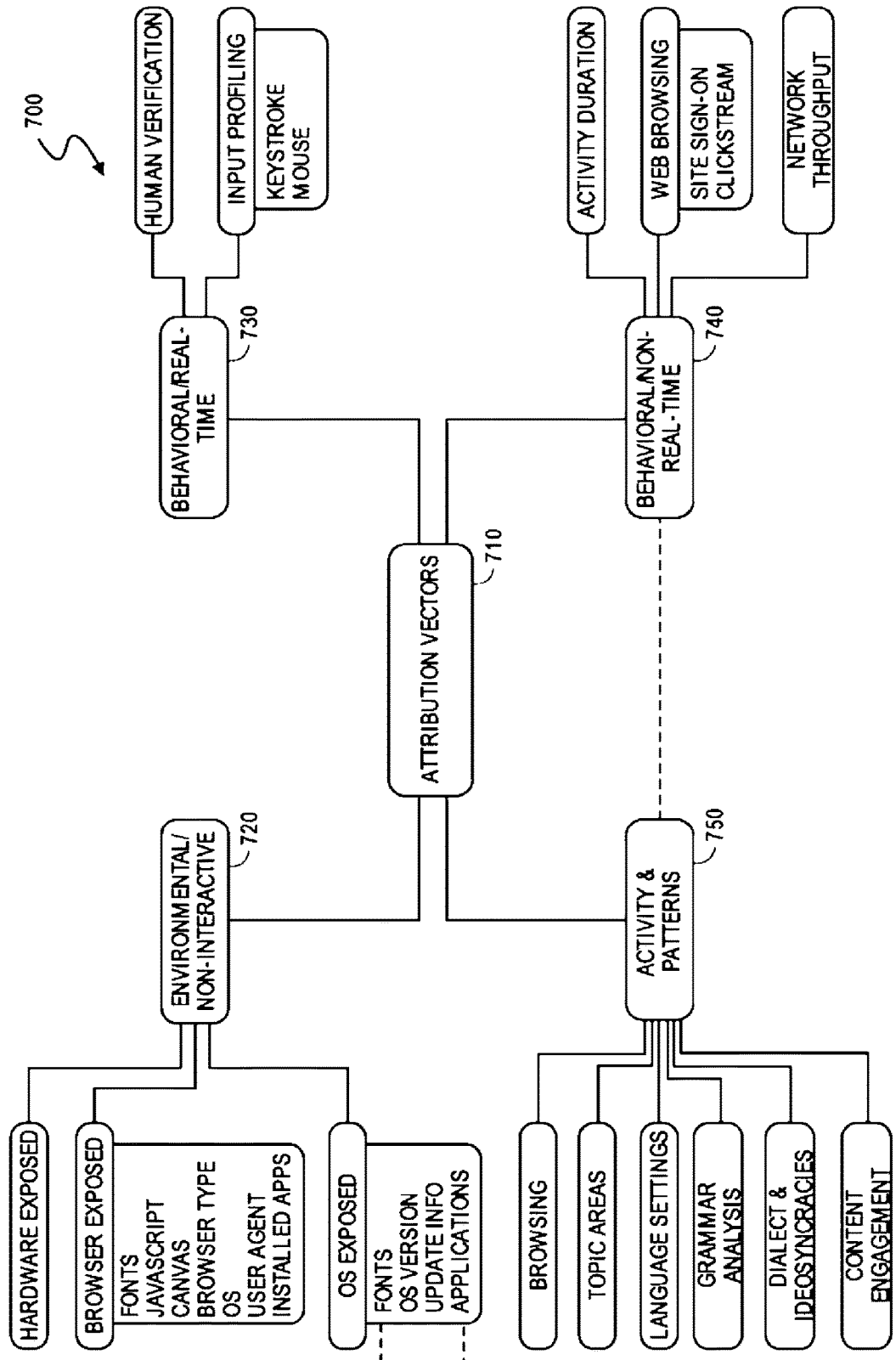
FIG. 7 is a block diagram illustrating an artificial profile model, according to certain aspects of the present disclosure.

FIG. 7 is a block diagram illustrating a non-limiting example of an artificial profile model 700, according to certain aspects of the present disclosure. As described above, certain embodiments provide for generating an artificial profile model, which can be used as the basis for creating artificial profiles for users navigating the Internet. The advantage of using an artificial profile model as the basis for creating or modifying artificial profiles is that the artificial profile model ensures that the newly created or modified artificial profiles are consistent with constraints, relationships and/or dependencies between data privacy elements. Maintaining consistency with the constraints, relationships and/or dependencies that are defined in the artificial profile model makes for more realistic artificial profiles. Further, realistic artificial profiles advantageously decrease the likelihood that a network host will flag an artificial profile as fake, while at the same time obfuscates or blocks information about the user, browser, or computing device.

In some implementations, artificial profile model 700 may be trained by executing one or more machine-learning algorithms on a data set including non-exhaustive set 610 of FIG. 6. For example, one or more clustering algorithms may be executed on the data set including non-exhaustive set 610 to identify clusters of data privacy elements that relate to each other or patterns of dependencies within the data set. The data protection platform can execute the clustering algorithms to identify patterns within the data set, which can then be used to generate artificial profile model 700. Non-limiting examples of machine-learning algorithms or techniques can include artificial neural networks (including backpropagation, Boltzmann machines, etc.), Bayesian statistics (e.g., Bayesian networks or knowledge bases), logistical model trees, support vector machines, information fuzzy networks, Hidden Markov models, hierarchical clustering (unsupervised), self-organizing maps, clustering techniques, and other suitable machine-learning techniques (supervised or unsupervised). For example, the data protection platform can retrieve one or more machine-learning algorithms stored in a database (not shown) to generate an artificial neural network in order to identify patterns or correlations within the data set of data privacy elements (i.e., within non-exhaustive set 610). As a further example, the artificial neural network can learn that when data privacy element #1 (in the data set) includes value A and value B, then data privacy element #2 is predicted as relevant data for data privacy element #1. Thus, a constrain, relationship and/or dependency can be defined between data privacy element #1 and data privacy element #2, such that any newly created or modified artificial profiles should be consistent with the relationship between data privacy elements #1 and #2. In yet another example, a support vector machine can be used either to generate output data that is used as a prediction, or to identify learned patterns within the data set. The one or more machine-learning algorithms may relate to unsupervised learning techniques, however, the present disclosure is not limited thereto. Supervised learning techniques may also be implemented. In some implementations, executing the one or more machine-learning algorithms may generate a plurality of nodes and one or more correlations between at least two nodes of the plurality of nodes. For example, the one or more machine-learning algorithms in these implementations can include unsupervised learning techniques, such as clustering techniques, artificial neural networks, association rule learning, and so on.

In some implementations, the data protection platform can map data privacy elements to a machine-learning model (e.g., artificial profile model 700), which includes a plurality of nodes and one or more correlations between at least two nodes. Based on the mapping and the one or more correlations, the data protection platform can intelligently predict or recommend other data privacy elements that are related to, dependent upon, and/or correlated with data privacy elements included in an existing artificial profile (e.g., in the case of modifying an artificial profile). The execution of the one or more machine-learning algorithms can generate a plurality of nodes and one or more correlations between at least two nodes of the plurality of nodes. Each node can represent a value associated with a data privacy element and correspond to a weight determined by the machine-learning algorithms. In the case of creating new artificial profiles, the data privacy elements included in the newly-created profiles can include a set of data privacy elements that are consistent with any relationships or dependencies identified in artificial profile model 700, and thus, realistic artificial profiles can be created. In the case of modifying existing artificial profiles, the data privacy elements included in the existing artificial profile can be modified in a manner that is consistent with the relationship and dependencies that are identified in artificial profile model 700, and thus, existing artificial profiles can be obfuscated, such that the obfuscated profile would appear to be realistic.

To illustrate and only as a non-limiting example, artificial profile model 700 may be the result of executing one or more clustering algorithms on non-exhaustive set 610. The clustering algorithm may have identified that non-exhaustive set 610 included several distinct groupings or clusters of data privacy elements. For example, the clusters may be identified based on one or more similarities between values of the data privacy elements. In some implementations, the clusters of data privacy elements may be referred to as attribution vectors 710. Further, the clusters of data privacy elements may include environment/non-interactive attribution vector 720, behavior/real-time attribution vector 730, behavioral/non-real-time attribution vector 740, and activity and patterns attribution vector 750. It will be appreciated that any number of attribution vectors or clusters may be determined in artificial profile model 700, and that environment/non-interactive attribution vector 720, behavior/real-time attribution vector 730, behavioral/non-real-time attribution vector 740, and activity and patterns attribution vector 750 are merely non-limiting examples of identifiable clusters of data privacy elements. The present disclosure is not limited to the attribution vectors illustrated in FIG. 7.

Continuing with the non-limiting example, environmental/non-interactive attribution vector 720 may correspond to data privacy elements that are clustered together based on environmental or non-interactive attributes of a computing device or browser. Environmental or non-interactive attributes, in this example, may refer to attributes that are not related or dependent upon a user interaction with a webpage, or that are related to environment attributes of a computer. For example, attribution vectors 720 may include data privacy elements relating to hardware components of a computing device; browser attributes, such as fonts used, browser type, or installed web apps; and OS attributes, such as fonts used by the OS, OS version, information about software updates (e.g., update schedule and IP addresses of update distribution servers), and applications installed in the OS. Additionally, the machine-learning algorithms may have identified patterns in the data privacy elements clustered as environment/non-interactive attribution vectors 720. For example, the dashed line between "hardware" and "browser" in FIG. 7 indicates that the hardware information is relevant data for the browser information (e.g., the types of browsers that can be downloaded on the computing device are constrained by the hardware information). As another example, the dashed line between "fonts" and "applications" in FIG. 7 indicates that the data privacy elements relating to the fonts available in the OS are correlated or dependent on the applications installed in the OS.

In some implementations, behavioral/real-time attribution vector 730 may correspond to data privacy elements that are clustered together based on real-time attributes of a user input (e.g., input or keystroke dynamics of user input received at a browser). Behavioral real-time attributes, in this example, may refer to attributes that are related to or dependent upon real-time user interaction with a webpage, such as mouse movements, mouse clicks, or text inputs. For example, attribution vectors 730 may include data privacy elements relating to input profiling based on keystroke events and/or mouse movements. Input profiling will be described in greater detail below with respect to FIG. 9. Data privacy elements relating to real-time input can be exposed to network hosts and exploited to reveal information about the user.

In some implementations, behavior/non-real-time attribution vector 740 may correspond to data privacy elements that are clustered together based on non-real-time attributes of a user input. Behavioral non-real-time attributes, in this example, may refer to attributes that are determined based on aggregated information from previous online activity performed by the user. For example, attribution vectors 740 may include data privacy elements relating to the average duration of activity on webpages, a bounce rate indicating an average time spend on a webpage before navigating away from the webpage, statistics about clickstream data, and other suitable non-real-time attributes of user input. Attribution vectors 730 and 740 differ in that the data privacy elements relating to attribution vector 730 are based on in-the-moment text input or mouse movements, whereas, data privacy elements relating to attribution vector 740 are based on an evaluation of aggregated data associated with user input.

In some implementations, activity and patterns attribution vector 750 may correspond to data privacy elements that are clustered together based on the content of user input. Activity and patterns attributes, in this example, may refer to attributes that are determined based on the content of the input entered into a browser by a user. For example, attribution vectors 750 may include a data privacy element that exposes the browsing history of the user, the dialect or idiosyncrasies used by the user, the user's engagement with content (e.g., tapping or clicking on advertisement content), and/or any other suitable activity- or pattern-based data privacy elements.

It will be appreciated that artificial profile models may be used by data broker companies (e.g., in an advertising context), while still protecting user privacy. As a non-limiting example and for illustrative purposes only, a user of the data protection platform may utilize a profile to interact with another user or party. Through a trust relationship with that other user or party, the user may select which data privacy elements to expose to the other user or party. As non-limiting examples, the selected data privacy elements can be exposed to the other user or party by passing information along via HTTP headers, HTTP verbs (e.g. POST), or other techniques, such as a YAML (YAML Ain't Markup Language) or XML (Extensible Markup Language). In some implementations, the selected data privacy elements can last for the duration of an online session, can be manually or automatically modified during the online session, or can be automatically modified after each session. For example, an online session may begin when a user logs into the data protection platform. When the user logs into the data protection platform, an artificial profile may be generated for the user, and that artificial profile may include data privacy elements that are the same or different (entirely or partially) as the data privacy elements of the last artificial profile generated for the user. Further, since many existing exploit and exploit techniques are detectable by modern firewalls, the data protection platform can generate artificial profiles to overtly pretend to have vulnerabilities that an organization is capable of defending against. Accordingly, network attacks by network hosts, such as hackers, are inhibited because the network hosts may attempt network attacks based on inaccurate information, the network's firewalls are stopping the attack attempts (and the network attacks that may succeed in accessing the network will likely fail because the data protection platform may be a hybrid mix of containers and inaccurate information).

Figure 8B:
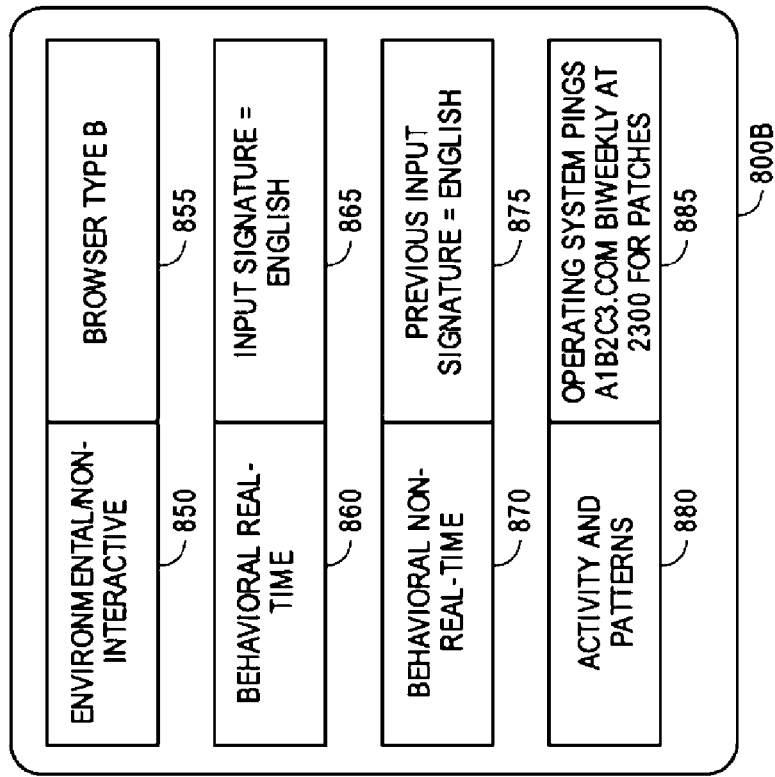
FIGS. 8A and 8B are block diagrams illustrating artificial profiles generated using the artificial profile model illustrated in FIG. 7, according to certain aspects of the present disclosure.
Figure 8A:
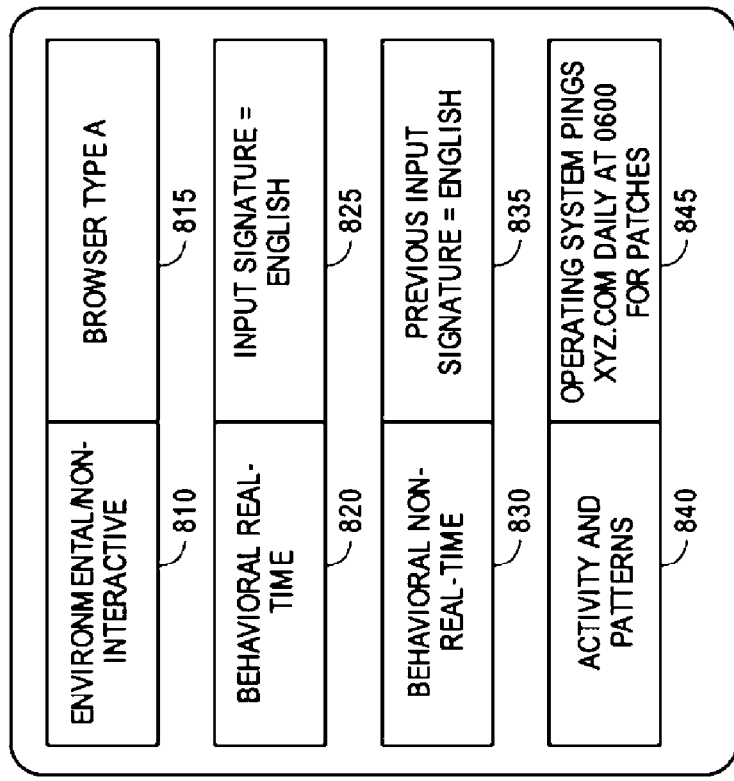

FIGS. 8A and 8B are block diagrams illustrating artificial profiles generated using the artificial profile model illustrated in FIG. 7, according to certain aspects of the present disclosure. FIG. 8A illustrates artificial profile 800A, which represents the data privacy elements that are exposed to a web server when a computing device loads a website, for example. For the purpose of illustration and only as a non-limiting example, artificial profile 800A may include four attribution vectors. The four attribution vectors may include environmental/non-interactive attribution vector 810, behavioral real-time attribution vector 820, behavioral non-real-time attribution vector 830, and activity and patterns attribution vector 840. In some implementations, an attribution vector may be a category, grouping, or classification of data privacy elements.

Environmental/non-interactive attribution vector 810 may be detected when the computing device loads the webpage. Environment/non-interactive attribution vector 810 may include data privacy element 815, which indicates a type of browser running on the computing device. For example, browser type A (e.g., the GOOGLE CHROME browser may be a browser type, and the MOZILLA FIREFOX browser may be another browser type) may be a value of data privacy element 815, which may be detected when computing device loads the webpage. Behavioral real-time attribution vector 820 may include data privacy element 825, which indicates a real-time input signature associated with the input received at the computing device by the user. The input signature of input received at the computing device is described in greater detail with respect to FIG. 9. For example, an input signature of "English" (e.g., detected based on the key dynamics of the input indicating that the letters "TING" are typed sequentially without a pause by the user) may be a value of data privacy element 825, which may be detected when computing device interacts with the webpage. Behavioral non-real-time attribution vector 830 may include data privacy element 835, which indicates a non-real-time input signature associated with previous inputs received at the computing device while accessing the website or other websites. For example, an input signature of "English" may be a value of data privacy element 835, which may be detected when computing device interacts with the webpage or any other webpage at a previous time. Behavioral real-time attribution vector 820 detects, analyzes, and profiles input in real-time as the inputs are being entered by the user operating the computing device, whereas, behavioral non-real-time attribute vector 830 represents a behavioral pattern associated with the user operating the computing device, but which occurred in the past. Lastly, activity and patterns attribution vector 840 may include data privacy element 845, which indicates an activity or pattern of the Operating System (OS) installed on the computing device. For example, an activity or pattern of the detected OS may be that the OS transmits a signal to XYZ.com daily at 6:00 a.m. For example, XYZ.com may be a website that stores or distributes patches for the OS. The signal that is transmitted daily from the OS of the computing device may correspond to a request to download new patches, if any.

While artificial profile 800A represents the real data privacy elements that were exposed to the web server hosting the website accessed by the computing device, new artificial profile 800B represents the modified artificial profile. For example, data protection platform can generate new artificial profile 800B by modifying data privacy elements of artificial profile 800A. Further, data protection platform may modify artificial profile 800A based on an artificial profile model. The artificial profile model may be a model that is generated using machine-learning techniques, and that includes one or more dependences or relationships between two or more data privacy elements. Accordingly, when new artificial profile 800B is generated, the data privacy elements of artificial profile 800A that are modified are done so within the constraints of the artificial profile model, so as to obfuscate the user with a realistic artificial profile. Advantageously, obfuscating information about a user in a realistic manner is more likely to cause a potential hacker to accept the obfuscated information as the real information of the user. Conversely, by modifying artificial profiles without being consistent with underlying dependencies and relationships between data privacy elements, a potential hacker may recognize the inconsistent as a flag indicating that the artificial profile is includes inaccurate or obfuscated information. If a potential hacker recognizes that the collected data privacy elements are obfuscated, the potential hacker may be more likely to continue a data breach using alternative approaches, potentially elevating the severity of an attack on the network.

Continuing with the non-limiting example illustrated in FIG. 8B, the data protection platform can generate new artificial profile 800B (e.g., a modified version of artificial profile 800A) for the user to obfuscate or mask the user's real data privacy elements (e.g., the data privacy elements included in profile 800A). In some implementations, new artificial profile 800B may include the same attribution vectors as artificial profile 800A, however, the present disclosure is not limited thereto. In some implementations, new artificial profile 800B may include more or less attribution vectors than the underlying artificial profile that is being modified. Environmental/non-interactive attribution vector 850, behavioral real-time attribution vector 860, behavioral non-real-time attribution vector 870, and activity and patterns attribution vector 880 may each correspond to its respective attribution vector in artificial profile 800A, however, the value (e.g., the data underlying the data privacy element) may have been changed. For example, the data protection platform may modify data privacy element 815 from "Browser type A" to "Browser type B" (e.g., from a GOOGLE CHROME browser to a FIREFOX browser). In some implementations, data privacy element 815 is modified before a network host, such as a web server providing access to a webpage, can collect any data from the browser of the computing device or from the computing device itself. When the network host collects data privacy elements from the computing device (e.g., a web server collected data privacy elements from the browser operating on the computing device), the network host will collect the obfuscated data privacy element 855, which indicates that Browser type B is being used, instead of data privacy element 815, which indicates the actual browser being used by the user.

The data protection platform may modify data privacy element 825 from "input signature=English" to "input signature=Undetectable." In some implementations, data privacy element 825 is modified before a network host, such as a web server providing access to a webpage, can collect any data from the browser of the computing device or from the computing device itself. When the network host collects data privacy elements from the computing device (e.g., a web server receiving input entered by the user at the computing device), the network host will collect the obfuscated data privacy element 865, which indicates that the input signature is undetectable, instead of data privacy element 825, which indicates the input signature indicates a likelihood that the user is an English speaker. The data protection platform can change the input signature (e.g., input dynamics) of user input received at the computing device using techniques described in greater detail with respect to FIG. 9. However, as a brief summary, the data protection platform can change the time signature associated with the inputted keystroke events so as to obfuscate any detectable key event features, such as the letters "TING" being typed together without a pause (indicating that the user is likely a native English speaker). Similarly, the data protection platform can modify data privacy element 835 from "previous input signature=English" to "previous input signature=undetectable." Just as with the modification of data privacy element 825 to data privacy element 865, the data protection platform can modify data privacy element 835 to data privacy element 875 using the same or similar technique (e.g., the techniques described in FIG. 9).

The data protection platform may modify data privacy element 845 from "Operating System pings XYZ.com daily at 0600 for patches" to "Operating System pings A1B2C3.com biweekly at 2300 for patches" (e.g., one Operating System's automatic update procedure to another Operating System's automatic update procedure). In some implementations, data privacy element 845 is modified before a network host, such as a web server providing access to a webpage, can collect any data from the browser of the computing device or from the computing device itself. When the network host collects data privacy elements from the computing device (e.g., a web server collected data privacy elements from the browser operating on the computing device), the network host will collect the obfuscated data privacy element 885, which indicates that the OS pings an external server on a regular schedule, instead of data privacy element 845, which indicates the actual automatic update schedule of the OS installed on the computing device. Had the network host collected data privacy element 845 from the browser of the computing device, the network host could have identified and exploited a vulnerability in the OS installed on the computing device, or a vulnerability in the servers of XYZ.com. However, advantageously, since the network host instead collected modified data privacy element 885 (as part of collecting modified artificial profile 800B from the browser or computing device), the network host collected realistic, yet obfuscated, information about the browser and computing device. Thus, the network host cannot effectively mount an attack on the network or the computing device because modified artificial profile 800B does not expose any real vulnerabilities existing in the browser or the computing.

In some implementations, the data protection platform does not need to generate artificial profile 800A, which includes data privacy elements that were actually detected from the browser or computing device. Instead, the data protection platform can automatically and dynamically generate modified artificial profile 800B, while or in conjunction with, the user browsing webpages on the Internet. In these implementations, the data protection platform does not need to detect the actual data privacy elements exposed by the computing device, but rather, the data protection platform can generate an artificial profile for the user, browser, or computing device, so as to obfuscate any potentially exposable data privacy elements.

Figure 9:
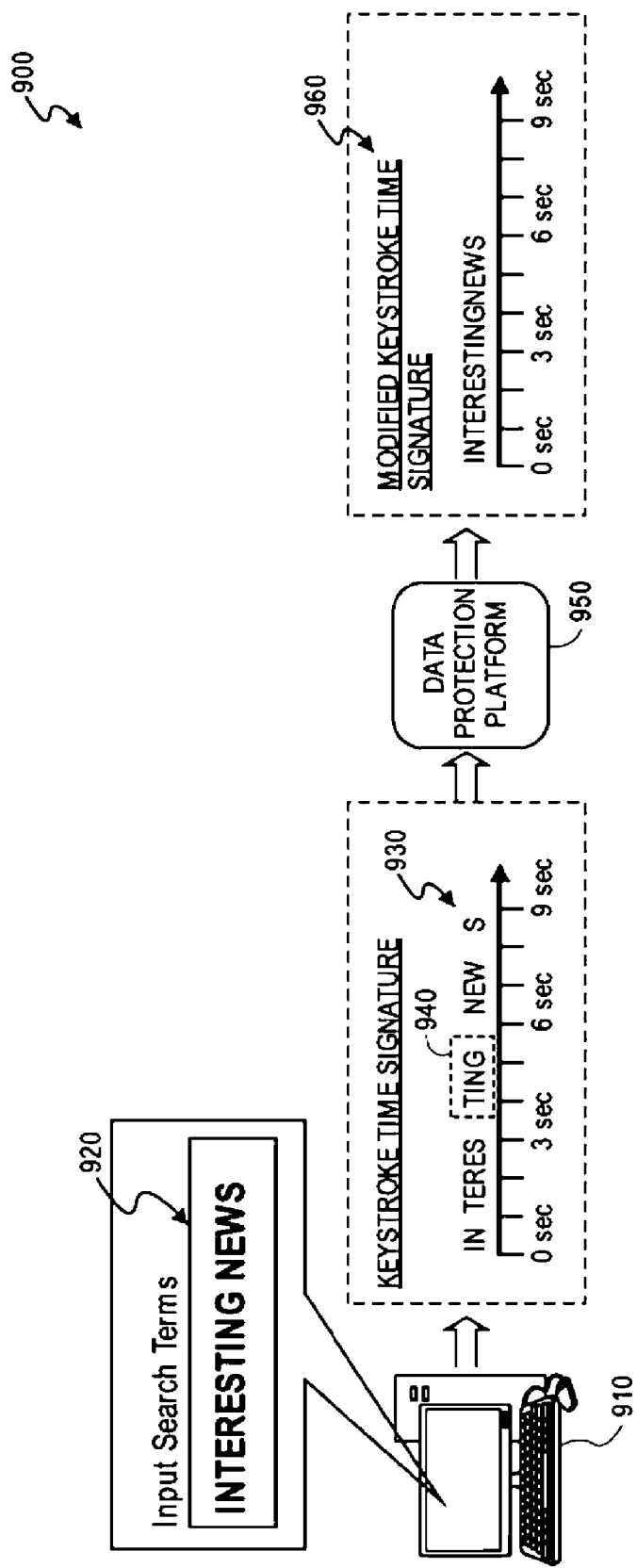
FIG. 9 is a diagram illustrating a process flow for controlling input signatures during an interaction session, according to certain aspects of the present disclosure.

FIG. 9 is a diagram illustrating process flow 900 for controlling input signatures during an interaction session, according to certain aspects of the present disclosure. Process flow 900 may be performed at least in part at data protection platform 950. Data protection platform 950 may be the same as or similar to data protection platform 510 of FIG. 5, and thus, a description of data protection platform 950 is omitted here. Process flow 900 may be performed to modify input signatures associated with input received at a platform-secured browser, such as the platform-secured browser of FIG. 4A. In some implementations, an input signature may include a feature that characterizes an input received at the platform-secured browser. For example, a feature may be the time signature of keystrokes inputted at the platform-secure browser, however, the present disclosure is not limited thereto. Another example of a feature that characterizes an input may be movement associated with a cursor or mouse clicks.

The feature of an input can be exposed as a data privacy element when a computing device accesses a website. To illustrate process 900 and only as a non-limiting example, computer 910 may be operated by a use. For instance, the user may be navigating a website or application using a platform-secured browser. The website displayed on the browser of computer 910 may include input element 920. Input element 920 may be a text box displayed on a webpage for a search engine. Further, input element 920 may be configured to receive input from the user operating computer 910. Continuing with the non-limiting example, the user may type the phrase "interesting news" into input element 920. The natural keystroke event timing associated with inputting the letters "interesting news" into input element 920 is shown in keystroke time signature 930. For example, the user may naturally input the letters of "interesting news" in the following pattern: "IN," then a pause, "TERES," then a pause, "TING," then a pause, "NEW," then a pause, and finally the letter "S." The pauses of the pattern may occur naturally as the user types the phrase. The user may move or adjust his or her fingers to continue typing. Naturally, certain letters are more likely to be typed together quickly, such as "TING," and for other letters, there may be a need for a brief pause while the user's fingers adjust or find the next letter on a keyboard.

However, keystroke dynamics, such as a keystroke time signature can be a data privacy element that exposes information about the user operating computer 910. For example, an input profiling technique can be used to determine that keystroke time signature 930 indicates that the user is an English speaker. Letter grouping 940 (i.e., the letters "TING") are often used in the English language, but are not often used together in other languages. Accordingly, the keystroke time signature 930 can be evaluated to detect certain letter groupings, such as letter grouping 940 of "TING" typed sequentially without pauses. The detected letter groups can reveal information about the user to a web server, such as the language of the user.

According to certain embodiments, data protection platform 950 can modify keystroke time signature 930 to obfuscate or block any information that could be extracted from keystroke time signature 930. For example, data protection platform 950 can receive the input of "interesting news" from the platform-secured browser, however, data protection platform 950 can detect keystroke time signature 930 from the received input before transmitting the input to the web server hosting the website that includes input element 920. Instead of transmitting the received input in the pattern of keystroke time signature 930, data protection platform 950 can transmit the letters "interesting news" to the web server with the characteristic of modified keystroke time signature 960. Modified keystroke time signature 960 can indicate that all letters of "interesting news" are typed one-after-another without any pauses. Thus, while the network host, for example, the web server hosting the website that includes input element 920, can gain access to the time signature or detect the time signature of the received input of "interesting news," but the detected time signature at the web server would be modified keystroke time signature 960, instead of the real keystroke time signature of 930. Advantageously, keystroke time signature 930, which represents the natural keystroke dynamics of the user operating computer 910, can be obfuscated so as to prevent an accurate input profiling of the received text.

In some implementations, data protection platform 950 can automatically (or potentially not automatically) modify features of the received input. For example, to modify the keystroke time signature of input text received at an input element, data protection platform 950 can provide an intermediary, such as an invisible overlay over the websites accessed by the platform-secured browser. In some implementations, the intermediary may intercept the input text received at the input element (e.g., before the text is transmitted to the web server), modify the time signature of the input text, and then transmit the input text with the modified time signature to the web server. Other techniques for performing the modification may include modifying input streams, providing on-screen input methods, and other suitable techniques. In some implementations, data protection platform 950 may provide additional information to the user, instead of modifying an input stream. For example, data protection platform 950 can notify the user that the input text is defined by a keystroke time signature that may reveal the language of the input text. In some implementations, the time signature of the input text can be modified immediately (e.g., in real-time) upon being received at the input element, whereas, in other implementations, the time signature of the input text can be modified over a period of time or at a later time. In some implementations, data protection platform 950 can impose an effect on inputted text or inputted mouse interactions, such that the effect automatically changes the browser to modify a time signature of the inputted text or mouse interactions. For example, data protection platform 950 can include a shim that serves as a wedge between the OS and the browser (or application, if being used). The shim can influence or modify how the OS reports inputs received at a keyboard or a mouse. The shim may be used to modify how the OS reports the time signature of inputted text, for example. In some implementations, an intermediary may not be used, but rather the native environment of the application or browser may be structured so that inputs received at the browser are outputted with a defined time signature. In these implementations, the input text or mouse interaction is not intercepted at the browser, but rather, the input text or mouse interaction is defined so as to have a particular time signature. The present disclosure is not limited to detecting the keystroke time signature of inputted text. In some implementations, mouse movement can also be detected as a data privacy element, and subsequently modified by data protection platform 950 to remove any extractable characteristics.

Embodiments of the present disclosure may include devices capable of implementing platform-secured network access and communication. Such data protection devices may be embedded or peripheral devices that communicatively couple to a computing device and that include various components for facilitating secure communication between the computing device and network-accessible resources. Generally, a data protection device facilitates secure communication by obfuscating or masking identifiers or attributes of a user of the computing device, the computing device itself, communications from the computing device, network systems associated with the computing device, and the like. Such identifiers, attributes, etc. are generally referred to herein as privacy elements or data privacy elements. In certain embodiments, the data protection device performs obfuscation functionality itself. In other embodiments, such operations may be performed by or in conjunction with a data protection platform.

In use, the data protection device is communicatively coupled to a computing device using a secure connection. The data protection device receives communications, which may include requests and corresponding data, from the computing device and that are intended for a network resource. In certain embodiments, when a communication is received by the data protection device, the data protection device may modify data privacy elements associated with the communication and establish access to the network resource using the modified data privacy elements. When a network host attempts to detect the data privacy elements, the network host instead detects the modified data privacy elements.

In other embodiments, the data protection device may connect to and communicate with a data protection platform such that the data protection platform acts as an intermediary between the data protection device and the network resource. In such embodiments, the data protection device may receive communications from the computing device that are intended for the network resource. The data protection device may provide the communications to the data protection platform which then identifies data privacy elements and generates corresponding modified data privacy element. The data protection platform then establishes access to the network resource using the modified data privacy elements such that, if a network host attempts to detect the data privacy elements, the network host instead detects the modified data privacy elements.

The data protection device may be substantially isolated from other components of the computing device within which it is embedded or to which it is coupled as a peripheral. For example, in certain embodiments, the data protection device may only be physically coupled to a power source of the computing device (and any mechanical structures required to support the data protection device within the computing device) with any communication between the data protection device and the computing device occurring over a secured wireless connection. Similarly, in embodiments in which the data protection device is a peripheral coupled to a port (e.g., a universal serial bus (USB) port) of the computing device, the data protection device may only electrically couple to the power-related pins of the port with any data connections being unused or terminated in the interface between the computing device and the data protection device. Again, in such embodiments, communication between the data protection device and the computing device may occur over a secure wireless connection. As a result of such coupling between the computing device and the data protection device, interactions between the data protection device and the computing device are minimized and generally limited to secure connections. Doing so reduces potential security vulnerabilities and, as a result, reduces the risk that such vulnerabilities may be exposed and exploited by unauthorized entities. Stated differently, embodiments of the present disclosure leverage both physical and logical isolation of the data protection device from the associated computing device to improve overall privacy and security of communications and general functionality of the computing device. For example, and among other things, in a physical implementation of network communication, the data protection device is physically isolated from the computing device networking card and other components, thereby facilitating greater control of data exposure.

Power consumption of a given device may be used to identify potential vulnerabilities of the device in certain circumstances. For example, components of the device may generate distinct power signatures when activated, in operation, or deactivated. To the extent power consumption may be measured, such power signatures may be used to determine when the device or component is in use and, in some cases, more granular details such as configuration information for the device or component, a type or version of the device or component, and the like. These details may in turn be used to identify the device and/or components of the device and to identify any potential vulnerabilities thereof. Accordingly, in certain embodiments, the data protection device may include a power modulator to obfuscate power consumption by the data protection device, the computing device associated with the data protection device, and/or components of the computing device. For example, in certain embodiments, the power modulator may be a variable load controllable by the data protection device to consume power according to various rules or algorithms. By selectively controlling when the power modulator is active, the power consumed by the power modulator, and/or timing characteristics of the power modulator, power consumption may be obfuscated or masked, thereby reducing exposure of potential vulnerabilities based on power signatures.

In at least certain embodiments, the data protection device may facilitate secure communication by providing some or all of the functionality attributed above to platform-secured network element 480. For example, the data protection device may store or otherwise be configured to access one or more artificial profiles that specify modifications to be made to various data privacy elements for purposes of controlling data exposure.

Figure 10:
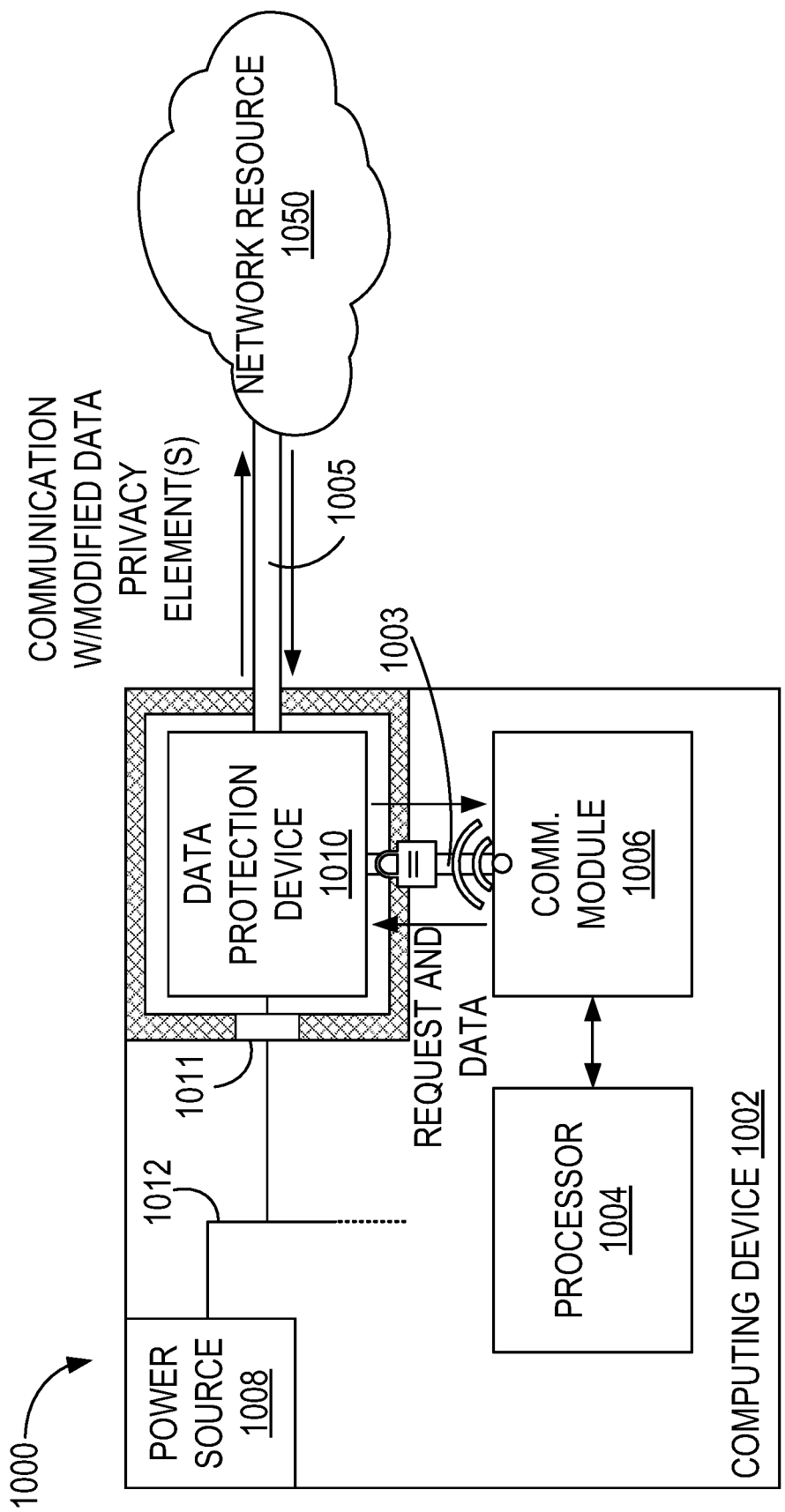
FIG. 10 shows an illustrative example of an environment in which a data protection device embedded within a computing device manages data exposure during access of a network resource in accordance with at least one embodiment.

FIG. 10 shows an illustrative example of an environment 1000 in which data exposure resulting from communication between a computing device 1002 and a network resource 1050 is managed by a data protection device 1010 embedded in computing device 1002. Computing device 1002 may be any suitable computing device provided it is capable of supplying power to and communicating with data protection device 1010. Accordingly, and without limitation, computing device 1002 may be any of a mobile computing device (e.g., a smartphone), a laptop computer, a tablet, a desktop computer, a server system, a "smart" appliance (e.g., a smart television or refrigerator), a wearable computing device, an Internet of Things (IoT) device, a vehicle computer, a video game system, a computer peripheral device, or any other computing device capable of performing the functions described herein and attributed to computing device 1002 and its components.

Data protection device 1010 includes a power interface 1011 that is electrically coupled to a power bus 1012 of computing device 1002. The power bus 1012, in turn, is electrically coupled to and receives power from a power source 1008 of computing device 1002, thereby providing power to data protection device 1010. Data protection device 1010 is also wirelessly connected to a communications module 1006 of computing device 1002 using a secure connection 1003, the communications module 1006 being coupled to a processor 1004 of computing device 1002. Data protection device 1010 is otherwise decoupled from computing device 1002 and its components, but for any mechanical coupling required to contain and/or support data protection device 1010 within computing device 1002. Stated differently, data protection device 1010 is electrically coupled to power source 1008 to receive power and wirelessly connected to communications module 1006 using secure connection 1003, but otherwise does not connect to or directly interact with other computing- or power-related components of computing device 1002.

Secure connection 1003 between data protection device 1010 and communications module 1006 may be any suitable secure connection and, in general, is intended to minimize potential data exposure during communication between data protection device 1010 and communications module 1006 of computing device 1002. In at least certain embodiments, secure connection 1003 may be a Bluetooth or Bluetooth Low Energy (BLE) connection. In other embodiments, secure connection 1003 may facilitate communication using other communication technologies including, but not limited to Wi-Fi, cellular, Ethernet, ANT/ANT+, ZigBee, Near-Field Communications (NFC), and other similar technologies. In certain other embodiments, secure connection 1003 may be an infrared or similar light-based interface in which communications module 1006 and data protection device 1010 each include respective light emitter and detector elements. In still other embodiments, secure connection 1003 may include a LoRa/LoRaWAN connection. Secure connection 1003 may include, but is not necessarily limited to connections including line encoding. In certain embodiments, secure connection 1003 may be based on a protocol that supports buffering. In alternative embodiments, the protocol may not support buffering or otherwise be a substantially real-time protocol. In such embodiments, buffering may instead occur at data protection device 1010. More generally, secure connection 1003 may be established using any suitable secure physical or higher layer communications technology.

During operation, data protection device 1010 receives a communication from the communication module 1006 over secure connection 1003 that includes a request to access network resource 1050. The communication or a subsequent communication may further include data associated with the request and intended for transmission to network resource 1050. In response, data protection device 1010 identifies a data privacy element associated with the communication. Among other things, the data privacy element may correspond to characteristics, attributes, or behavior of the user of the computing device 1002, the computing device 1002, the data associated with the request, a network system to which the computing device 1002 is connected, and the like, as further discussed herein (e.g., in the context of FIG. 7). Data protection device 1010 then generates a modified data privacy element and accesses network resource 1050 using a connection 1005 and the modified data privacy element.

Following establishment of access to network resource 1050 using the modified data privacy element, subsequent attempts by a network host to detect data privacy elements associated with data transmitted over connection 1005 result in the network host detecting the modified data privacy element instead. As a result, the modified data privacy element may be used to obfuscate or mask the original data privacy element, thereby reducing data exposure during communication between computing device 1002 and network resource 1050.

Connection 1005 between data protection device 1010 and network resource 1050 may be any suitable connection type for accessing network resource 1050 and may or may not be secured. Moreover, connection 1005 may extend through one or more other devices such as, but not limited to, routers, gateways, switches, and other network-related devices. In certain embodiments, intermediate connections between data protection device 1010 and network resource 1050 may also be established using the modified data privacy element. As a result, network hosts attempting to detect the data privacy element at the intermediate devices between data protection device 1005 and network resource 1050 would similarly detect the modified data privacy element instead.

Although the foregoing example references only one data privacy element, in other embodiments, data protection device 1010 may generate multiple modified data privacy elements, each corresponding to a respective data privacy element. In some instances, the multiple data privacy elements may be independent or unrelated; however, in at least certain cases, modifying one data privacy element may require modification of one or more other data privacy elements to produce or maintain a realistic or consistent signature. To the extent the other embodiments discussed herein similarly refer to a single data privacy element and corresponding modified data privacy element, it should be understood that such embodiments may be readily adapted into embodiments involving multiple data privacy elements.

As noted above, data privacy elements are generally modified to produce a realistic or consistent signature, thereby masking or obfuscating a device configuration with another realistic device configuration. However, in at least certain applications, data privacy elements may be modified to be unrealistic, inconsistent, or even impossible. For example, modified data privacy elements may be used to indicate a device is using a browser with a language setting that is unavailable for that browser. As another example, the modified data privacy elements may be used to indicate that a device is running an application with a version number that has not been released. Such deliberate inconsistencies may be useful in software testing and fuzzing, among other applications.

In certain embodiments, modifications made by the data protection device to data privacy elements may be static such that data privacy elements are modified in a particular way unless and until the data privacy device is reconfigured, e.g., by a user selecting or configuring a new artificial profile. In one example of such an embodiment, data privacy elements related to a device's browser and browser version may be modified to a specific browser and browser version unless and until the user modifies a corresponding setting of the data protection device. In other embodiments, modifications made by the data protection device to data privacy elements may be dynamic and change over time such that the data protection device may be configured to automatically change how certain data privacy elements are modified. For example, referring again to data privacy elements corresponding to a browser and browser version, the data protection device may be configured to change the modified data privacy elements to different browsers and/or versions over time. In certain embodiments, such changes may be made periodically (e.g., every day) or at random or pseudo-random times. In other embodiments, such changes may be event driven. For example, and without limitation, the data protection device may automatically change how certain data privacy elements are modified in response to the computing device logging onto a new network, to receiving and/or transmitting a certain amount of data, to detecting potentially malicious activity, to certain applications being opened on the computing device, and the like. In either case, dynamically changing how data privacy elements are modified may substantially mitigate the possibility of compromise.

Figure 11:
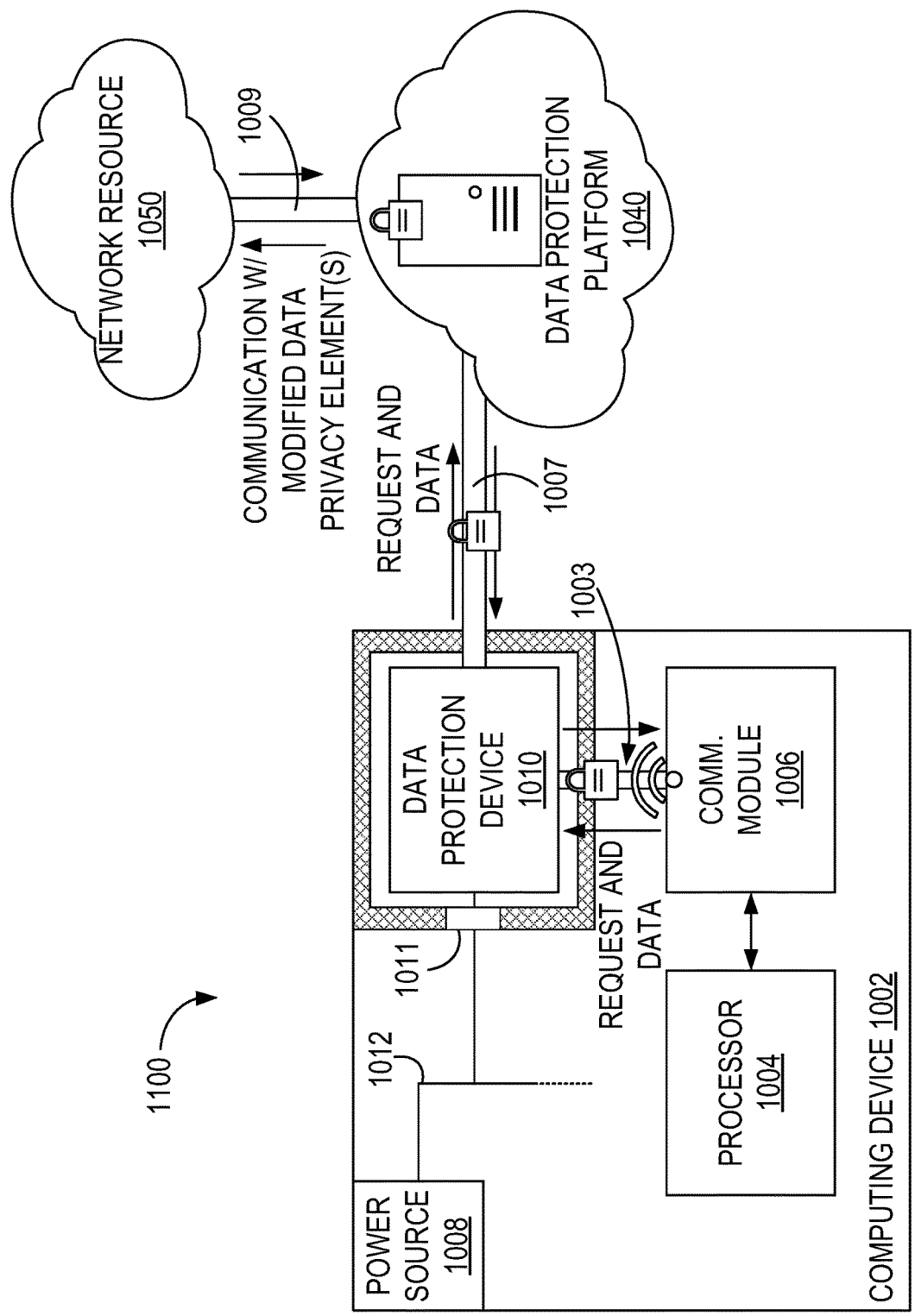
FIG. 11 shows an illustrative example of an environment in which a data protection device embedded within a computing device accesses a network resource through a data protection platform in accordance with at least one embodiment.

FIG. 11 shows another illustrative example of an environment 1100 in which data exposure resulting from communication between computing device 1002 and network resource 1050 is managed by data protection device 1010, which is embedded in computing device 1002. In the embodiment of FIG. 11, data exposure is further managed by interactions between data protection device 1010 and a data protection platform 1040.

While FIG. 10 illustrates data protection device 1010 connected to and communicating with network resource 1050, the embodiment of FIG. 11 includes data protection platform 1040 as an intermediary between data protection device 1010 and network resource 1050. More specifically, in addition to being connected to communications module 1006 by a secure connection 1003, data protection device 1010 is further connected to data protection platform 1040 by a second connection 1007. Second connection 1007 is preferably, but not necessarily, a secured connection, as illustrated in FIG. 11. Data protection platform 1040, in turn, is connected to network resource 1050 by a connection 1009, which may or may not be secured.

In the context of the present disclosure, the term "secured connection" generally refers to a connection that is (or at least appears) secured to an outside observer, e.g., a computing device other than those intended to communicate using the secure connection. A secured connection will generally be accessible/viewable by one or both devices communicating over the secured connection. In contrast, an unsecured connection is a connection that may be accessed/viewed by parties other than those between which communications are intended to be exchanged. In certain embodiments and in certain scenarios, a secure connection may not be available and, as a result, an unsecured connection may be used. However, in other embodiments, communications may be over an unsecured connection even if a secure connection is possible. For example, in certain applications it may be useful to implement an unsecured connection to intentionally make modified privacy information available to a third or other party. Stated differently, an unsecured connection using modified privacy information may be used to deliberately obfuscate a computing device. A device may be deliberately exposed to gauge external monitoring, scanning, probing, or other detectable activity against the device. In such applications, the device may be isolated from other components to avoid unnecessary exposure of those components to malicious activity that could otherwise result from the deliberate exposure. In still other embodiments, data privacy elements may be specifically modified, tagged, etc., to be trackable or otherwise identified in other databases or repositories. Such tagging techniques may be useful, for example, in determining the proliferation of privacy data through publicly available sources, dark web communities, and the like.

In the embodiment of FIG. 11, data protection device 1010 receives a request from the communication module 1006 over secure connection 1003 to access network resource 1050 and further receives data associated with the request. In response, data protection device 1010 forwards the request and data to data protection platform 1040. Data protection platform 1040 identifies a data privacy element associated with the request, generates a modified data privacy element corresponding to the data privacy element, and accesses network resource 1050 the modified data privacy element to establish connection 1009. Subsequent communications from computing device 1002 intended for network resource 1050 may be similarly routed through data protection platform 1040, e.g., with data protection platform 1040 identifying data privacy elements and generating corresponding modified data privacy elements for purposes of accessing network resource 1050.

In other embodiments, the process of identifying data privacy elements and generating modified data privacy elements may occur, at least in part, at data protection device 1010. Similar to the embodiment discussed above in the context of FIG. 10, such embodiments may include data protection device 1010 receiving a communication including a request to access network resource 1050 and corresponding data. Data protection device 1010 may then identify a data privacy element associated with the communication and generate modified data privacy elements. The data protection device 1010 may then forward the communication with the modified data privacy element to data protection platform 1040, which may then access network resource 1050 using the modified data privacy elements.

In still other embodiments, a multi-step process may be implemented in which each of data protection device 1010 and data protection platform 1040 identify and modify data privacy elements associated with a communication from computing device 1002. For example, data protection device 1010 may identify a first set of data privacy elements associated with the communication and generate a corresponding first set of modified data privacy elements, which are then forwarded to data protection platform 1040. Data protection platform 1040 may then identify a second set of data privacy elements associated with the communication and generate a second set of data privacy elements. Data protection platform 1040 may then access network resource 1050 using some combination of the first and second sets of modified data privacy elements. In certain embodiments, the first and second sets of modified data privacy elements may be disjoint sets (e.g., the first and second sets contain no common elements), intersecting sets (e.g., the first and second sets contain one or more common elements), or sub/super sets (e.g., all elements of one set are included in the other set). In cases in which the first and second sets of modified data privacy elements overlap, the modified data privacy element ultimately used to access network resource 1050 may be provided by either data protection device 1010 or data protection platform 1040, e.g., according to a precedence rule specifying which modified data privacy element should be used. Alternatively, the modified data privacy element generated by data protection platform 1040 may override the modified data privacy element generated by data protection device 1010.

The foregoing multi-step process may be advantageous when connection 1007 between data protection device 1010 and data protection platform 1040 is not be securable. More specifically, the first set of modified data privacy elements generated by data protection device 1010 may be used to establish access to data protection platform 1040, while the second set of modified data privacy elements generated by data protection platform 1040 (or a combination of the first and second sets of modified data privacy elements) may be used to establish access to network resource 1050. As a result, all links between data protection device 1010 and network resource 1050 may include some form of data protection/managed data exposure.

Figure 12:
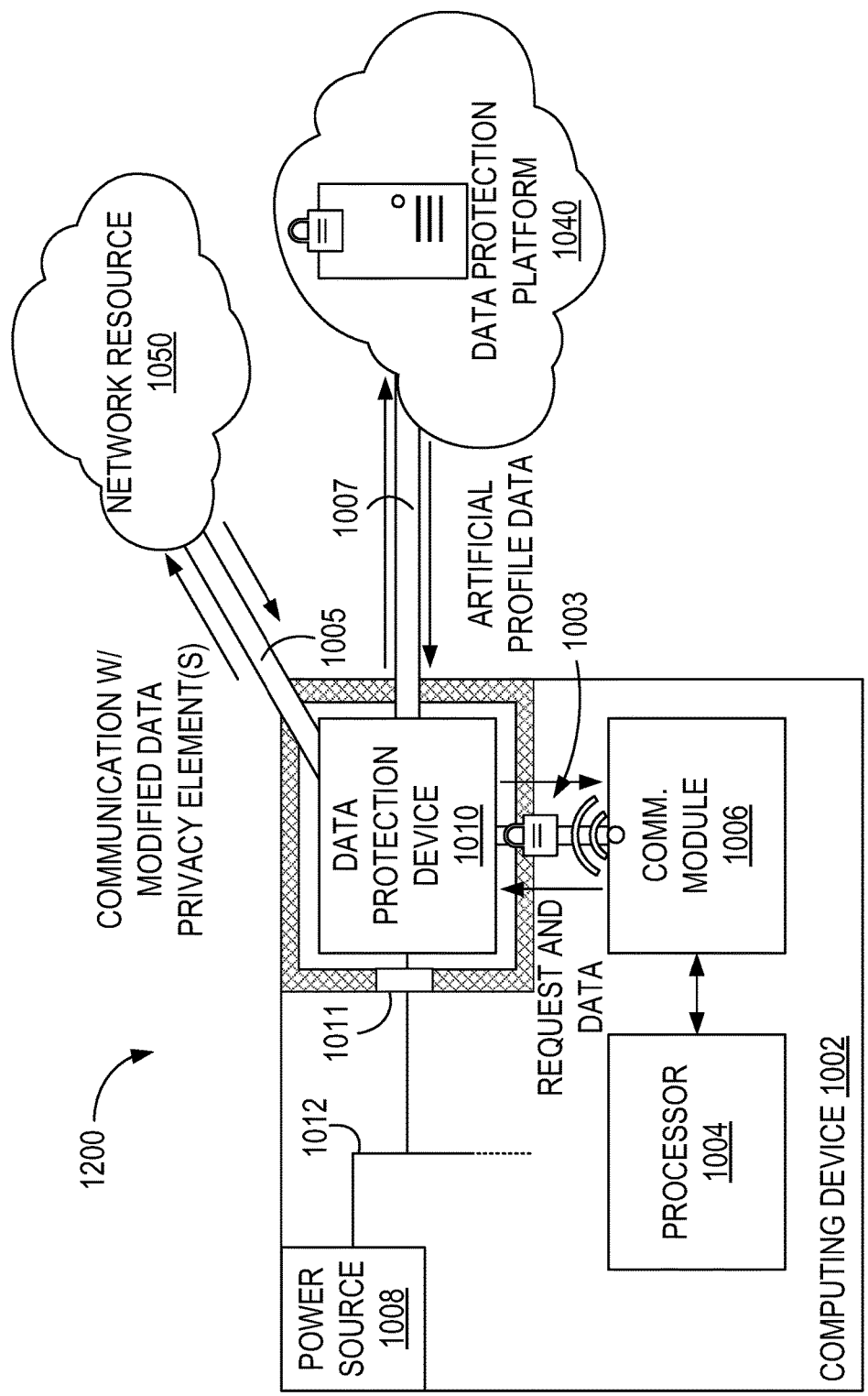
FIG. 12 shows an illustrative example of an environment in which a data protection device embedded within a computing device manages data exposure during access of a network resource in accordance with at least one embodiment and in which the data protection device communicates with and receives artificial profile data from a data protection platform.

FIG. 12 shows yet another illustrative example of an environment 1200 in which data exposure resulting from communication between computing device 1002 and network resource 1050 is managed by data protection device 1010, which is embedded in computing device 1002. In the embodiment of FIG. 12, data protection device 1010 is connected to and communicates with network resource 1050 over connection 1005 but is further connected to data protection platform 1040 using connection 1007. In such embodiments, data protection platform 1040 may provide updates to data protection device 1010, collect data from data protection platform 1040, and perform various other functions described below.

As illustrated in FIG. 12, data protection device 1010 is communicatively coupled to communications module of computing device 1002 over secure connection 1003. Data protection device 1010 is further connected to each of data protection platform 1040 by connection 1007 and to network resource 1050 by connection 1005. Similar to the embodiment of FIG. 10, the embodiment of FIG. 12 includes data protection device 1010 receiving a communication from communications module 1006 over secure connection 1003, the communication including a request to access network resource 1050 and associated data. When such a communication is received by data protection device 1010, data protection device 1010 identifies data privacy elements associated with the communication and accesses network resource 1050 using modified data privacy elements generated based on the identified data privacy elements. In certain embodiments, data protection device 1010 may also exchange data with data protection platform 1040, such as by connection 1007, to facilitate the foregoing generation process, to log information, to receive updates, and to perform various other tasks.

As discussed herein, generation of modified data privacy elements may be based on an artificial profile. In general, artificial profiles according to the present disclosure include data, such as maps, functions, transformations, rules, etc., for generating modified data privacy elements from data privacy elements associated with a communication. For example, in one specific embodiment, an artificial profile may provide a map between an actual browser type, an actual browser version, an actual language setting, etc. and corresponding modified versions of the same parameters. Other examples of data privacy elements are discussed throughout this disclosure and, in particular, in the context of FIG. 7, above. Accordingly, in certain embodiments, data protection device 1010 may generate modified data privacy elements by applying an artificial profile to data privacy data identified in communications received from computing device 1002.

In certain embodiments, artificial profiles used by data protection device 1010 to generate modified data privacy elements may be locally stored on data protection device 1010. For example, and without limitation, data protection device 1010 may be preloaded with one or more artificial profiles, may store artificial profiles generated or modified through computing device 1002 (e.g., based on communications between communication module 1006 and data protection device 1010), and/or may store artificial profiles received from external sources, such as data protection platform 1040. In embodiments in which artificial profiles are received form data protection device 1010, such artificial profiles may be generated or updated by data protection platform 1040 using a suitable model, such as artificial profile model 700 of FIG. 7, discussed above. Accordingly, in at least certain embodiments, artificial profile data may be received by data protection device 1010 from data protection platform 1040 and, when received by data protection device 1010, may be implemented by data protection device 1010 to generate modified data privacy elements according to the received artificial profile data.

Artificial profile data may also be sent from data protection device 1010 to data protection platform 1040. For example, in certain embodiments, a user of computing device 1002 may generate a new artificial profile or modify an existing artificial profiled stored in data protection device 1010, e.g., by configuring the artificial profile using secure connection 1003. Artificial profiles stored in data protection device 1010 may then be transmitted to data protection platform 1040. In at least certain embodiments, artificial profiles received by data protection platform 1040 from data protection device 1010 may be used to update or train a model of data protection platform 1040, such as, but not limited to, artificial profile model 700 of FIG. 7.

Artificial profile data is just one type of data that may be exchanged between data protection device 1010 and data protection platform 1040. For example, in other embodiments, data protection device 1010 may transmit log data, settings information, diagnostic data, threat-identification data, traffic data, use data, or any other data to data protection platform 1040 for storage and/or analysis by data protection platform 1040. Any such data received from data protection device 1010 may be used to further train and/or update models, algorithms, etc. maintained at data protection platform 1040. Data protection device 1010 may also be used by a user of computing device 1002 to access data protection platform 1040. Similarly, data protection platform 1040 may transmit data to data protection device 1010 other than artificial profile data. For example, and without limitation, data transmitted from data protection platform 1040 to data protection device 1010 may include software updates, firmware updates, configuration data, and the like.

Figure 13:
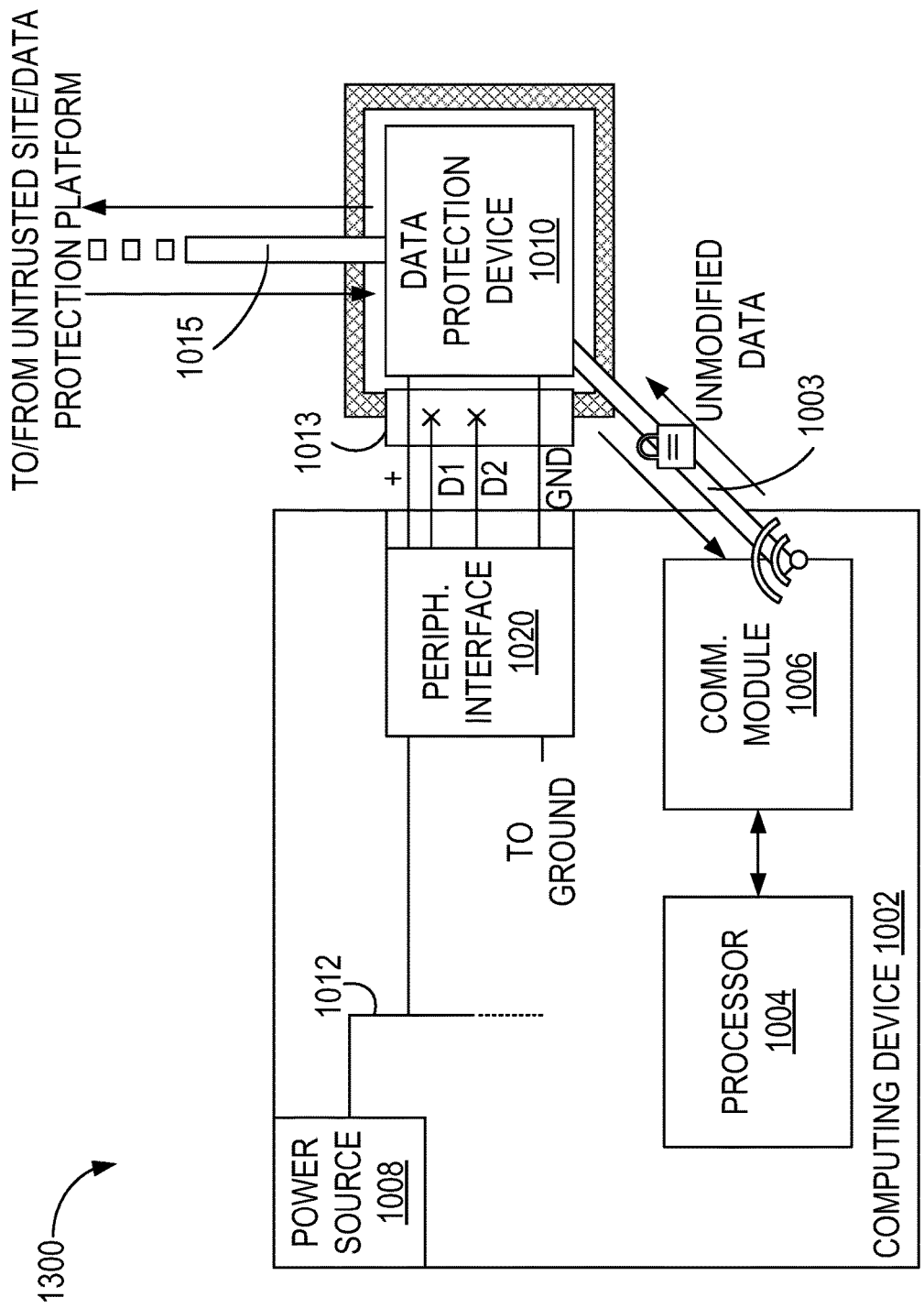
FIG. 13 shows an illustrative example of an environment in which a data protection device is implemented as a peripheral device of a computing device and manages data exposure during access of a network resource in accordance with at least one embodiment.

FIG. 13 is another illustrative example of an environment 1300 in which data exposure resulting from communication between a computing device 1002 and a network resource 1050 is managed by a data protection device 1010. In contrast to the previous embodiments, data protection device 1010 is illustrated as a peripheral device that may be coupled to computing device 1002 by a peripheral interface 1020 of computing device 1002. More specifically, data protection device 1010 may include an interface 1013 for coupling the data protection device 1010 to peripheral interface 1020 of computing device 1002.

Similar to the foregoing embodiments, data protection device 1010 is communicatively coupled to communications module 1006 of computing device 1002 over secure connection 1003. Data protection device 1010 is further illustrated as being optionally connected to a network resource (such as described above in the context of FIG. 10) and/or a data protection platform (such as described above in the context of FIG. 11). Although illustrated as a single connection 1015, it should be understood based on the foregoing discussions that data protection device 1010 may also be connected to and communicate with each of a network resource and a data protection platform (such as disclosed above in the context of FIG. 12) by respective connections.

As illustrated in FIG. 13, peripheral interface 1020 and interface 1013 are universal serial bus (USB) interfaces; however, any suitable interfaces may be used instead of USB. Stated differently, USB is provided simply as an illustrative example and aspects discussed below regarding the implementation of a USB interface may be generalized to other interface types. USB interfaces generally include each of four lines/connections: high power (+), a ground (GND), a high data (D1), and low data (D2). In certain embodiments, interface 1013 of data protection device 1010 may be configured to form connections only for the power-related lines of the USB interface, namely the high power (+) and ground (GND) lines. In contrast, data-related connections, e.g., involving D1 and D2, may be terminated in interface 1013 or otherwise not established between peripheral interface 1020 and interface 1013. As a result, data protection device 1010 receives only power through interface 1013 and any communication between data protection device 1010 and computing device 1002 is limited to occurring over secure connection 1003 between communication module 1006 of computing device 1002 and data protection device 1010. In embodiments in which interfaces other than USB interfaces are used, data protection device 1010 may also be coupled to power-related pins/lines only with all data communication between data protection device 1010 and computing device 1002 occurring through secure connection 1003 with communication module 1006.

In at least certain embodiments, data protection device 1010 may be transferred between computing devices. Although data protection device 1010 being implemented as a peripheral device is generally more conducive to transferring between computing devices, data protection device 1010 may also be configured to be transferred between computing devices when implemented as an embedded device. When data protection device 1010 is transferred from a first computing device to a second computing device, data protection device 1010 may establish a new secure connection with a communication module of the second computing device. Data protection device 1010 may then proceed to identify and modify data privacy elements associated with communications between the second computing device and a network resource (which may be, but is not necessarily, network resource 1050) and to establish access to the network resource using the modified data privacy elements. Alternatively, data protection device 1010 may instead communicate with data protection platform 1040, which, in turn, establishes access to the network resource, as previously described herein.

In certain embodiments, data protection device 1010 may modify data privacy elements from the first computing device and the second computing device such that the modified data privacy elements for each computing device are consistent. To do so, data protection device 1010 may implement the same or similar artificial profiles when used with each computing device and that produce at least some of the same modified data privacy elements. For example, regardless of whether data protection device 1010 is used with the first or second computing device, data protection device 1010 may generate modified data privacy elements intended to make each computing device appear to have a common hardware and/or software configuration. Accordingly, each of the first and second computing device would appear to a network host as a single device or devices having similar configurations. Stated differently, data protection device 1010 may be configured such that a user may appear as a particular computing device, user, etc. to a network host regardless of the actual computing device used to access the network resource.

In certain applications, power consumption and, in particular, characteristics of power consumption by a computing device, may be used to identify various aspects of a computing device and its use. Power characteristics (e.g., power consumed, power draw duration, duty cycle, timing, etc.) measured at an outlet or similar power source, may be used to determine when system resources of the computing device are being used. Moreover, certain system resources may exhibit power-related characteristics that may be used to identify the type of system resource being used and, in certain cases, information as granular as a manufacturer, model, or other characteristics of the system resource. Accordingly, power consumption measurements may be used to identify system resources and their vulnerabilities, enabling exploitation of such vulnerabilities. Stated differently, power consumption characteristics may be considered privacy elements that, like data, configuration, and software-related privacy elements, may be modified to obfuscate or mask a computing device and its functions.

Figure 14A:
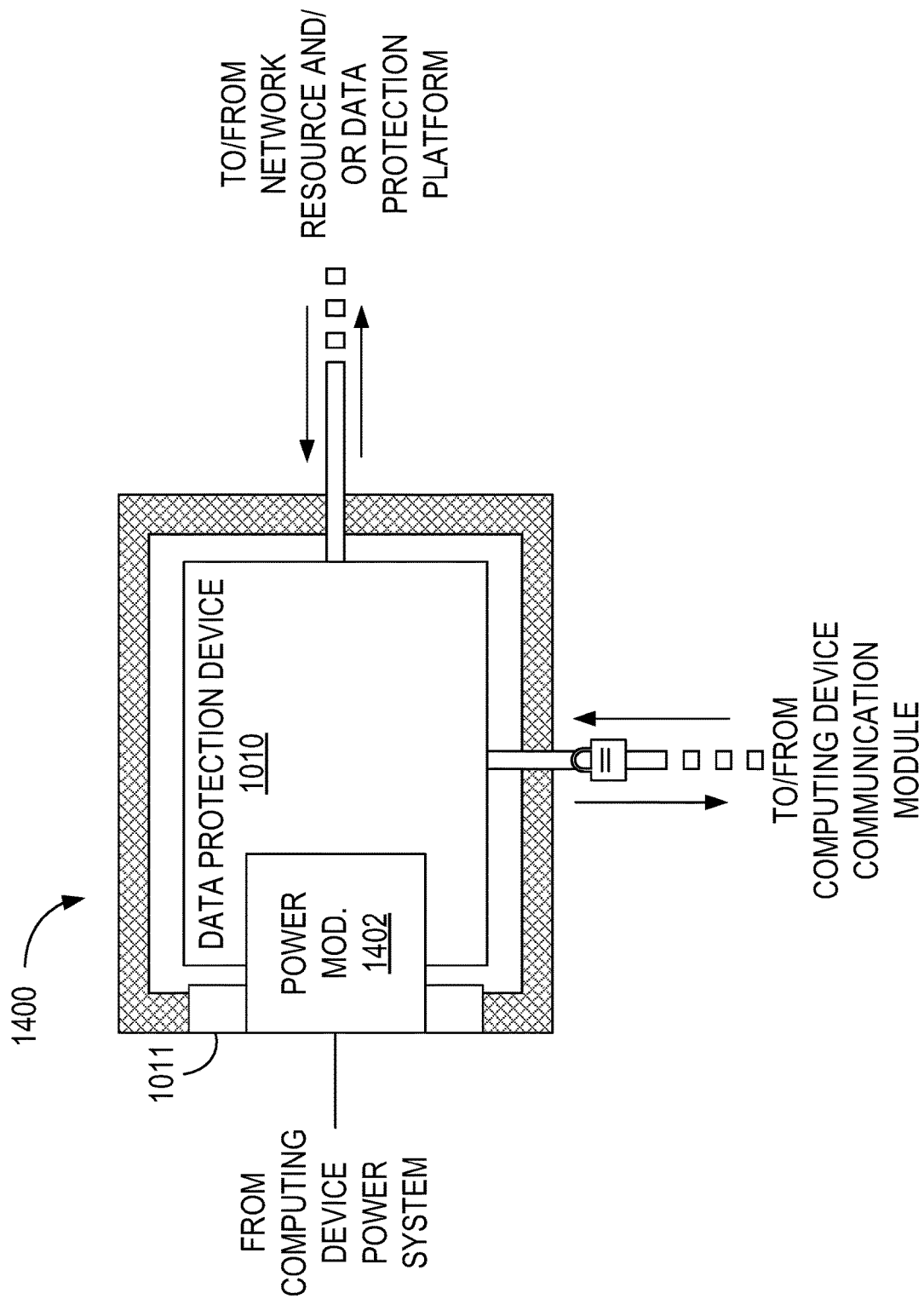
FIG. 14A shows an illustrative example of a data protection device including a power modulator for obfuscating power consumption of computing devices and computing device components in accordance with at least one embodiment.

FIG. 14A is a schematic illustration 1400 of data protection device 1010 in which power interface 1011 includes a power modulator 1402 intended to address the foregoing issue with respect to data protection device 1010. More specifically, power modulator 1402 modifies power consumed by data protection device 1010 such that power consumption characteristics of data protection device 1010 may be masked or obfuscated.

Similar to previous embodiments discussed herein, data protection device 1010 is illustrated in FIG. 14A as being connected to a communication module (e.g., communication module 1006 illustrated in the preceding figures) using a secure connection and either or both of a network resource and a data protection platform, depending on the particular application of data protection device 1010. Data protection device 1010 is further illustrated as being coupled to a power system of a computing device within which data protection device 1010 is embedded (or, alternatively, to which data protection device 1010 is coupled as a peripheral).

As previously discussed herein, data protection device 1010 generally receives power through power interface 1011 from the power system of the computing device, which, in turn, may be connected to an external power source, such as a wall outlet. Accordingly, in at least certain implementations, the presence of data protection device 1010 may be inferred by power consumption characteristics measured at the power bus of the computing device or the external power source. For example, operation of data protection device 1010 may result in one or more characteristic power consumption patterns that are indicative of the presence of data protection device 1010 and/or certain operations of data protection device 1010 (e.g., transmitting data to a network resource). To obfuscate these patterns, power modulator 1402 may be used to modify power consumed from the computing device power system by data protection device 1010. As a result, the presence and/or operation of data protection device 1010 may be obfuscated by power modulator 1402. In certain embodiments, power modulator 1402 may be further used to mask operations of data protection device 1010 or to mimic power consumption of other components, thereby disguising data protection device 1010 as a different component from a power-consumption perspective.

Power modulator 1402 may also be used more generally to obfuscate power consumption of computing device 1002 and its components. Stated differently, power modulator 1402 may be used to dynamically control power consumption to obfuscate or mask power consumption by computing device 1002 or any of its components. In such applications, power modulator 1402 may be incorporated into data protection device 1010 or may be more generally included or coupled to a power system of computing device 1002.

Referring to FIG. 14B, a graph 1450 illustrating power consumption over time is provided. Graph 1450 includes a first, dotted line 1452 corresponding to a base power consumption. As previously discussed, such power consumption may be power consumption of data protection device 1010, one or more components of computing device 1002, computing device 1002 as a whole, or any other power consuming element associated with computing device 1002. For purposes of the present disclosure, base power generally refers to power consumption required by computing device 1002 and/or components of computing device 1002 to perform certain functions/operations. Accordingly, base power generally refers to power consumption measured at an electrical outlet, mains, or other similar primary power source from which computing device 1002 draws power and absent use of power modulator 1402. Graph 1452 further includes a second, solid line 1454 indicating modulated power consumption resulting from use of power modulator 1402. For purposes of the present disclosure, modulated power generally refers to power consumption as modified by power modulator 1402. As illustrated in graph 1450, during at least certain portions of time, base power and modulated power may be equal (e.g., line 1452 and line 1454 coincide), indicating that power modulator 1402 is deactivated or otherwise not altering power consumption by computing device 1002 and/or its components. During other times, however, modulated power exceeds base power, indicating that power modulator 1402 is causing power consumption beyond the baser power consumption, thereby obfuscating the base power consumption. During such excess power consumption periods, power modulator 1402 may activate or otherwise control a load configured to draw additional power from the primary power source of computing device 1002. As a result, computing device 1002 and/or its components appear to draw more power than required for their operation during those times when measured from a primary power source.

At still other times, line 1452 is below line 1454 indicating that the modified power is less than the base power, indicating that the power consumed from the primary power source appears lower than the actual power being consumed by the computing device 1002 and/or its components. To achieve such results, power modulator 1402 may include or be electrically coupled to a supplementary power source configured to provide power to computing device 1002 and/or its components. Power provided by the supplementary power source may be used to offset power that would otherwise be drawn from the primary power source, thereby causing power consumption by the computing device 1002 and its components to appear artificially low from the perspective of the primary power source. In certain embodiments, the supplementary power source may be internal to the computing device 1002, including being part of data protection device 1010. Such internal supplementary power source may include, without limitation, a battery, a capacitor, or a similar power storage device. In other embodiments, the supplementary power source may be a second external power source (e.g., a second wall outlet, a solar panel (or other power generating device), etc.) from which the power modulator 1402 may cause power to be selectively drawn.

Power modulator 1402 may be configured to modify power consumption in various ways. In general, power modulator 1402 may be selectively activated or deactivated and operates by applying a load (e.g., to consume excess power from a primary power source) or drawing power from a supplementary power source (e.g., to reduce power consumed from a primary power source) with an associated timing. Regarding activation/deactivation of power modulator 1402, in certain embodiments, power modulator 1402 may include a controller or processor communicatively coupled to one or more processors of data protection device 1010 and may be configured to receive control signals from data protection device 1010 to selectively activate or deactivate power modification functionality. In other embodiments, power modulator 1402 may include one or more switches that may be toggled by data protection device 1010 to activate or deactivate power modulator 1402. In still other implementations, power modulator 1402 may be coupled to or in communication with other components of computing device 1002 and may be selectively activated and deactivated based on instructions or performance of the other components. For example, in certain implementations, power modulator 1402 may be configured to determine whether communications module 1006 is actively communicating and to consume additional power accordingly (e.g., by consuming extra power during communication to obfuscate communication by the communications module 1006 or by consuming power when communications module 1006 is not actively communicating to create false communications-related power consumption "events").

In certain embodiments, power modulator 1402 may provide a predetermined modification to the power consumed by computing device 1002 and/or its components. In other embodiments, power modulator 1402 may be controllable or reconfigurable to provide different power consumption modifications. In certain embodiments, power modifications provided by power modulator 1402 may be user-configurable, e.g., by a user of computing device 1002. In other such embodiments, power modulator 1402 may be controlled or configured by a controller of power modulator 1402, by software or other programs executed on computing device 1002, or by data protection device 1010. Among other things, power modulator 1402 may be configured to operate based on predetermined power consumption profiles, in response to activation, deactivation, or power consumption of certain components; in response to detecting power consumption conditions; and the like. In still other embodiments, power modulator 1402 may vary power consumption randomly or pseudo-randomly over time.

The power consumption modifications made by power modulator 1402 may vary based on implementation. For example, in certain embodiments, power modulator 1402 may apply a constant modification. In other embodiments, the modification may vary periodically. In still other embodiments, the modification may vary randomly or pseudo-randomly over time. In yet other embodiments, the modification may vary according to a profile corresponding to power consumption by one or more other components. In such embodiments, the modification may vary according to the profile, thereby mimicking power consumption of the one or more components. More generally, the modification to power consumption facilitated by power modulator 1402 may be fixed or variable and, when variable, may vary according to any suitable pattern, function, etc.

Regarding changes in the timing of power consumption, power modulator 1402 may modify power consumption according to various timing approaches. For example, in certain embodiments, power modulator 1402 may apply a modification constantly. In other embodiments, power modulator 1402 may apply modification periodically. In other embodiments, power modulator 1402 may apply a modification at random or pseudo-random intervals. In still other embodiments, power modulator 1402 may time modifications according to a profile of one or more components, thereby mimicking power consumption timing of the one or more components. More generally, the timing of power consumption modifications by power modulator 1402 may be constant or variable and, when variable, may vary according to any suitable pattern, function, etc.

By modifying the amount and timing of power being consumed, power modulator 1402 may be used to achieve various power consumption patterns for obfuscating power consumption of data protection device 1010, components of computing device 1002, or computing device 1002 as a whole. For example, in certain embodiments, power modulator 1402 may be configured to produce a substantially constant power consumption level, thereby smoothing/masking power consumption by other components. For example, a given laptop may consume between 20 W-50 W depending on activity of components within the laptop. In such cases, power modulator 1402 may be configured to ensure that the laptop is always consuming a particular amount of power (e.g., 40 W) by providing any necessary load required to make total power consumption 40 W. By doing so, power modulator 1402 masks power consumption by components when the laptop is operating in the 20 W-40 W range. In other embodiments, power modulator 1402 may produce a power consumption profile corresponding to a different type or configuration of device. Again, considering a laptop, power modulator 1402 may consume power in a manner similar to a particular component not in the laptop or a variation of a component within the laptop. For example, power modulator 1402 may consume power with a pattern similar to that of an optical disc drive even when no such drive is present. As another example, power modulator 1402 may modify power consumed by a solid state drive such that the modified power consumption is consistent with power consumption by a conventional hard disk drive. Power modulator 1402 may similar modify power consumed by a component to make the resulting power consumption correspond to different brands, models, configurations, etc. of the component. In still other embodiments, power modulator 1402 may produce a "noisy" power consumption pattern (e.g., by randomly or pseudo-randomly varying amount and timing of a load or reduction applied by power modulator 1402), rendering any power consumption patterns significantly more difficult to identify.

Power modulator 1402 may also include one or more power dissipation elements to prevent overheating when in operation. Such power dissipation elements may include, without limitation, heat sinks, fans, liquid cooling elements, and the like.

Although described above as being used in conjunction with a data protection device and incorporated into a computing device, power modulators according to the present disclosure may have broader applications. In general, power modulators according to the present disclosure may be used to modify power consumption by any suitable electronic device, (including non-computing devices) or to modify power consumption of a broader electrical system. For example, in certain implementations, a power modulator may be incorporated into a wall outlet, a power supply, a power adapter, or other device into which other electronic devices may be plugged and the power modulator may then obfuscate or mask power consumption by devices plugged into it. In other implementations, a standalone power modulator device may be plugged into a wall socket or otherwise coupled to a broader electrical system, such as the electrical system of a home. The power modulator device may then mimic power consumed by one or more electronic devices, or otherwise generate power consumption "noise" on the electrical system.

Figure 15:
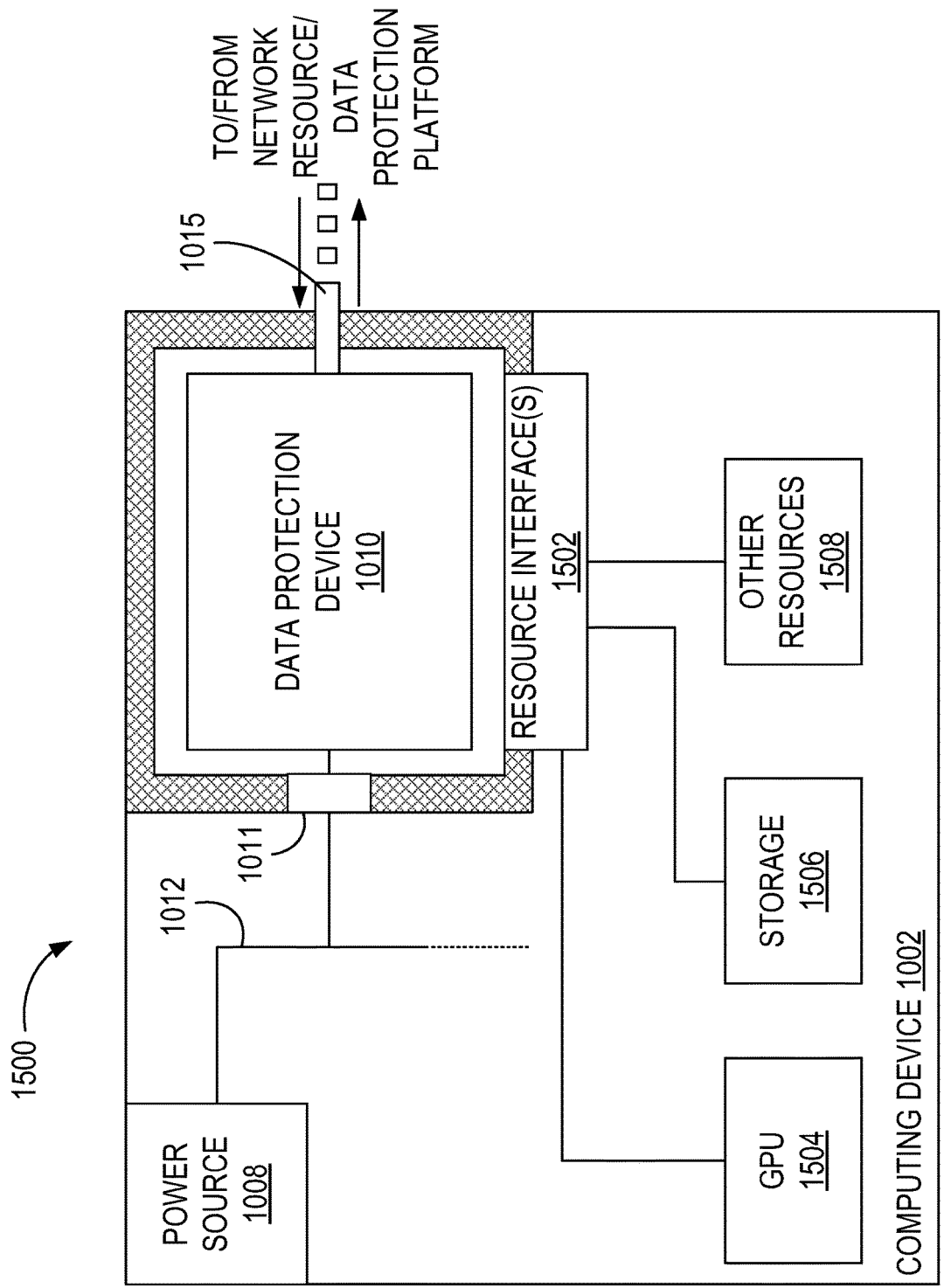
FIG. 15 shows an illustrative example of an environment in which a data protection device embedded within a computing device manages data exposure during access of a network resource and further interfaces with system resources of the computing device in accordance with at least one embodiment.

FIG. 15 is another illustrative example of an environment 1500 in which data exposure resulting from communication between a computing device 1002 and a network resource 1050 is managed by a data protection device 1010. Similar to foregoing embodiments, data protection device 1010 is communicatively coupled to a communications module of computing device 1002 over a secure connection (not shown for clarity in FIG. 15, but included, e.g., in FIGS. 10-12 as communication module 1006 and secure connection 1003). Data protection device 1010 is further illustrated as being optionally connected to a network resource (such as described above in the context of FIG. 10) or a data protection platform (such as described above in the context of FIG. 11). Although illustrated as a single connection 1015, it should be understood that data protection device 1010 may also be connected to and communicate with each of a network resource and a data protection platform (such as disclosed above in the context of FIG. 12).

In contrast to the previous embodiments, data protection device 1010 is illustrated as being connected to or otherwise in communication with various internal resources of computing device 1002 through one or more resource interfaces 1502. In the specific example embodiment of FIG. 15, data protection device 1010 is shown as being connected to each of a graphics processing unit (GPU) 1504, a storage 1506, and other resources 1508. It should be understood, however, that in other embodiments, any suitable resource of computing device may communicate with data protection device 1010. Moreover, while resource interface 1502 is illustrated as being in communication with each of resources 1504-1508, resource interface 1502 may instead be in communication with a bus or similar communication system for communicating with one or more components of computing device 1002.

During operation, data protection device 1010 may make use of resources 1504-1508 to provide supplemental functionality or to improve performance of data protection device 1010. For example, in certain embodiments, data protection device 1010 may use GPU 1504 for purposes of performing calculations, such as calculations related to encryption or decryption of data. As another example, GPU 1504 may be used to encode/compress a user interface associated with data protection device 1010 and/or data protection platform 1040 and presented by computing device 1002. Similarly, data protection device 1010 may store data in storage 1506. Such data may include, without limitation, configuration data for data protection device 1010, log data for data protection device 1010, or performance data collected by data protection device 1010. More generally, any suitable resource of computing device 1002 may be used to perform functions associated with data protection device 1010. In one specific embodiment, system resources of computing device 1002 may be specifically allocated to or otherwise associated with data protection device 1010. For example, a control group of resources of computing device 1002 may be allocated to support functions of data protection device 1002. Such resources may include, without limitation, storage blocks of disks drives, individual CPU cores in multicore systems, blocks of memory, and devices connected to computing device 1002.

In certain embodiments, resource interface 1502 may be configured to obfuscate interactions with resources of computing device 1002. For example, in embodiments in which data is transmitted from data protection device 1010 to a system resource, such data may be encrypted by data protection device 1010 prior to transmission to the system resource. In other embodiments, interactions between data protection device 1010 and a system resource may be obfuscated by sending false data to the system resource. In still other embodiments, resource interface 1502 may include a power modulator, similar to power modulator 1402 and connected to the power system of computing device 1002 to modify power consumption characteristics associated with access or other interactions with system resources. As discussed above in the context of power modulator 1402, examples of such obfuscation may include supplementing power consumed by the data protection device 1010 during interaction with a system resource to mask the interaction, to make the interaction appear to be between a different pair of components, and the like.

Figure 16:
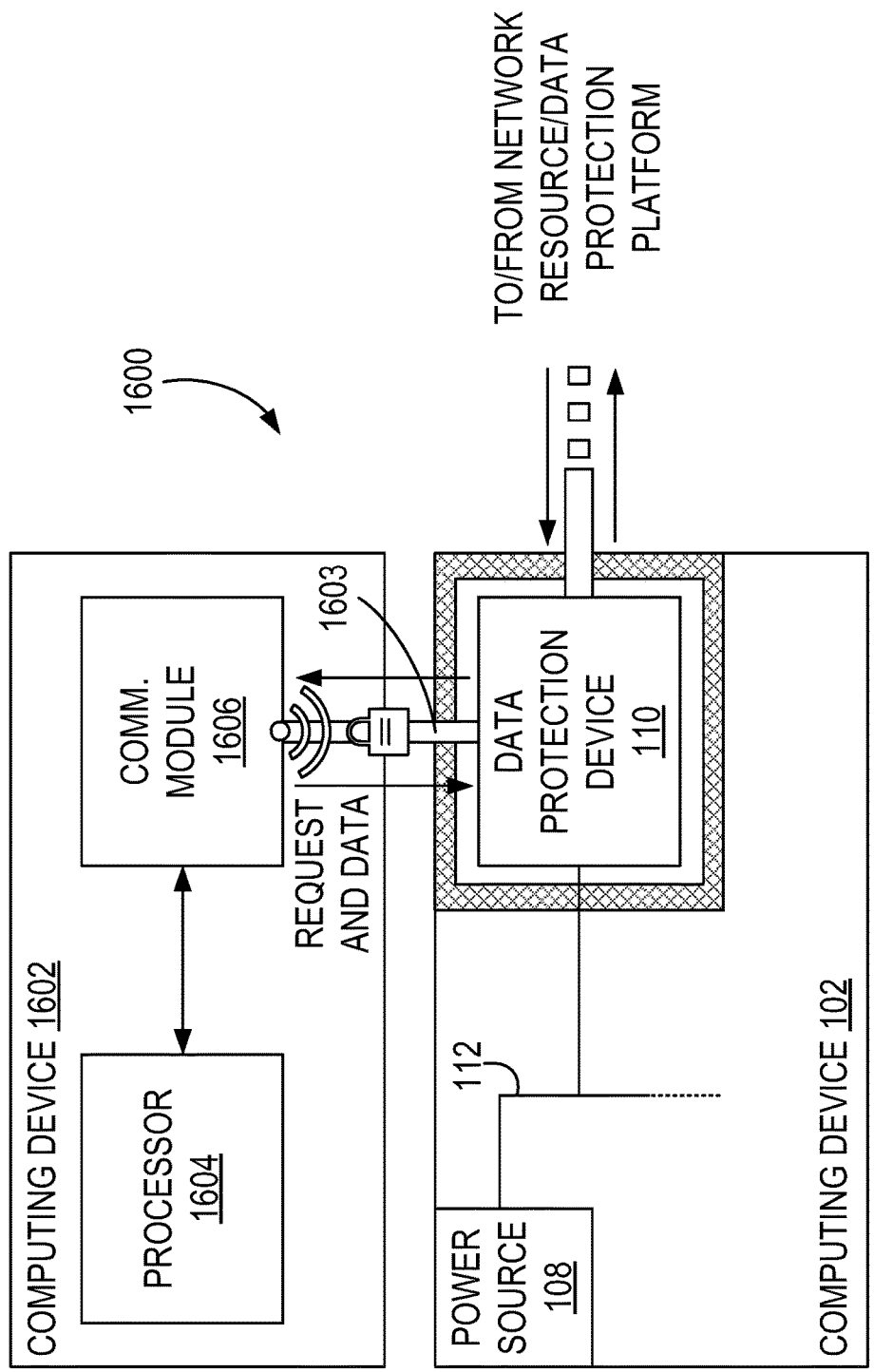
FIG. 16 shows an illustrative example of an environment in which a data protection device embedded within a first computing device manages data exposure during access of a network resource by a second computing device in accordance with at least one embodiment.

FIG. 16 is another illustrative example of an environment 1600 in which data exposure resulting from communications with a network resource is managed by a data protection device 1010. In contrast to the previous embodiments, in which managed communications are between computing device 1002 within which data protection device 1010 is embedded and the network resource, managed communications in the context of FIG. 16 are between a second computing device 1602 and network resource 1050. More specifically, communications generated, e.g., by a processor 1604 of computing device 1602 are transmitted from a communication module 1606 of computing device 1602 to data protection device 1010 over a secure connection 1603. Depending on the specific implementation of data protection device 1010 and as further discussed herein, data protection device 1010 may then identify data privacy elements of the received communication and generate corresponding modified data privacy elements before accessing the network resource using the modified data privacy elements. Alternatively, data protection device 1010 may transmit the communication to a data protection platform. The data protection platform may then identify data privacy elements associated with the communication, generate corresponding modified data privacy elements, and access the network resource using the modified data privacy elements. In still other embodiments, each of data protection device 1010 and the data protection platform may identify and modify data privacy elements, with the data protection platform accessing the network resource using a combination of the modified data privacy elements provided by data protection device 1010 and the data privacy platform. Stated differently, in the embodiment of FIG. 16, data protection device 1010 functions as a security-enhanced hotspot in that access to the network resource occurs through data protection device 1010. However, in contrast to a conventional hotspot that generally enables connection to the network resource only, data protection device 1010 facilitates modification of data privacy elements to manage data exposure for any devices communicating through data protection device 1010.

Although the embodiment of FIG. 16 illustrates only one additional computing device, data protection device 1010 may be configured to act as an enhanced security hotspot for multiple computing devices, each of which may communicate with data protection device 1010 using a respective communication module and over a respective secure connection. Moreover, while FIG. 16 illustrates only computing device 1602 utilizing data protection device 1010, in other embodiments, a communication module of computing device 1002 may also be connected data protection device 1010 to facilitate communication between computing device 1002 and the network resource.

FIG. 17 is a flow chart illustrating a method 1700 of controlling data exposure, such as may be implemented by a data protection device as disclosed herein. For purposes of clarity only, references are made in the following discussion of method 1700 to elements of the foregoing figures. Accordingly, any such references should be seen as illustrative examples only and method 1700 should not be considered to be limited to the other specific embodiments herein and, in particular, those that use the same references.

As previously discussed, data protection device 1010 is generally embedded within or coupled as a peripheral to a computing device, e.g., computing device 1002, and receives power from the computing device. For purposes of the following discussion, the computing device from which data protection device 1010 is coupled will be referred to as the primary computing device for clarity only. Any other computing devices that may communicate using data protection device 1010 are referred to as secondary computing devices. The terms "primary" and "secondary" should not be given any other significance beyond distinguishing the computing devices form one another and their relationship to data protection device 1010.

At step 1702, data protection device 1010 receives power from a primary computing device. For example, as illustrated in FIG. 10, data protection device 1010 may be electrically coupled to power bus 1012 of computing device 1002 through power interface 1011.

At step 1704, data protection device 1010 receives a request to access a network resource from a computing device. In certain embodiments, the computing device may be the primary computing device, e.g., computing device 1002 of the preceding figures. Alternatively, the computing device may be a secondary computing device, e.g., computing device 1602 of FIG. 16, such that the data protection device 1010 receives power from the primary computing device but the request from the secondary computing device.

In certain embodiments, data protection device 1010 receives the request from the computing device over a secured connection. For example, when the request is received from the primary computing device, such a secure connection may correspond to connection 1003 of preceding FIGS. 10-13, connection 1003 being between a communication module 1006 of computing device 1002 (e.g., the primary computing device) and data protection device 1010. As another example, in embodiments in which the request is received from a secondary computing device, such a secure connection may correspond to connection 1603 of preceding FIG. 16, connection 1603 being between a communication module 1606 of computing device 1602 (e.g., a secondary computing device) and data protection device 1010.

At step 1706, data protection device 1010 receives data associated with the request received in step 1704. Such data may include data to be transmitted to the network resource, data regarding the computing device, data regarding a network system in communication with the computing device, data regarding a user of the computing device (including behavioral data of the user), data regarding a choice of protocol (any layer, e.g., ciphers used in mutual Transport Layer Security (mTLS)), etc. Various non-limiting examples of data that may be associated with the request are provided throughout this disclosure.

At step 1708, data protection device 1010 or a data protection platform (e.g., data protection platform 1040, identifies a privacy element. As discussed herein, the privacy element may be generally associated with the computing device, a user of the computing device, the communication intended for the network resource, or any other similar aspect of embodiments of the present disclosure. The privacy element is generally detectable by a network host, which may be an authorized network host or an unauthorized network host (e.g., a hacker).

As noted above, the privacy element may be identified by data protection device 1010 or data protection platform 1040. In embodiments in which data protection platform 1040 identifies the privacy element, the data may first be transmitted from data protection device 1010 to data protection platform 1040 over a corresponding connection.

At step 1710, data protection device 1010 or data protection platform 1040 generates a modified privacy element. More specifically, in embodiments in which data protection device 1010 identifies the privacy element, data protection device 1010 may generate the modified privacy element while in embodiments in which data protection platform 1040 identifies the privacy element, data protection platform 1040 may generate the modified privacy element.

The process of generating a modified privacy element may include accessing an artificial profile. As discussed herein, privacy elements generally provide some information about a computing device, a user of a computing device, and the like. Accordingly, privacy elements may be related to hardware or software configurations of a computing device, data sent or received by the computing device, activity by a user of the computing device, exposed physical data points of a user (e.g. biometric) and any other identifiable aspects of a computing device and/or its use. Further examples of privacy elements include power consumption by a computing device and/or its components (as described above in the context of FIGS. 14A and 14B) and any physical media (e.g., Ethernet) used by the computing device. In embodiments of the present disclosure, the artificial profile generally provides relationships between one or more privacy elements and respective modified privacy elements. Such relationships may include, for example, a mapping of a privacy element to its corresponding modified privacy element, a transformation or function that may be applied to the privacy element to generate the modified privacy element, or similar information for identifying or generating a modified privacy element based on the privacy element.

In embodiments in which data protection device 1010 identifies privacy elements and generates corresponding modified privacy elements, method 1700 may further include data protection device 1010 receiving the artificial profile for generating the modified privacy element from an outside source. In at least some embodiments, data protection device 1010 may receive the artificial profile from data protection platform 1040. In such embodiments, the artificial profile may be based on a machine learned model, an expert system, or other artificial intelligence system or model of the data protection platform, such as artificial profile model 700 discussed above in the context of FIG. 7. The machine learned model may in turn be based on one or more attribution vectors that represent detectable characteristics associated with privacy element that have been clustered based on similarity in values.

As discussed above in the context of FIGS. 14A and 14B, power consumption by computing device 1002 and/or its components are privacy elements that may reveal information regarding computing device 1002 and its function. Accordingly, in certain embodiments, generating a modified data privacy element in step 1710 may include generating a modified power consumption pattern, such as by use of a power modulator incorporated into the computing device 1002 or data protection device 1010.

At step 1712, data protection device 1010 or access to the network resource is established with the modified privacy element. More specifically, in embodiments in which data protection device 1010 identifies the privacy element and generates the modified privacy element, data protection device 1010 may establish access to the network resource. For example, data protection device 1010 may include a communication interface adapted to connect to and communicate with network resource. In embodiments in which data protection platform 1040 identifies the privacy element and generates the modified privacy element, data protection platform 1040 may establish access to the network resource. For example, data protection platform 1040 may similarly include a communication interface adapted to connect to and communicate with network resource.

As a result of establishing access to the network resource using the modified privacy element, any subsequent attempts by a network host to detect the privacy element result in the network host detecting the modified privacy element instead.

As discussed above in the context of FIG. 13, in embodiments in which data protection device 1010 is a peripheral device, data protection device 1010 may be moved to a different computing device. Accordingly, in at least certain embodiments and subsequent to data protection device 1010 being coupled to the second computing device, method 1700 may further include substantial repetition of steps 1702-1712, albeit with the second computing device functioning as the primary computing device. Stated differently, following coupling of data protection device 1010 to the second computing device, data protection device 1010 may receive a request to access a network resource, identify a privacy element, generate a modified privacy element, and then establish access to the network resource using the modified privacy element. In at least certain instances, the network resource accessed by the original computing device and the second computing device may be the same. Similarly, data protection device 1010 may be configured to modify generate a similar modified privacy element for each computing device. For example, when utilized with the first computing device, data protection device 1010 may modify a privacy element indicating the first computing device is running Google Chrome to instead indicate the first computing device is running Mozilla Firefox. When coupled to and operated with the second computing device, data protection device 1010 may similarly generate a modified privacy element indicating the second computing device is running Mozilla Firefox even though the second computing device may be running Microsoft Edge.

As previously discussed in the context of FIGS. 14A and 14B, data protection device 1010 may include a power modulator 1402 for obfuscating power consumption by data protection device 1010, computing device 1002, or one or more components of computing device 1002. Accordingly, method 1700 may further include activating power modulator 1402 to draw power from the primary computing device, thereby modifying a base power consumption of the primary computing device.

FIG. 18 is a block diagram 1800 of an example embodiment of data protection device 1010. As illustrated, data protection device 1010 includes a processor set 1026 including one or more processors, which may be communicatively coupled to a memory 1028. Among other things, memory 1028 may store instructions accessible and executable by processor set 1026 to perform the various functions of data protection device 1010 described herein.

As previously discussed, data protection device 1010 further includes a power interface 1011 configured to electrically couple data protection device 1010 to a power source of a computing device. Data protection device 1010 may further include a battery 1030 for storing power. For example, in certain embodiments, data protection device 1010 may operate primarily off power provided by battery 1030 and power interface 1011 may be configured to charge battery 1030 when power is available, when a charge on battery 1030 is below a certain charge threshold, or under other similar conditions. Although not illustrated in FIG. 18, power interface 1011 may further include a power modulator, such as power modulator 1402 of FIGS. 14A and 14B. In such embodiments, power modulator 1402 may be communicatively coupled to processor set 1026 such that processor set 1026 may selectively activate/deactivate power modulator 1402, modify performance characteristics of power modulator 1402 (e.g., load and timing of power modulator), or otherwise control and operate power modulator 1402 in accordance with the present disclosure.

In certain embodiments, such as illustrated in FIG. 16, in which data protection device 1010 is configured as a peripheral device, power interface 1011 may be incorporated into a peripheral interface, such as a USB interface or similar peripheral interface capable of providing power to data protection device 1010.

Data protection device 1010 may further include multiple communication interfaces. In certain embodiments, communication interfaces of data protection device 1010 may include each of a local communication interface 1022 and a remote communication interface 1024. During use, local communication interface 1022 establishes a secure connection with a communication module of a computing device. Data protection device 1010 may then receive requests to access and data for network resources through local communication interface 1022. For example, in the context of FIGS. 10-13, local communication interface 1022 may facilitate communication between data protection device 1010 and communication module 1006 of computing device 1002 over secure connection 1003. In the hotspot-type implementation of FIG. 16, local communication interface 1022 may facilitate communication between data protection device 1010 and communication module 1606 of second computing device 1602. Non-limiting examples of remote communication interfaces include those for Wi-Fi, cellular, Ethernet, and LoRaWAN communication as well as shorter range protocols such as Bluetooth, Bluetooth Low Energy (BLE), ZigBee, and infrared transmission.

Remote communication interface 1024 generally facilitates communication between data protection device 1010 and one or both of a data protection platform (e.g., data protection platform 1040 of FIGS. 11 and 12) or a network resource (e.g., network resource 1050 of FIGS. 10-13). Non-limiting examples of remote communication interfaces include Wi-Fi, cellular, Ethernet, and LoRaWAN network interfaces.

The terms "local" and "remote" as used in the context of the communication interfaces of FIG. 18 are not intended to convey any meaning regarding relative location between data protection device 1010 and the device, platform, resource, etc. with which data protection device 1010 communicates using the communication interfaces. Rather, the terms "local" and "remote" are intended to indicate the particular functions provided by the communication interfaces. More specifically, a local communication interface is a communication interface through which data protection device 1010 may communicate with a computing device over a secure connection. A remote communication interface, on the other hand, is a communication interface through which data protection device 1010 may communicate with another computing device, network resource, network, etc. over a connection that may or may not be secure. Accordingly, requests to access a network resource and associated data are generally received by data protection device 1010 from a computing device through a local communication interface. Outgoing communications to a network resource or a data protection platform from data protection platform 1040 are generally through a remote communication interface and may include modified data privacy elements.

Figure 19:
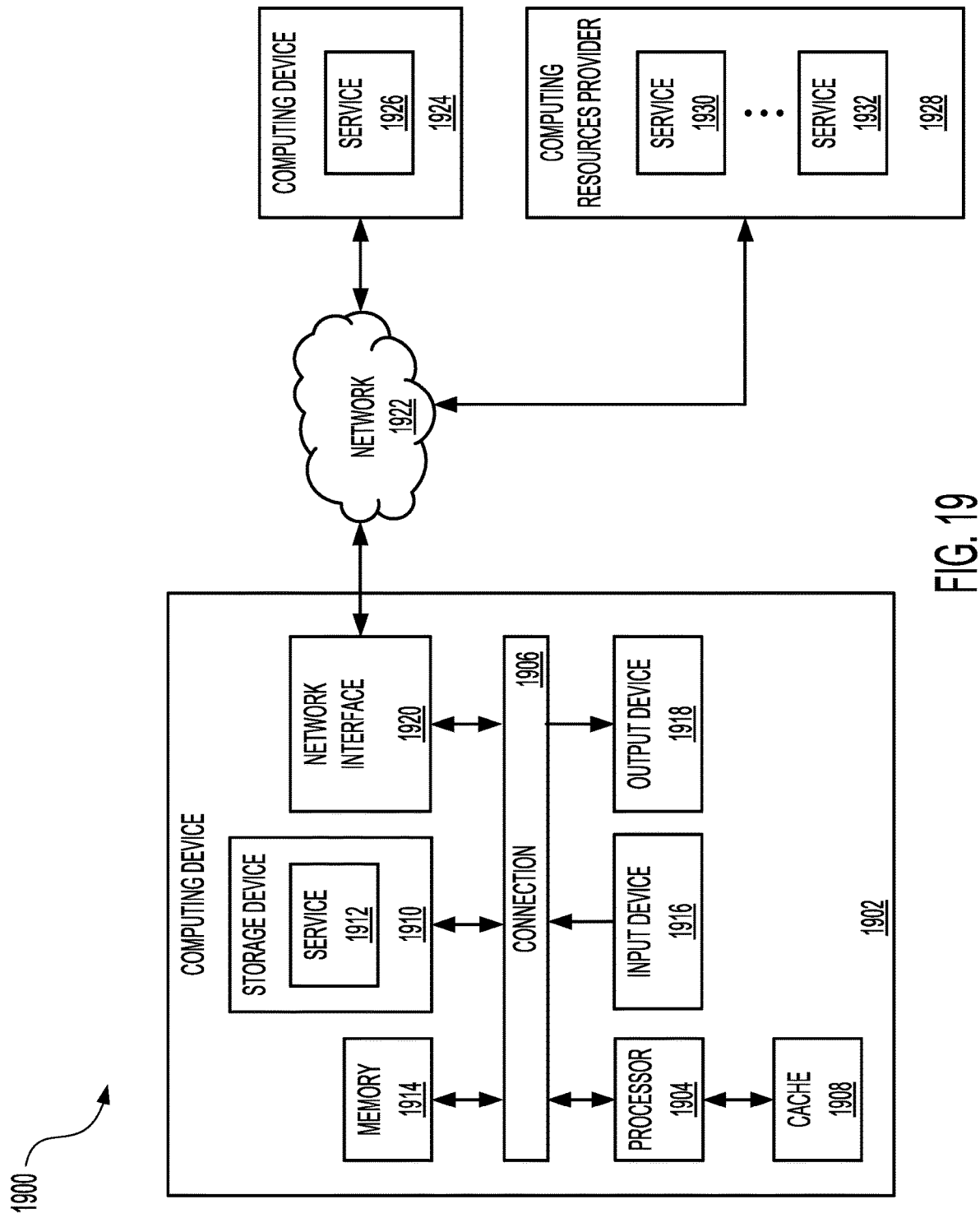
FIG. 19 shows a computing system architecture including various components in electrical communication with each other using a connection in accordance with various embodiments.

FIG. 19 illustrates a computing system architecture 1900, including various components in electrical communication with each other, in accordance with some embodiments. The example computing system architecture 1900 illustrated in FIG. 19 includes a computing device 1902, which has various components in electrical communication with each other using a connection 1906, such as a bus, in accordance with some implementations. The example computing system architecture 1900 includes a processor 1904 that is in electrical communication with various system components, using the connection 1906, and including the system memory 1914. In some embodiments, the system memory 1914 includes read-only memory (ROM), random-access memory (RAM), and other such memory technologies including, but not limited to, those described herein. In some embodiments, the example computing system architecture 1900 includes a cache 1908 of high-speed memory connected directly with, in close proximity to, or integrated as part of the processor 1904. The system architecture 1900 can copy data from the memory 1914 and/or the storage device 1910 to the cache 1908 for quick access by the processor 1904. In this way, the cache 1908 can provide a performance boost that decreases or eliminates processor delays in the processor 1904 due to waiting for data. Using modules, methods and services such as those described herein, the processor 1904 can be configured to perform various actions. In some embodiments, the cache 1908 may include multiple types of cache including, for example, level one (L1) and level two (L2) cache. The memory 1914 may be referred to herein as system memory or computer system memory. The memory 1914 may include, at various times, elements of an operating system, one or more applications, data associated with the operating system or the one or more applications, or other such data associated with the computing device 1902.

Other system memory 1914 can be available for use as well. The memory 1914 can include multiple different types of memory with different performance characteristics. The processor 1904 can include any general purpose processor and one or more hardware or software services, such as service 1912 stored in storage device 1910, configured to control the processor 1904 as well as a special-purpose processor where software instructions are incorporated into the actual processor design. The processor 1904 can be a completely self-contained computing system, containing multiple cores or processors, connectors (e.g., buses), memory, memory controllers, caches, etc. In some embodiments, such a self-contained computing system with multiple cores is symmetric. In some embodiments, such a self-contained computing system with multiple cores is asymmetric. In some embodiments, the processor 1904 can be a microprocessor, a microcontroller, a digital signal processor ("DSP"), or a combination of these and/or other types of processors. In some embodiments, the processor 1904 can include multiple elements such as a core, one or more registers, and one or more processing units such as an arithmetic logic unit (ALU), a floating point unit (FPU), a graphics processing unit (GPU), a physics processing unit (PPU), a digital system processing (DSP) unit, or combinations of these and/or other such processing units.

To enable user interaction with the computing system architecture 1900, an input device 1916 can represent any number of input mechanisms, such as a microphone for speech, a touch-sensitive screen for gesture or graphical input, keyboard, mouse, motion input, pen, and other such input devices. An output device 1918 can also be one or more of a number of output mechanisms known to those of skill in the art including, but not limited to, monitors, speakers, printers, haptic devices, and other such output devices. In some instances, multimodal systems can enable a user to provide multiple types of input to communicate with the computing system architecture 1900. In some embodiments, the input device 1916 and/or the output device 1918 can be coupled to the computing device 1902 using a remote connection device such as, for example, a communication interface such as the network interface 1920 described herein. In such embodiments, the communication interface can govern and manage the input and output received from the attached input device 1916 and/or output device 1918. As may be contemplated, there is no restriction on operating on any particular hardware arrangement and accordingly the basic features here may easily be substituted for other hardware, software, or firmware arrangements as they are developed.

In some embodiments, the storage device 1910 can be described as non-volatile storage or non-volatile memory. Such non-volatile memory or non-volatile storage can be a hard disk or other types of computer readable media which can store data that are accessible by a computer, such as magnetic cassettes, flash memory cards, solid state memory devices, digital versatile disks, cartridges, RAM, ROM, and hybrids thereof.

As described above, the storage device 1910 can include hardware and/or software services such as service 1912 that can control or configure the processor 1904 to perform one or more functions including, but not limited to, the methods, processes, functions, systems, and services described herein in various embodiments. In some embodiments, the hardware or software services can be implemented as modules. As illustrated in example computing system architecture 1900, the storage device 1910 can be connected to other parts of the computing device 1902 using the system connection 1906. In an embodiment, a hardware service or hardware module such as service 1912, that performs a function can include a software component stored in a non-transitory computer-readable medium that, in connection with the necessary hardware components, such as the processor 1904, connection 1906, cache 1908, storage device 1910, memory 1914, input device 1916, output device 1918, and so forth, can carry out the functions such as those described herein.

The disclosed approaches for data protection and data exposure management can be performed using a computing system such as the example computing system illustrated in FIG. 19, using one or more components of the example computing system architecture 1900. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device.

In some embodiments, the processor can be configured to carry out some or all of methods and functions for data protection and data exposure management described herein by, for example, executing code using a processor such as processor 1904 wherein the code is stored in memory such as memory 1914 as described herein. One or more of a user device, a provider server or system, a database system, or other such devices, services, or systems may include some or all of the components of the computing system such as the example computing system illustrated in FIG. 19, using one or more components of the example computing system architecture 1900 illustrated herein. As may be contemplated, variations on such systems can be considered as within the scope of the present disclosure.

This disclosure contemplates the computer system taking any suitable physical form. As example and not by way of limitation, the computer system can be an embedded computer system, a system-on-chip (SOC), a single-board computer system (SBC) (such as, for example, a computer-on-module (COM) or system-on-module (SOM)), a desktop computer system, a laptop or notebook computer system, a tablet computer system, a wearable computer system or interface, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud computing system which may include one or more cloud components in one or more networks as described herein in association with the computing resources provider 1928. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor 1904 can be a conventional microprocessor such as an Intel® microprocessor, an AMD® microprocessor, a Motorola® microprocessor, or other such microprocessors. One of skill in the relevant art will recognize that the terms "machine-readable (storage) medium" or "computer-readable (storage) medium" include any type of device that is accessible by the processor.

The memory 1914 can be coupled to the processor 1904 by, for example, a connector such as connector 1906, or a bus. As used herein, a connector or bus such as connector 1906 is a communications system that transfers data between components within the computing device 1902 and may, in some embodiments, be used to transfer data between computing devices. The connector 1906 can be a data bus, a memory bus, a system bus, or other such data transfer mechanism. Examples of such connectors include, but are not limited to, an industry standard architecture (ISA" bus, an extended ISA (EISA) bus, a parallel AT attachment (PATA" bus (e.g., an integrated drive electronics (IDE) or an extended IDE (EIDE) bus), or the various types of parallel component interconnect (PCI) buses (e.g., PCI, PCIe, PCI-104, etc.).

The memory 1914 can include RAM including, but not limited to, dynamic RAM (DRAM), static RAM (SRAM), synchronous dynamic RAM (SDRAM), non-volatile random access memory (NVRAM), and other types of RAM. The DRAM may include error-correcting code (EEC). The memory can also include ROM including, but not limited to, programmable ROM (PROM), erasable and programmable ROM (EPROM), electronically erasable and programmable ROM (EEPROM), Flash Memory, masked ROM (MROM), and other types or ROM. The memory 1914 can also include magnetic or optical data storage media including read-only (e.g., CD ROM and DVD ROM) or otherwise (e.g., CD or DVD). The memory can be local, remote, or distributed.

As described above, the connector 1906 (or bus) can also couple the processor 1904 to the storage device 1910, which may include non-volatile memory or storage and which may also include a drive unit. In some embodiments, the non-volatile memory or storage is a magnetic floppy or hard disk, a magnetic-optical disk, an optical disk, a ROM (e.g., a CD-ROM, DVD-ROM, EPROM, or EEPROM), a magnetic or optical card, or another form of storage for data. Some of this data is may be written, by a direct memory access process, into memory during execution of software in a computer system. The non-volatile memory or storage can be local, remote, or distributed. In some embodiments, the non-volatile memory or storage is optional. As may be contemplated, a computing system can be created with all applicable data available in memory. A typical computer system will usually include at least one processor, memory, and a device (e.g., a bus) coupling the memory to the processor.

Software and/or data associated with software can be stored in the non-volatile memory and/or the drive unit. In some embodiments (e.g., for large programs) it may not be possible to store the entire program and/or data in the memory at any one time. In such embodiments, the program and/or data can be moved in and out of memory from, for example, an additional storage device such as storage device 1910. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The connection 1906 can also couple the processor 1904 to a network interface device such as the network interface 1920. The interface can include one or more of a modem or other such network interfaces including, but not limited to those described herein. It will be appreciated that the network interface 1920 may be considered to be part of the computing device 1902 or may be separate from the computing device 1902. The network interface 1920 can include one or more of an analog modem, Integrated Services Digital Network (ISDN) modem, cable modem, token ring interface, satellite transmission interface, or other interfaces for coupling a computer system to other computer systems. In some embodiments, the network interface 1920 can include one or more input and/or output (I/O) devices. The I/O devices can include, by way of example but not limitation, input devices such as input device 1916 and/or output devices such as output device 1918. For example, the network interface 1920 may include a keyboard, a mouse, a printer, a scanner, a display device, and other such components. Other examples of input devices and output devices are described herein. In some embodiments, a communication interface device such as a network interface 1920 and/or other such devices can be implemented as a separate computing device.

In some embodiments, a network communication interface device can be implemented as a virtual computing device (i.e., implemented using one or more virtualization techniques) so that, for example, it may appear to a user of computing device 1902 that communications with the network 1922 are via a network interface 1920 of the computing device 1902 when the network interface 1920 is a virtual device running on a different computer device. In some embodiments, a communication interface device (e.g., a network interface 1920 and/or other such devices) may be a hybrid of physical and virtual components so that a part of the device is implemented as components of the computing device 1902 and a part of the device is implemented as a virtual device running on one or more other computer devices. For example, a computer system may use a virtual printer to print a document to a different file format where the virtual printer first "prints" the document to a virtual screen and then displays the document on the physical screen of a computing device.

In operation, the computer system can be controlled by operating system software that includes a file management system, such as a disk operating system. One example of operating system software with associated file management system software is the family of Windows® operating systems and their associated file management systems. Another example of operating system software with its associated file management system software is the Linux™ operating system and its associated file management system including, but not limited to, the various types and implementations of the Linux® operating system and their associated file management systems. The file management system can be stored in the non-volatile memory and/or drive unit and can cause the processor to execute the various acts required by the operating system to input and output data and to store data in the memory, including storing files on the non-volatile memory and/or drive unit. As may be contemplated, other types of operating systems such as, for example, MacOS®, other types of UNIX® operating systems (e.g., BSD™ and descendants, Xenix™, SunOS™, HP-UX®, etc.), mobile operating systems (e.g., iOS® and variants, Chrome®, Ubuntu Touch®, watchOS®, Windows 10 Mobile®, the Blackberry® OS, etc.), and real-time operating systems (e.g., VxWorks®, QNX®, eCos®, RTLinux®, etc.) may be considered as within the scope of the present disclosure. As may be contemplated, the names of operating systems, mobile operating systems, real-time operating systems, languages, and devices, listed herein may be registered trademarks, service marks, or designs of various associated entities.

In some embodiments, the computing device 1902 can be connected to one or more additional computing devices such as computing device 1924 via a network 1922 using a connection such as the network interface 1920. In such embodiments, the computing device 1924 may execute one or more services 1926 to perform one or more functions under the control of, or on behalf of, programs and/or services operating on computing device 1902. In some embodiments, a computing device such as computing device 1924 may include one or more of the types of components as described in connection with computing device 1902 including, but not limited to, a processor such as processor 1904, a connection such as connection 1906, a cache such as cache 1908, a storage device such as storage device 1910, memory such as memory 1914, an input device such as input device 1916, and an output device such as output device 1918. In such embodiments, the computing device 1924 can carry out the functions such as those described herein in connection with computing device 1902. In some embodiments, the computing device 1902 can be connected to a plurality of computing devices such as computing device 1924, each of which may also be connected to a plurality of computing devices such as computing device 1924. Such an embodiment may be referred to herein as a distributed computing environment.

The network 1922 can be any network including an internet, an intranet, an extranet, a cellular network, a Wi-Fi network, a local area network (LAN), a wide area network (WAN), a satellite network, a Bluetooth® network, a virtual private network (VPN), a public switched telephone network, an infrared (IR) network, an Internet of things (IoT network) or any other such network or combination of networks. Communications via the network 1922 can be wired connections, wireless connections, or combinations thereof. Communications via the network 1922 can be made via a variety of communications protocols including, but not limited to, Transmission Control Protocol/Internet Protocol (TCP/IP), User Datagram Protocol (UDP), protocols in various layers of the Open System Interconnection (OSI) model, File Transfer Protocol (FTP), Universal Plug and Play (UPnP), Network File System (NFS), Server Message Block (SMB), Common Internet File System (CIF S), and other such communications protocols.

In some embodiments, communications via the network 1922 are "two-way" in that, where a communication pathway exists from a source (e.g., the computing device 1902) to a destination (e.g., the computing device 1924), a communication pathway also exists from the computing device 1924 the computing device 1902. In some embodiments (not illustrated in FIG. 19), communications over the network are "one-way" in that a communication pathway from a source to a destination does not imply (or require) a communication pathway in the opposite direction. One example of a "one-way" communication via the network 1922 is a physical network connection that uses UDP to send data. A UDP connection is one way, and does not imply or require an acknowledgement of the data packets. Thus, the network traffic goes in a single direction. In such an example, data may be sent to the computing device 1924 from the computing device 1902 and stored using the computing device 1924. Such data may then not be accessible from the computing device 1902 as there is no communication pathway from the computing device 1924 to the computing device 1902.

Communications over the network 1922, within the computing device 1902, within the computing device 1924, or within the computing resources provider 1928 can include information, which also may be referred to herein as content. The information may include text, graphics, audio, video, haptics, and/or any other information that can be provided to a user of the computing device such as the computing device 1902. In an embodiment, the information can be delivered using a transfer protocol such as Hypertext Markup Language (HTML), Extensible Markup Language (XML), JavaScript®, Cascading Style Sheets (CSS), JavaScript® Object Notation (JSON), and other such protocols and/or structured languages. The information may first be processed by the computing device 1902 and presented to a user of the computing device 1902 using forms that are perceptible via sight, sound, smell, taste, touch, or other such mechanisms. In some embodiments, communications over the network 1922 can be received and/or processed by a computing device configured as a server. Such communications can be sent and received using PHP: Hypertext Preprocessor ("PHP"), Python™, Ruby, Perl® and variants, Java®, HTML, XML, or another such server-side processing language.

In some embodiments, the computing device 1902 and/or the computing device 1924 can be connected to a computing resources provider 1928 via the network 1922 using a network interface such as those described herein (e.g. network interface 1920). In such embodiments, one or more systems (e.g., service 1930 and service 1932) hosted within the computing resources provider 1928 (also referred to herein as within "a computing resources provider environment") may execute one or more services to perform one or more functions under the control of, or on behalf of, programs and/or services operating on computing device 1902 and/or computing device 1924. Systems such as service 1930 and service 1932 may include one or more computing devices such as those described herein to execute computer code to perform the one or more functions under the control of, or on behalf of, programs and/or services operating on computing device 1902 and/or computing device 1924.

In some embodiments, the communications over the network 1922, within the computing device 1902, within the computing device 1924, or within the computing resources provider 1928 can be secure and/or encrypted communications. Such communications may be encrypted at the source (e.g., before sending) and decrypted at the destination. As used herein, encryption is the process whereby content that is to be communicated via, for example a public network, is scrambled or obfuscated before sending. This ensures that, if the content is intercepted during transit by someone other than the intended recipient, the content cannot be easily read by the interceptor. Encryption generally involves converting content from plaintext (i.e., the unencrypted content) to ciphertext (i.e., the encrypted content). When the ciphertext is received at a destination, the ciphertext is converted back into the plaintext using a decryption algorithm and generally involving a decryption key. Ideally, the ciphertext is unintelligible and cannot be used to reconstruct the plaintext without the decryption key. In practice, most encryptions rely on the decryption being computationally prohibitive without the key, with some encryption protocols (e.g., one-time pads) being practically impossible to decrypt without the decryption key. Various methods of encryption and decryption exist including, but not limited to, one-time pads, substitution cyphers, symmetric and asymmetric (e.g., public) keys, ciphertext padding, multiple encryption, and other such methods.

In some embodiments, the network interface 1920 may include processes to encrypt the communications over the network 1922 and a similar network interface at the computing device 1924 or within devices of the computing resources provide 1928 may include the corresponding processes to decrypt the communications received via the network 1922. In some embodiments, processes running within the computing device 1902, executing on the processor 1904 and residing in memory 1914 may encrypt the communications before those communications are sent through the network interface 1920 and over the network 1922. In some embodiments, processes running within the computing device 1924 or within devices of the computing resources provide 1928 may decrypt the communications received via the network 1922. In some embodiments, dedicated hardware for decrypting those communications may be present within the computing device 1902, within the computing device 1924, or within computing devices of the computing resources provide 1928.

In some embodiments, the encryption and decryption processes may include a combination of methodologies such that, for example, the communications may be encrypted by the network interface 1920, encrypted by processes running within the computing device 1902, or encrypted by dedicated encryption hardware within the computing device and decrypted (e.g., at the computing device 1924 or devices of the computing resources provider 1928) using a different methodology. In some embodiments, encryption and decryption of communications may flow both ways in that, for example, the computing device 1924 may encrypt and the computing device 1902 and/or devices of the computing resources provide 1928 may decrypt. In some embodiments, the network 1922 may include one or more devices (not shown) that encrypt and decrypt some or all communications sent via the network 1922 and/or may include policies that all communications sent over the network must be encrypted before sending. Such a network may be referred to as a secure network.

In some embodiments, the encryption and decryption processes are intentionally weak processes. For example, an encryption, encoding, and/or compression process that is intentionally weak may be used to enable the encrypted, encoded, and/or or compressed data to easily observed, decrypted, decoded, or decompressed by a (possibly adversarial) third-party. In an embodiment, an intentionally weak encryption process can be used where the communication contains data that, if decrypted, can be used to convey a piece of information to intentionally mislead the third-party. If the encryption is too strong, the third-party may not be able to extract the misleading information. For example, using a "broken" encryption such RC4 or Blowfish instead of a stronger encryption can be used as a component in managing data privacy.

In some embodiments, network security may be managed by virtualizing all communications sent over the network and also by obfuscating network packet identifying information (e.g., source, destination, header information, etc.) so that neither the content of the packet nor the sender or receiver of the packet can be determined. Such virtualized networks, often referred to as virtual private networks (VPNs), can be implemented using hardware, software, firmware, or other such methodologies. A VPN may include a variety of encryption technologies including, but not limited to, those described herein as well as other custom encryption technologies. A VPN may also include a variety of servers located in a variety of locations that can be used to obfuscate the path of network communications (e.g., by routing the packet through multiple servers in multiple countries and on multiple continents).

In some embodiments, encryption and decryption of communications is not limited to encryption and decryption of communications sent via the network @22. For example, encryption and decryption may include within the computing device 1902 so that content that is stored in memory 1914 is encrypted before it is stored on the storage device 1910 so that data stored on the storage device 1910 is not accessible, even if one has direct access to the storage device. Such content would then be decrypted when retrieved from the storage device 1910 before being used (e.g., by the processor 1904), displayed (e.g., by the output device 1918), or communicated (e.g., using the network interface 1920). In some embodiments, systems such as those illustrated in the computing system architecture 1900 may include multiple methods and/or layers of encryption and decryption so that, for example, plaintext may be encrypted by component such as those described herein to produce ciphertext, and that ciphertext may then be encrypted by another component (i.e., the ciphertext from the first component becomes the plaintext for the second component).

For example, the computing resources provider 1928 may provide a service, operating on service 1930 to store data for the computing device 1902 when, for example, the amount of data that the computing device 1902 exceeds the capacity of storage device 1910. In another example, the computing resources provider 1928 may provide a service to first instantiate a virtual machine (VM) on service 1932, use that VM to access the data stored on service 1932, perform one or more operations on that data, and provide a result of those one or more operations to the computing device 1902. Such operations (e.g., data storage and VM instantiation) may be referred to herein as operating "in the cloud," "within a cloud computing environment," or "within a hosted virtual machine environment," and the computing resources provider 1928 may also be referred to herein as "the cloud." Examples of such computing resources providers include, but are not limited to Amazon® Web Services (AWS®), Microsoft's Azure®, IBM Cloud®, Google Cloud®, Oracle Cloud® etc.

Services provided by a computing resources provider 1928 include, but are not limited to, data analytics, data storage, archival storage, big data storage, virtual computing (including various scalable VM architectures), blockchain services, containers (e.g., application encapsulation), database services, development environments (including sandbox development environments), e-commerce solutions, game services, media and content management services, security services, serverless hosting, virtual reality (VR) systems, and augmented reality (AR) systems. Various techniques to facilitate such services include, but are not be limited to, virtual machines, virtual storage, database services, system schedulers (e.g., hypervisors), resource management systems, various types of short-term, mid-term, long-term, and archival storage devices, and other such techniques.

In some embodiments, the encryption and decryption technologies such as those described herein may implemented by virtual security modules operating within the computing device 1902, within the computing device 1924, or within devices of the computing resources provider 1928. Such virtual security modules may appear to be hardware implementations of security modules for encrypting and decrypting content to an observer.

As may be contemplated, the systems such as service 1930 and service 1932 may implement versions of various services (e.g., the service 1912 or the service 1926) on behalf of, or under the control of, computing device 1902 and/or computing device 1924. Such implemented versions of various services may involve one or more virtualization techniques so that, for example, it may appear to a user of computing device 1902 that the service 1912 is executing on the computing device 1902 when the service is executing on, for example, service 1930. As may also be contemplated, the various services operating within the computing resources provider 1928 environment may be distributed among various systems within the environment as well as partially distributed onto computing device 1924 and/or computing device 1902.

Client devices, user devices, computer resources provider devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things such as those described herein. The input devices can include, for example, a keyboard, a mouse, a key pad, a touch interface, a microphone, a camera, and/or other types of input devices including, but not limited to, those described herein. The output devices can include, for example, a display screen, a speaker, a haptic feedback system, a printer, and/or other types of output devices including, but not limited to, those described herein. A data storage device, such as a hard drive or flash memory, can enable the computing device to temporarily or permanently store data. A network interface, such as a wireless or wired interface, can enable the computing device to communicate with a network. Examples of computing devices (e.g., the computing device 1902) include, but is not limited to, desktop computers, laptop computers, server computers, hand-held computers, tablets, smart phones, personal digital assistants, digital home assistants, wearable devices, smart devices, and combinations of these and/or other such computing devices as well as machines and apparatuses in which a computing device has been incorporated and/or virtually implemented.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as that described herein. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices (e.g., a combination of a DSP and a microprocessor), a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

As used herein, the term "machine-readable media" and equivalent terms "machine-readable storage media," "computer-readable media," and "computer-readable storage media" refer to media that includes, but is not limited to, portable or non-portable storage devices, optical storage devices, removable or non-removable storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), solid state drives (SSD), flash memory, memory or memory devices.

A machine-readable medium or machine-readable storage medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like. Further examples of machine-readable storage media, machine-readable media, or computer-readable (storage) media include but are not limited to recordable type media such as volatile and non-volatile memory devices, floppy and other removable disks, hard disk drives, optical disks (e.g., CDs, DVDs, etc.), among others, and transmission type media such as digital and analog communication links.

As may be contemplated, while examples herein may illustrate or refer to a machine-readable medium or machine-readable storage medium as a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

Some portions of the detailed description herein may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

It is also noted that individual implementations may be described as a process which is depicted as a flowchart, a flow diagram, a data flow diagram, a structure diagram, or a block diagram (e.g., the process 900 illustrated in FIG. 9 and the method 1700 illustrated in FIG. 17). Although a flowchart, a flow diagram, a data flow diagram, a structure diagram, or a block diagram may describe the operations as a sequential process, many of the operations can be performed in parallel or concurrently. In addition, the order of the operations may be re-arranged. A process illustrated in a figure is terminated when its operations are completed, but could have additional steps not included in the figure. A process may correspond to a method, a function, a procedure, a subroutine, a subprogram, etc. When a process corresponds to a function, its termination can correspond to a return of the function to the calling function or the main function.

In some embodiments, one or more implementations of an algorithm such as those described herein may be implemented using a machine learning or artificial intelligence algorithm. Such a machine learning or artificial intelligence algorithm may be trained using supervised, unsupervised, reinforcement, or other such training techniques. For example, a set of data may be analyzed using one of a variety of machine learning algorithms to identify correlations between different elements of the set of data without supervision and feedback (e.g., an unsupervised training technique). A machine learning data analysis algorithm may also be trained using sample or live data to identify potential correlations. Such algorithms may include k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Other examples of machine learning or artificial intelligence algorithms include, but are not limited to, genetic algorithms, backpropagation, reinforcement learning, decision trees, liner classification, artificial neural networks, anomaly detection, and such. More generally, machine learning or artificial intelligence methods may include regression analysis, dimensionality reduction, metalearning, reinforcement learning, deep learning, and other such algorithms and/or methods. As may be contemplated, the terms "machine learning" and "artificial intelligence" are frequently used interchangeably due to the degree of overlap between these fields and many of the disclosed techniques and algorithms have similar approaches.

As an example of a supervised training technique, a set of data can be selected for training of the machine learning model to facilitate identification of correlations between members of the set of data. The machine learning model may be evaluated to determine, based on the sample inputs supplied to the machine learning model, whether the machine learning model is producing accurate correlations between members of the set of data. Based on this evaluation, the machine learning model may be modified to increase the likelihood of the machine learning model identifying the desired correlations. The machine learning model may further be dynamically trained by soliciting feedback from users of a system as to the efficacy of correlations provided by the machine learning algorithm or artificial intelligence algorithm (i.e., the supervision). The machine learning algorithm or artificial intelligence may use this feedback to improve the algorithm for generating correlations (e.g., the feedback may be used to further train the machine learning algorithm or artificial intelligence to provide more accurate correlations).

The various examples of flowcharts, flow diagrams, data flow diagrams, structure diagrams, or block diagrams discussed herein may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments) such as those described herein. A processor(s), implemented in an integrated circuit, may perform the necessary tasks.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

It should be noted, however, that the algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC (e.g., an iPad®, a Microsoft Surface®, a Chromebook®, etc.), a laptop computer, a set-top box (STB), a personal digital assistant (PDA), a mobile device (e.g., a cellular telephone, an iPhone®, and Android® device, a Blackberry®, etc.), a wearable device, an embedded computer system, an electronic book reader, a processor, a telephone, a web appliance, a network router, switch or bridge, or any system capable of executing a set of instructions (sequential or otherwise) that specify actions to be taken by that system. The system may also be a virtual system such as a virtual version of one of the aforementioned devices that may be hosted on another computer device such as the computer device 1902.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples. In an embodiment, a memory device that does not operate with a change in state from a binary one to a binary zero or vice-versa can be used as part of a computing system to implement the systems and methods described herein. For example, a quantum computer may operate with memory that uses quantum states (i.e., superposition and entanglement). In a quantum computing system, a quantum bit (or qubit) can be in a binary zero state, or a binary one state, or a superposition of both states. Accordingly, computer systems that operate using non-binary memory to implement the systems and methods described herein may be considered as within the scope of the present disclosure.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting or restricting the subject matter to the precise forms disclosed. Persons skilled in the relevant art can appreciate that many modifications and variations are possible in light of the above disclosure and may be made thereto without departing from the broader scope of the embodiments as set forth herein. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

As used herein, the terms "a" and "an" and "the" and other such singular referents are to be construed to include both the singular and the plural, unless otherwise indicated herein or clearly contradicted by context.

As used herein, the terms "comprising," "having," "including," and "containing" are to be construed as open-ended (e.g., "including" is to be construed as "including, but not limited to"), unless otherwise indicated or clearly contradicted by context.

As used herein, the recitation of ranges of values is intended to serve as a shorthand method of referring individually to each separate value falling within the range, unless otherwise indicated or clearly contradicted by context. Accordingly, each separate value of the range is incorporated into the specification as if it were individually recited herein.

As used herein, use of the terms "set" (e.g., "a set of items") and "subset" (e.g., "a subset of the set of items") is to be construed as a nonempty collection including one or more members unless otherwise indicated or clearly contradicted by context. Furthermore, unless otherwise indicated or clearly contradicted by context, the term "subset" of a corresponding set does not necessarily denote a proper subset of the corresponding set but that the subset and the set may include the same elements (i.e., the set and the subset may be the same).

As used herein, use of conjunctive language such as "at least one of A, B, and C" is to be construed as indicating one or more of A, B, and C (e.g., any one of the following nonempty subsets of the set {A, B, C}, namely: {A}, {B}, {C}, {A, B}, {A, C}, {B, C}, or {A, B, C}) unless otherwise indicated or clearly contradicted by context. Accordingly, conjunctive language such as "as least one of A, B, and C" does not imply a requirement for at least one of A, at least one of B, and at least one of C.

As used herein, the use of examples or exemplary language (e.g., "such as" or "as an example") is intended to more clearly illustrate embodiments and does not impose a limitation on the scope unless otherwise claimed. Such language in the specification should not be construed as indicating any non-claimed element is required for the practice of the embodiments described and claimed in the present disclosure.

As used herein, where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method, comprising:
   receiving power associated with a primary computing device, wherein the power is received at a data protection device electrically coupled to a power bus implemented on the primary computing device;
   detecting one or more data privacy elements associated with a secondary computing device, wherein the one or more data privacy elements identify one or more characteristics associated with operations performable by the secondary computing device, wherein the one or more data privacy elements are detected from a request to access a network location, and are detectable by a network host when accessing the network location, and wherein the request is received over a secure connection between the data protection device and the secondary computing device;
   modifying the one or more data privacy elements, wherein modifying the one or more data privacy elements includes replacing the one or more characteristics with inaccurate characteristics associated with the operations performable by the secondary computing device, wherein the inaccurate characteristics are determined based on an output generated by a machine learning model, wherein the output includes one or more attribution vectors, and wherein an attribution vector is determined based on data privacy elements having similar values; and
   using the data protection device to transmit the one or more modified data privacy elements, wherein when the network host detects the one or more modified data privacy elements at the network location, the network host accesses the inaccurate characteristics, and wherein the network host accessing the inaccurate characteristics increases a likelihood of the network host being classified as an unauthorized network host.

2. The computer-implemented method of claim 1, wherein using the data protection device to facilitate access between the secondary computing device and the network location includes establishing a connection between the data protection device and the network location.

3. The computer-implemented method of claim 1, wherein using the data protection device to facilitate access between the secondary computing device and the network location includes establishing a connection between the data protection device and a data protection platform, and wherein access to the network location is facilitated through the data protection platform.

4. The computer-implemented method of claim 1, wherein generating the one or more modified data privacy elements includes accessing an artificial profile, and wherein the data protection device generates the one or more modified data privacy elements based on the one or more data privacy elements and according to the artificial profile.

5. The computer-implemented method of claim 1, wherein the attribution vector represents a detectable characteristic associated with the data privacy elements having similar values, wherein the data privacy elements having similar values are clustered based on a similarity in values.

6. The computer-implemented method of claim 1, further comprising:
   modifying a base power consumption associated with the power, wherein the base power consumption is modified using a power modulator associated with the data protection device.

7. The computer-implemented method of claim 1, wherein the inaccurate characteristics increase a likelihood of network host access.

8. A data protection device, comprising:
   one or more data processors;
   a power interface electrically coupled to a power bus implemented on a primary computing device, wherein the power interface receives power from the primary computing device;
   a communication interface, wherein when a secure connection is established between the communication interface and a secondary computing device, the communication interface receives data from the secondary computing device over the secure connection; and
   a non-transitory computer-readable storage medium containing instructions which, when executed by the one or more data processors, cause the one or more data processors to perform operations including:
     detecting one or more data privacy elements associated with the secondary computing device, wherein the one or more data privacy elements identify one or more characteristics associated with operations performable by the secondary computing device, wherein the one or more data privacy elements are detected from a request to access a network location, and are detectable by a network host when accessing the network location, and wherein the request is received over the secure connection;

modifying the one or more data privacy elements, wherein modifying the one or more data privacy elements includes replacing the one or more characteristics with inaccurate characteristics associated with the operations performable by the secondary computing device, wherein the inaccurate characteristics are determined based on an output generated by a machine learning model, wherein the output includes one or more attribution vectors, and wherein an attribution vector is determined based on data privacy elements having similar values; and transmitting the one or more modified data privacy elements, wherein when the network host detects the one or more modified data privacy elements at the network location, the network host accesses the inaccurate characteristics, and wherein the network host accessing the inaccurate characteristics increases a likelihood of the network host being classified as an unauthorized network host.

9. The data protection device of claim 8, wherein the one or more data privacy elements characterize one or more features of the secondary computing device, the request, the data, or a user of the secondary computing device.

10. The data protection device of claim 8, wherein facilitating access between the secondary computing device and the network location includes establishing a connection between the data protection device and the network location.

11. The data protection device of claim 8, wherein facilitating access between the secondary computing device and the network location includes establishing a connection between the data protection device and a data protection platform, and wherein access to the network location is facilitated through the data protection platform.

12. The data protection device of claim 8, wherein generating the one or more modified data privacy elements includes accessing an artificial profile, and wherein the one or more modified data privacy elements are generated based on the one or more data privacy elements and according to the artificial profile.

13. The data protection device of claim 8, wherein the attribution vector represents a detectable characteristic associated with the data privacy elements having similar values, wherein the data privacy elements having similar values are clustered based on a similarity in values.

14. The data protection device of claim 8, wherein the power interface includes a power modulator, and wherein the power modulator consumes the power to modify a base power consumption.

15. The data protection device of claim 8, wherein the inaccurate characteristics increase a likelihood of network host access.

16. A computer-program product tangibly embodied in a non-transitory machine-readable storage medium, including instructions configured to cause a data processing apparatus to perform operations including:

receiving power associated with a primary computing device, wherein the power is received at the data processing apparatus through a power bus implemented on the primary computing device, and wherein the data processing apparatus is electrically coupled to the power bus;

detecting one or more data privacy elements associated with a secondary computing device, wherein the one or more data privacy elements identify one or more characteristics associated with operations performable by the secondary computing device, wherein the one or more data privacy elements are detected from a request to access a network location, and are detectable by a network host when accessing the network location, and wherein the request is received over a secure connection between the data processing apparatus and the secondary computing device;

modifying the one or more data privacy elements, wherein modifying the one or more data privacy elements includes replacing the one or more characteristics with inaccurate characteristics associated with the operations performable by the secondary computing device, wherein the inaccurate characteristics are determined based on an output generated by a machine learning model, wherein the output includes one or more attribution vectors, and wherein an attribution vector is determined based on data privacy elements having similar values; and transmitting the one or more modified data privacy elements, wherein when the network host detects the one or more modified data privacy elements at the network location, the network host accesses the inaccurate characteristics, and wherein the network host accessing the inaccurate characteristics increases a likelihood of the network host being classified as an unauthorized network host.

17. The computer-program product of claim 16, wherein facilitating access between the secondary computing device and the network location includes establishing a connection between the data processing apparatus and the network location.

18. The computer-program product of claim 16, wherein the attribution vector represents a detectable characteristic associated with the data privacy elements having similar values, wherein the data privacy elements having similar values are clustered based on a similarity in values.

19. The computer-implemented method of claim 1, wherein the one or more data privacy elements characterize one or more features of the secondary computing device, the request, the data, or a user of the secondary computing device.

20. The computer-program product of claim 16, wherein the one or more data privacy elements characterize one or more features of the secondary computing device, the request, the data, or a user of the secondary computing device.

21. The computer-program product of claim 16, wherein facilitating access between the secondary computing device and the network location includes establishing a connection between the data processing apparatus and a data protection platform, and wherein access to the network location is facilitated through the data protection platform.

22. The computer-program product of claim 16, wherein generating the one or more modified data privacy elements includes accessing an artificial profile, and wherein the one or more modified data privacy elements are generated based on the one or more data privacy elements and according to the artificial profile.

23. The computer-program product of claim 16, wherein the instructions are further configured to cause the data processing apparatus to perform additional operations including:

modifying a base power consumption associated with the power, wherein the base power consumption is modified using a power modulator associated with the data processing apparatus.

24. The computer-program product of claim 16, wherein the inaccurate characteristics increase a likelihood of network host access.

* * * * *